US012434879B2

(12) United States Patent
Elder, Jr. et al.

(10) Patent No.: US 12,434,879 B2
(45) Date of Patent: Oct. 7, 2025

(54) FOOD SERVICE BOX

(71) Applicant: UPPERCUT BOX COMPANY, Nashville, TN (US)

(72) Inventors: James Colston Elder, Jr., Nashville, TN (US); Zachary Michael Ciulis, Antioch, TN (US); Eric Dana Roth, Old Hickory, TN (US)

( * ) Notice: Subject to any disclaimer, the term of this patent is extended or adjusted under 35 U.S.C. 154(b) by 0 days.

(21) Appl. No.: 18/936,957

(22) Filed: Nov. 4, 2024

(65) Prior Publication Data
US 2025/0270003 A1 Aug. 28, 2025

Related U.S. Application Data

(60) Provisional application No. 63/557,899, filed on Feb. 26, 2024.

(51) Int. Cl.
*B65D 5/52* (2006.01)
*B65D 5/02* (2006.01)
*B65D 5/50* (2006.01)

(52) U.S. Cl.
CPC ......... *B65D 5/5019* (2013.01); *B65D 5/0227* (2013.01); *B65D 5/528* (2013.01); *B65D 2571/0066* (2013.01)

(58) Field of Classification Search
CPC .......... B65D 5/5011–5014; B65D 5/44; B65D 5/48016; B65D 2571/00246–00265; B65D 2571/0029; B65D 2571/00308–00314; B65D 5/528–5293; Y10S 229/904
USPC ........... 229/171, 904, 141; D9/418; 206/194
See application file for complete search history.

(56) References Cited

U.S. PATENT DOCUMENTS

| 2,924,372 A | * | 2/1960 | Kirkeby | B65D 5/48018 |
| | | | | D7/505 |
| 4,196,807 A | * | 4/1980 | Brom | B65D 71/0007 |
| | | | | 206/427 |
| D305,304 S | * | 1/1990 | McCaleb | D9/751 |
| 6,213,389 B1 | * | 4/2001 | Cai | B65D 5/4802 |
| | | | | 229/917 |

(Continued)

FOREIGN PATENT DOCUMENTS

| CN | 110182437 A | * | 8/2019 | B65D 5/02 |
| KR | 20130022712 A | * | 3/2013 | |

(Continued)

*Primary Examiner* — Nathan J Newhouse
*Assistant Examiner* — Phillip D Schmidt
(74) *Attorney, Agent, or Firm* — Patricia C. Brzostowicz; Superior Patent Group, LLC

(57) ABSTRACT

The present disclosure is drawn to improved food service boxes that in one embodiment is a beverage supported food box that enables a user to hold a beverage and food item with one hand. Alternately the beverage supported food box may be supported by the beverage that is placed in a beverage holder. Further, the food box may serve as a makeshift table when the beverage is placed in a cup holder. This device solves the problem of balancing multiple food and beverage items when no table is present. The food box may further comprise a condiment, or dipping sauce, holder, other food container, and/or utensil holder. The improved food service boxes can be made from a compostable material, shipped flat for reduced shipping costs, be compact for shipping and storing, have one-step food vendor assembly, and improved end-user experience.

19 Claims, 48 Drawing Sheets

(56) References Cited

U.S. PATENT DOCUMENTS

| | | | |
|---|---|---|---|
| 6,425,480 B1 | 7/2002 | Krueger et al. | |
| 7,182,242 B2 | 2/2007 | Cai | |
| 7,631,800 B2 * | 12/2009 | Cai | B65D 5/5021 |
| | | | 229/114 |
| 7,743,971 B2 | 6/2010 | DeVine et al. | |
| 8,459,481 B2 * | 6/2013 | Arkin | B60R 11/00 |
| | | | 220/6 |
| 9,101,167 B2 * | 8/2015 | Fath | B65D 5/425 |
| 9,327,864 B2 * | 5/2016 | Bell | B65D 5/5021 |
| 9,676,510 B2 * | 6/2017 | Learn | B65D 5/0254 |
| 10,045,645 B2 * | 8/2018 | Kim | B65D 71/48 |
| 11,273,950 B2 * | 3/2022 | Oliveira | B65D 5/244 |
| 2002/0134781 A1 | 9/2002 | Ciarrocchi | |
| 2004/0084458 A1 | 5/2004 | Krueger et al. | |
| 2013/0075392 A1 * | 3/2013 | Learn | B65D 5/5286 |
| | | | 220/6 |
| 2019/0144180 A1 * | 5/2019 | Mertz, II | B65D 71/0022 |
| | | | 229/117.16 |
| 2022/0024633 A1 * | 1/2022 | Tsao | B65D 5/46112 |

FOREIGN PATENT DOCUMENTS

| | | |
|---|---|---|
| WO | WO 2001/038176 | 5/2001 |
| WO | WO 2006/057625 | 6/2006 |

\* cited by examiner

FIG. 31
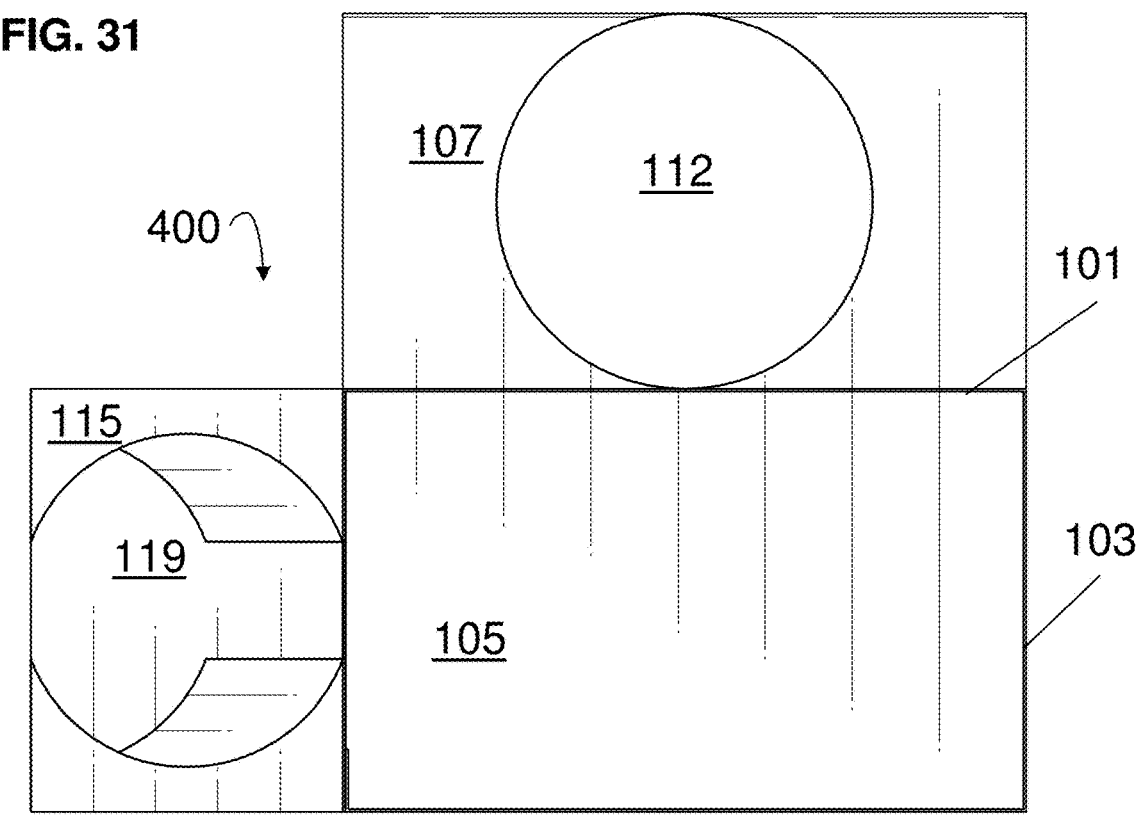
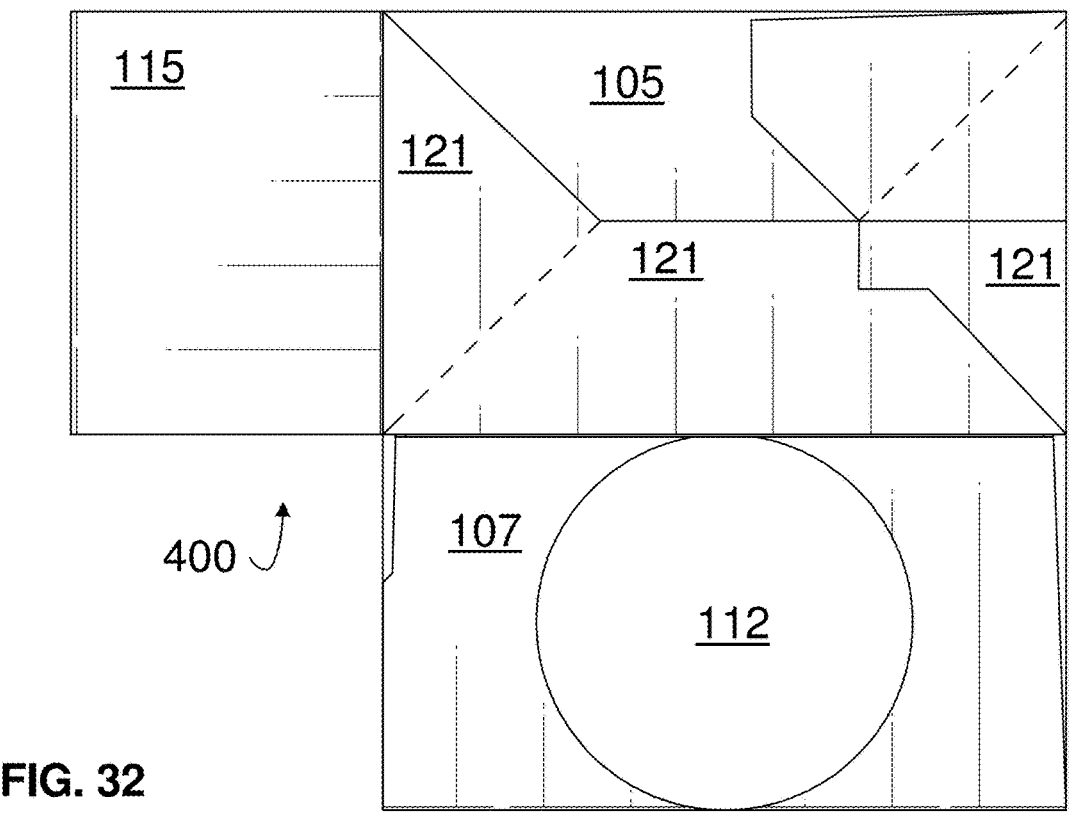
FIG. 32

FOOD SERVICE BOX

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a non-provisional patent application claiming priority to U.S. Provisional Application No. 63/557,899 filed Feb. 26, 2024, and the entirety of which is incorporated by reference.

FIELD

This disclosure relates to the field of food containment for take-out or to-go food, items wherein a person needs to carry a food item using the food container and/or eat a food item from the food container.

BACKGROUND

Often food served by vendors as take-out or to-go items from restaurants or at events, including concerts, sporting venues, festivals, parades, and other outdoor or indoor events, is supplied in cartons or boxes. These cartons or boxes can be cumbersome, hard to hold, and hard to carry especially if a beverage, more than one food item, and sauce or condiment items are also desired, and even further if a user is carrying orders for more than one person. A vendor is challenged with balancing price of these cartons, having storage space for cartons, time for assembling the cartons, and end user experience with the cartons where little to no table space is available. There is a need in the market to provide a price conscious, durable, compostable, compact, and convenient food carton that can be assembled quickly by a vendor, is easy to ship, and cost effective.

SUMMARY

The present disclosure is drawn to a food service box that in one embodiment is a beverage supported food box that enables a user to hold a beverage and food item with one hand. Alternately the beverage supported food box may be supported by the beverage that is placed in a beverage holder. This device solves the problem of balancing multiple food and beverage items when no table is present, making it easier to carry and consume food and beverages at events. Further, the beverage supported food box may serve as a makeshift table when the beverage is placed in a cup holder. The beverage food box may further comprise a condiment, dipping sauce, or additional food item storage portion, and/or utensil holder.

A food service box that can be assembled by the vendor in one step is disclosed. A food service box that is assembled from a single flat form piece is disclosed. A food service box that can be shipped flat to the vendor is disclosed. A food service box that is stackable is disclosed. A food service box that can reliably hold a condiment for use in dipping is disclosed. A food service box that is compostable is disclosed. A food service box that may be BPI certified is disclosed. Embodiments of food service boxes disclosed herein are easy and inexpensive to manufacture, have a small shipping and storage footprint, are fast and easy to assemble by the vendor, and make carrying and eating a food item or items easier for an end user compared to prior art food cartons.

In a particular embodiment, an exemplary food box configured to engage a beverage container as disclosed herein may include one or more side walls, a beverage flap, and an aperture defined in the beverage flap. Each of the one or more side walls may include a top edge and a bottom edge. The beverage flap may have a top member and a bottom member. The top member may be connected to the top edge of a first side wall of the one or more side walls. At least a portion of the bottom member may be attached to the first side wall. The aperture may be designed to engage the beverage container.

In an exemplary aspect according to the above-referenced embodiment, the one or more side walls may include four side walls configured to define an internal container space.

In another exemplary aspect according to the above-referenced embodiment, the one or more side walls may define an internal container space.

In another exemplary aspect according to the above-referenced embodiment, the internal container space may include a bottom formed by at least one bottom flap connected to at least one of the one or more side walls.

In another exemplary aspect according to the above-referenced embodiment, each of the one or more sides walls may include a bottom flap of the at least one bottom flap.

In another exemplary aspect according to the above-referenced embodiment, the bottom of the internal container space may be formed by a single bottom flap.

In another exemplary aspect according to the above-referenced embodiment, the top member and the bottom member of the beverage flap may be parallel.

In another exemplary aspect according to the above-referenced embodiment, the top member of the beverage flap may contact the bottom member of the beverage flap.

In another exemplary aspect according to the above-referenced embodiment, the beverage flap may further include a side wall portion defined between and configured to separate the top member and the bottom member.

In another exemplary aspect according to the above-referenced embodiment, the side wall portion of the beverage flap may be positioned distal to the first side wall.

In another exemplary aspect according to the above-referenced embodiment, the beverage flap may further include an end portion extending from the bottom member. The end portion may be configured to attach the bottom member to the first side wall.

In another exemplary aspect according to the above-referenced embodiment, the end portion of the beverage flap may be connected to the first side wall via glue.

In another exemplary aspect according to the above-referenced embodiment, the food box may include an additional flap connected to the top edge of a second side wall of the one or more side walls. The additional flap may have a cutout designed to receive a food container.

In another exemplary aspect according to the above-referenced embodiment, the cutout may be defined in at least a top member of the additional flap. The top member may be connected to the top edge of the second side wall.

In another exemplary aspect according to the above-referenced embodiment, the additional flap may further include a vertical member extending from the top member and a bottom member extending from the vertical member. The bottom member may be configured to attach to the second side wall.

In another exemplary aspect according to the above-referenced embodiment, the top member and the bottom member of the additional flap may be parallel.

In another exemplary aspect according to the above-referenced embodiment, the additional flap may further include an end portion extending from the bottom member. The end portion may be configured to attach the bottom member to the second side wall.

In another exemplary aspect according to the above-referenced embodiment, the end portion of the additional flap may be connected to the second side wall via glue.

In another exemplary aspect according to the above-referenced embodiment, the end portion of the additional flap may be connected to the second side wall via a friction lock when the end portion is received by a slot defined in the second side wall.

In another exemplary aspect according to the above-referenced embodiment, the food box may be formed from a single flat piece of a material.

In another exemplary aspect according to the above-referenced embodiment, the food box may be formed from paper board.

In another exemplary aspect according to the above-referenced embodiment, the food box may be formed of a compostable material.

In another exemplary aspect according to the above-referenced embodiment, the food box may be made from at least one of a group of a compostable paper, a compostable wood product, a compostable plastic, a compostable bamboo, a compostable paper board, and a compostable hemp.

In another embodiment, a food box as disclosed herein may include one or more side walls, a condiment flap, and at least one cutout. Each of the one or more side walls may have a top edge and a bottom edge. The condiment flap may have a top member and a bottom member. The top member may be connected to the top edge of a first side wall of the one or more side walls. The bottom member may be couplable to the first side wall between the top edge and the bottom edge. The at least one cutout may be defined in the condiment flap and may be designed to receive a food container.

In another embodiment, a method of forming a food box as disclosed herein may comprise: (a) cutting a flat shape including (i) four side walls, wherein the side walls comprise a flap with square corners; (ii) a beverage flap extending from a top edge of the first or second side walls, the beverage flap comprising at least two apertures and a beverage flap notched end, wherein the at least two apertures are configured to fit around a beverage container; and (iii) a beverage flap slit, configured to receive the beverage flap notched end, in either the first or second side walls where the beverage flap extends from; (b) folding the flat shape into a configured food box; and (c) fitting the beverage flap notched end into the beverage flap slit of either the first or second side walls.

In an exemplary aspect according to the above-referenced embodiment, the method may further comprise: including at least one side flap having a cutout configured to receive a condiment container extending from at least one of the third or fourth side walls in the flat shape, wherein the at least one side flap comprises a side flap notched end and the at least one of the third or fourth side walls comprises a slit to receive the side flap notched end; and fitting the side flap notched end into the slit of either of the at least one of the third or fourth side walls.

In a further embodiment, a food box when configured for use, as disclosed herein, may comprise: (a) at least one side wall forming an open space with an upper aperture, wherein a top edge of the at least one side wall is connected to a cover flap; (b) wherein the cover flap comprises a bottom edge and an outer edge, and the bottom edge is connected to the top edge of the at least one side wall; (c) wherein the cover flap comprises a top side connected to the top edge of the at least one side wall; (d) wherein when the cover flap comprises an end connected to the at least one side wall; (e) wherein the cover flap comprises at least one cutout to receive a condiment flap; and (f) wherein the cover flap fits over the open space in a closed position to form a flat cover for the food box.

In an exemplary aspect according to the above-referenced embodiment, the cutout of the cover flap may be adhered to the at least one side wall when configured for use.

In another exemplary aspect according to the above-referenced embodiment, the cutout may be adhered using a glue.

In another exemplary aspect according to the above-referenced embodiment, the glue may be a compostable glue.

In another exemplary aspect according to the above-referenced embodiment, the outer edge of the cover flap may be adhered to the at least one side wall when configured for use In another exemplary aspect according to the above-referenced embodiment, the outer edge of the cover flap may be connected via a friction lock to the at least one side wall when configured for use.

In another exemplary aspect according to the above-referenced embodiment, the food box may be configured for use from a planar material.

In another exemplary aspect according to the above-referenced embodiment, the planar material may be a compostable material.

In another exemplary aspect according to the above-referenced embodiment, the planar material may be a paperboard.

In another embodiment, a method of forming a food box as disclosed herein may comprise: (a) cutting a flat shape comprising: (i) four side walls, wherein the side walls comprise a flap with square corners; (ii) a condiment flap extending from a top edge of the first or second side walls, the beverage flap comprising at least two apertures and a condiment flap notched end, wherein the at least two apertures are configured to fit around a condiment container; and (iii) a condiment flap slit, configured to receive the condiment flap notched end, in either the first or second side walls where the condiment flap extends from; (b) folding the flat shape into a configured food box; and (c) fitting the condiment flap notched end into the condiment flap slit of either the first or second side walls.

In an exemplary aspect according to the above-referenced embodiment, step (c) of the method may further comprise forming a flat top from an upper portion of the condiment flap.

DESCRIPTION OF THE DRAWINGS

FIG. 31 is a top-side view of the fourth embodiment of a beverage supported food box.

FIG. 32 is a bottom-side view of the fourth embodiment of a beverage supported food box.

Figure 1:
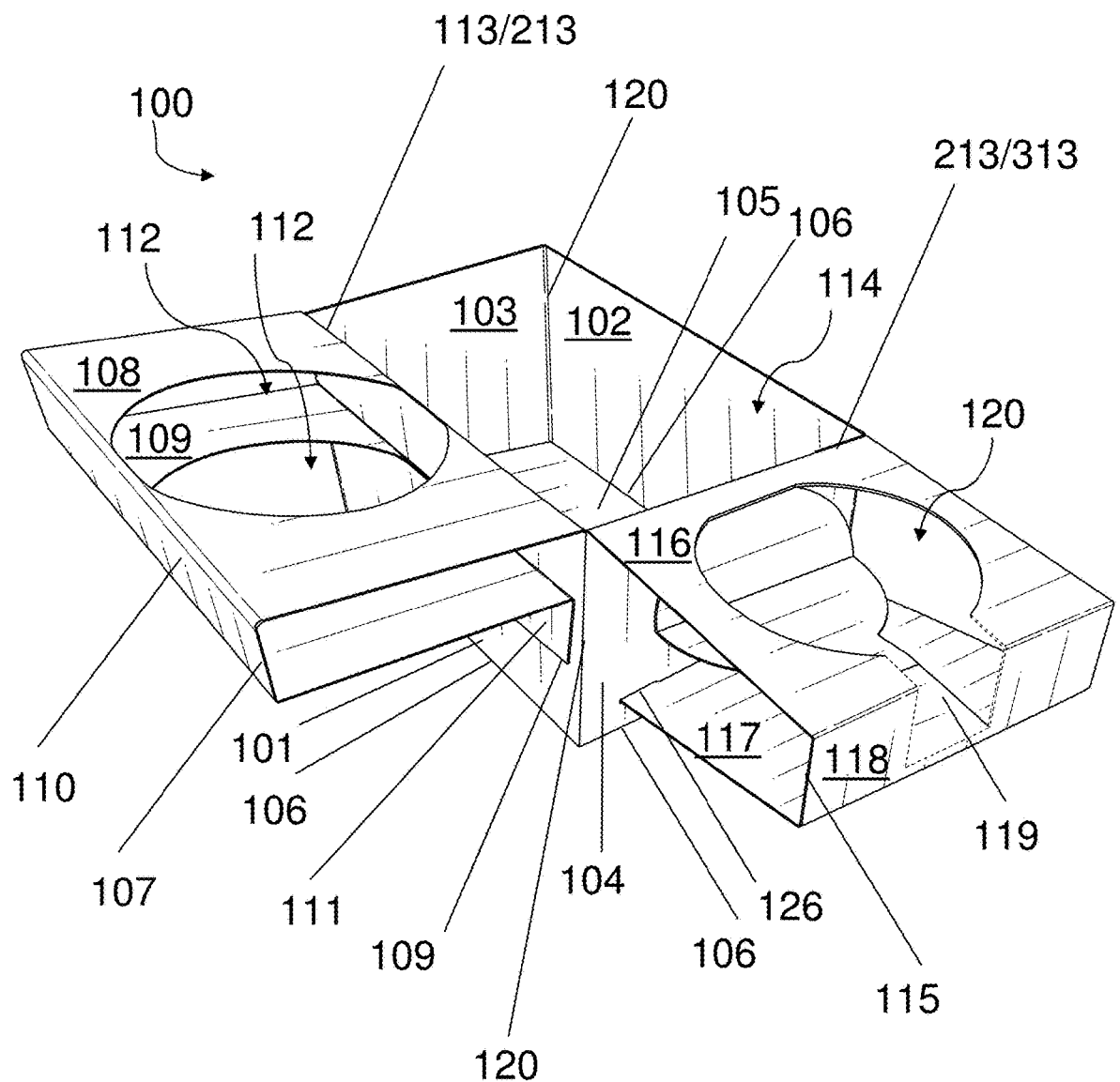
FIG. 1 is a top-perspective view of a first embodiment of a beverage supported food box configured for end consumer use.
Figure 2:
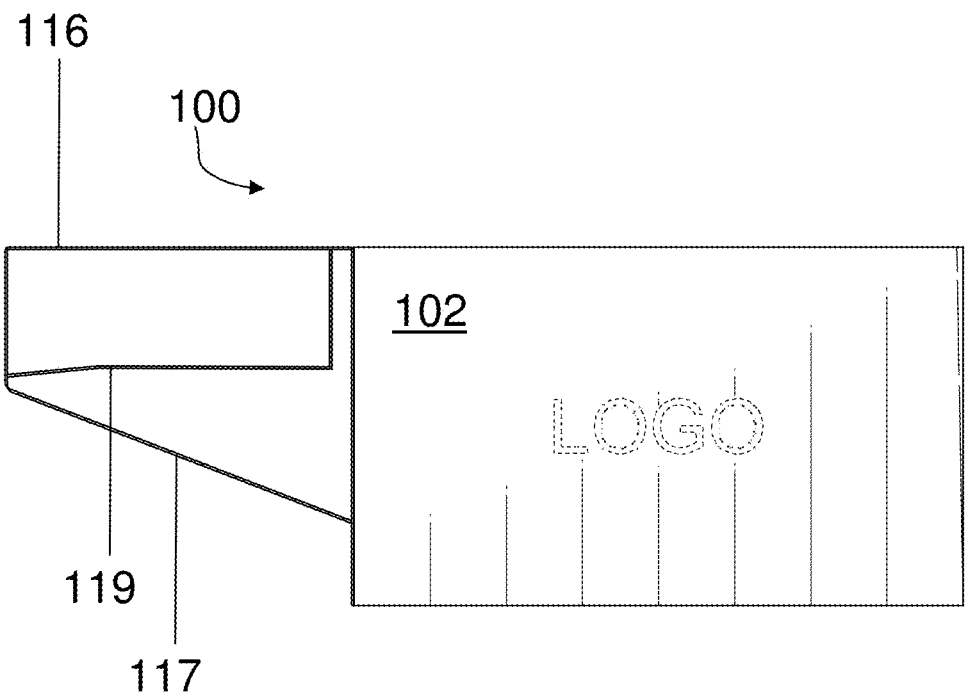
FIG. 2 is a front-side view of the first embodiment of a beverage supported food box, wherein the LOGO is positioned on the front of the beverage supported food box.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

Summary

Embodiments of the present disclosure including beverage supported food boxes, and methods of providing a beverage-supported food box, as described herein, are shown in FIGS. 1-40. The beverage supported food boxes enable a user to hold a beverage and food item with one hand. Alternately the beverage supported food box may be supported by the beverage that is placed in a beverage holder. This device solves the problem of holding multiple food and beverage items when no table is present. Further, the beverage supported food box may serve as a makeshift table when the beverage is placed in a cup holder. The beverage supported food box may further comprise a condiment or dipping sauce holder, a side item or additional food container holder, and/or utensil holder. Further, the beverage supported food boxes provide low cost, easy to ship, small footprint, space saving, easy to assemble, in some cases compostable, and in some cases BPI certified food boxes for vendors to provide to end consumers.

Embodiments of improved food service boxes as described herein are shown in FIGS. 41-61. The improved food service boxes disclosed herein provide a device and method for providing a low cost, easy to ship, small footprint, space saving, easy to assemble, compostable, and BPI certified food box to provide to end users that improves ease of use over prior art food service boxes.

Terms

As used herein, conditional terms including but not limited to "can", "could", "might", or "may", unless expressly stated otherwise, or otherwise understood within the context of use, are generally meant to mean that certain examples include, while other examples do not include, particular features, steps, and/or elements. These terms are not generally meant to imply that features, steps, and/or elements are required for one or more examples or that one or more examples necessarily includes logic for deciding, with or without user input or prompting, whether these features, steps, and/or elements are included or performed in any particular examples.

As used herein, conjunction language such as the phrase "at least one of X, Y, and Z", unless otherwise stated, is understood to mean that an item, term, or element, etc., may be either X, Y, or Z, or any combination thereof. It is not generally intended to imply that certain examples require at least one of X, at least one of Y, and at least one of Z to be present. Use of the phrase, "at least one of X, Y, or Z, as used in general to mean that an item, term, or element, etc., may be either X, Y, or Z, or any combination thereof.

As used herein, the word "or" in reference to a list of two or more items includes all the following interpretations: any one of the items in the list, all the items in the list, and any combination of items in the list. Likewise, the term "and/or" in reference to a list of two or more items, includes all the following interpretations: any one of the items in the list, all the items in the list, and any combinations of items in the list.

As used herein, the terms "comprise", "comprises", and "comprising" are to be construed as inclusive terms, as opposed to exclusive or exhaustive, meaning "including, but not limited to."

As used herein, "adhered", "connected", "attached", "joined", "mounted", "fastened" or "coupled", or any variant thereof, means any connection or coupling, either direct or indirect between two elements which may be physical, logical, or a combination thereof. These words should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

As used herein, the words "herein", "above", or "below", and similar words, when used in the application, refer to the application as a whole and not to a single section of the application.

As used herein, "substantially" is defined as to a great or significant extent, for the most part, or essentially. For example, a substantially horizontal member, plane, or surface may be within one degree or two degrees from horizontal.

As used herein, "semi-rigid" or "semi-rigid material" means a material which is stiff and moderately rigid and flexible in nature in terms of its hardness property of the materials. These materials have adequate mechanical strength and other functional properties. These materials can be made, in non-limiting examples, others of which are presented elsewhere in this disclosure, either from cellulosic materials like paperboard or the different packaging formats made from paperboard like folding cartons, lined cartons, paper-based laminated composite carton.

As used herein, the term "about" is defined as almost, for example when describing an angle as about 90 degrees, the angle may fall within one to five degrees of 90 degrees. In another example, a percentage that is described as about fifty percent may be forty-five degrees or between forty-five degrees and fifty-five degrees.

The term "manufacturer" refers to an agent or agents, being a business or company comprising person(s) that create, cut, fold, glue, and/or assemble a product to provide, or ship, to a vendor.

The term "vendor" refers to an agent or agents, being a business or company comprising person(s) that further assemble, unfold, fold, or otherwise produce an end-user product for a consumer.

The term "end user" or "consumer" refers to an agent or agents, being person(s), who use the beverage supported food box or improved food service box of the current disclosure.

Description

Figure 38:
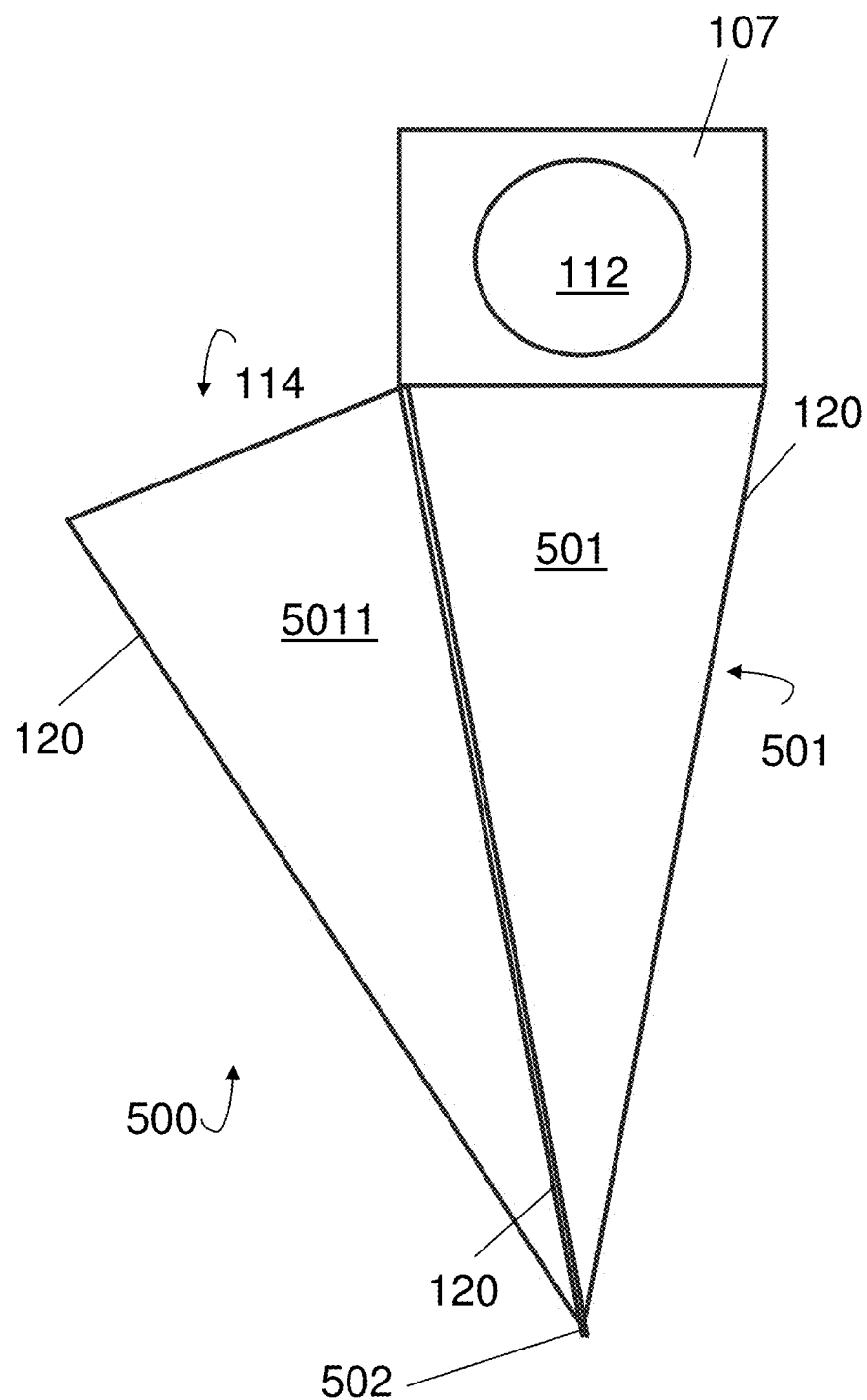
FIG. 38 is a front-side view of a fifth embodiment of a beverage supported food box.
Figure 39:
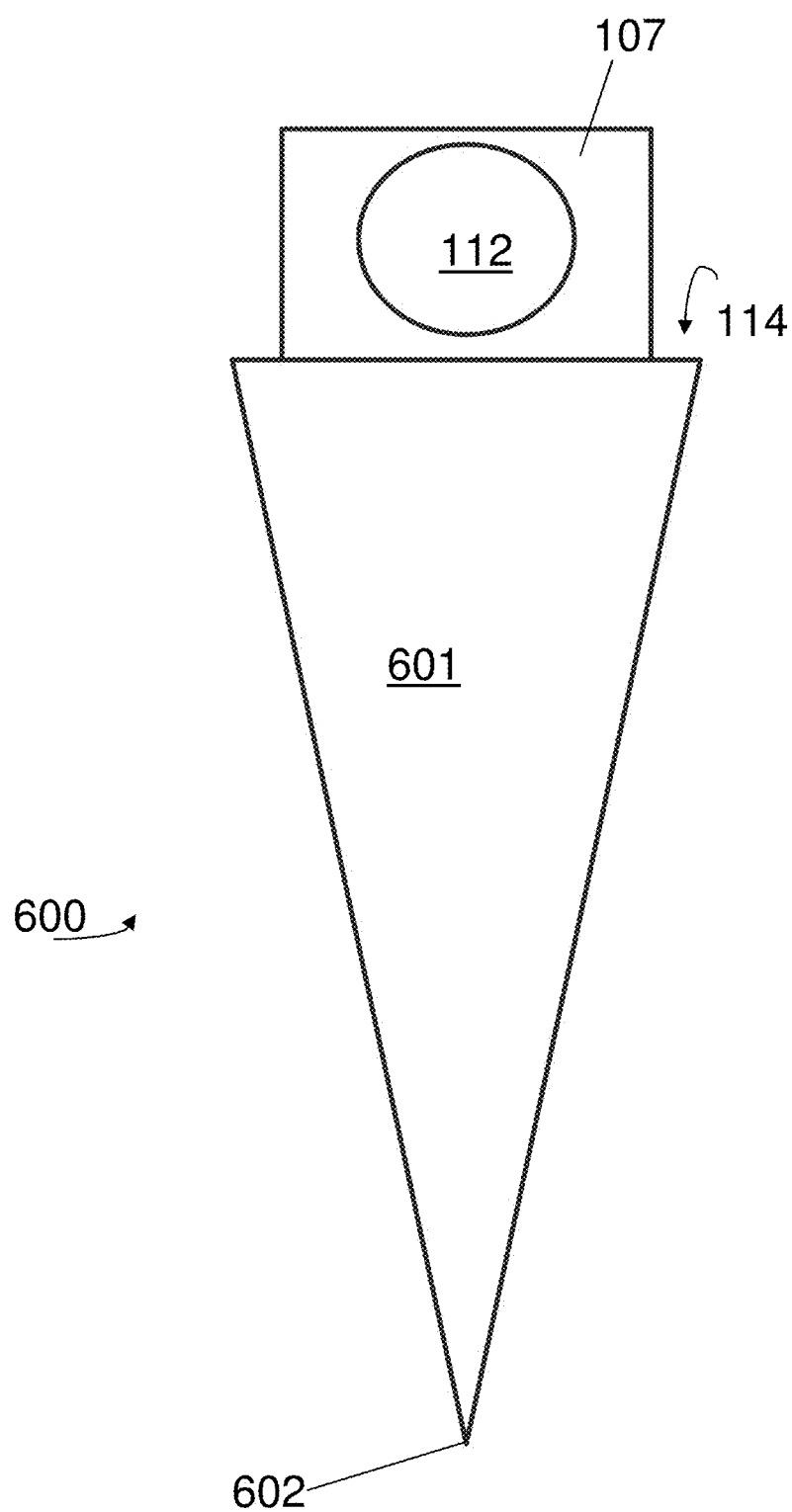
FIG. 39 is a front-side view of a fifth embodiment of a beverage supported food box.
Figure 40:
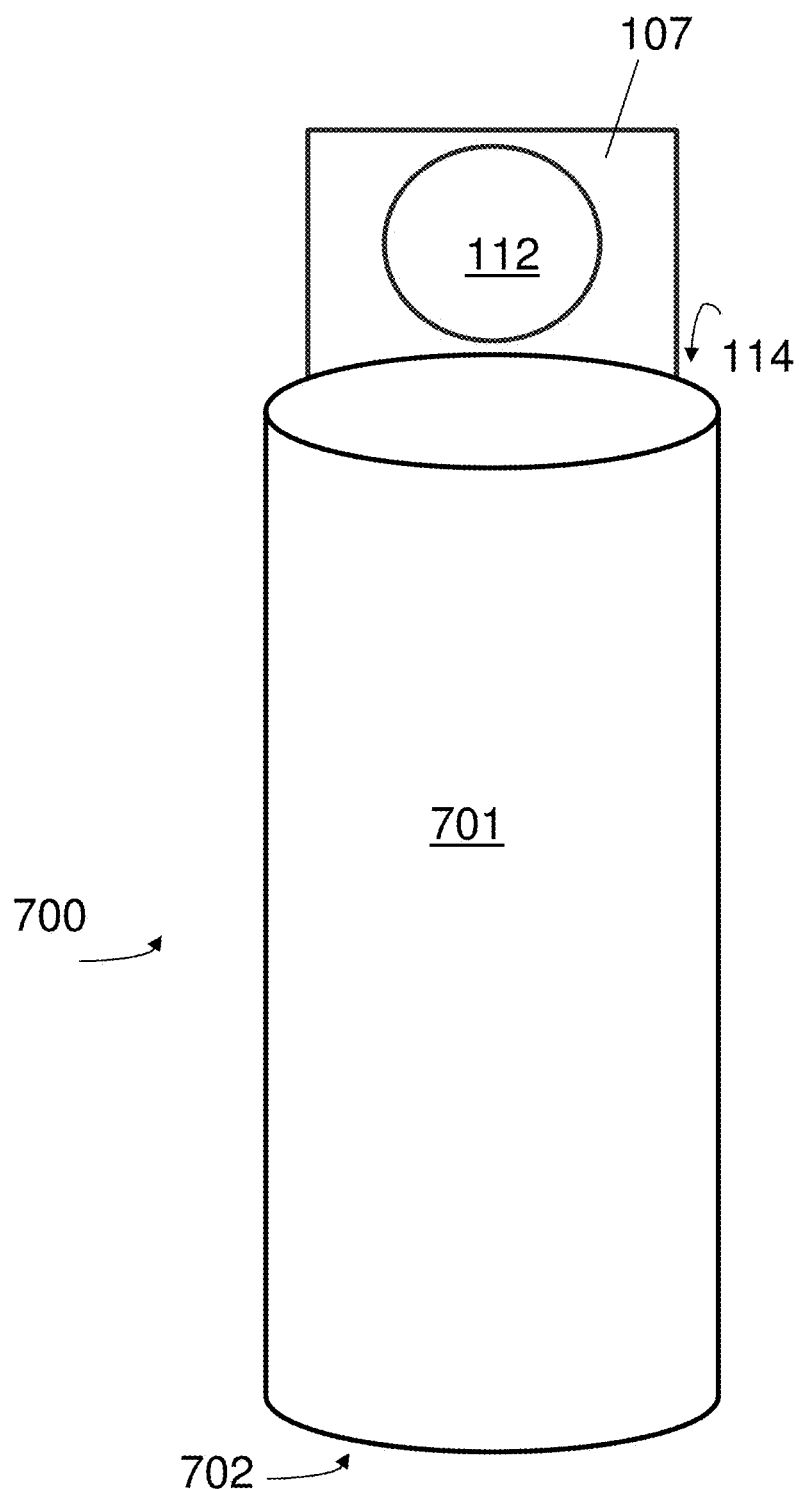
FIG. 40 is a perspective view of a sixth embodiment of a beverage supported food box configured for end consumer use.
Figure 41:
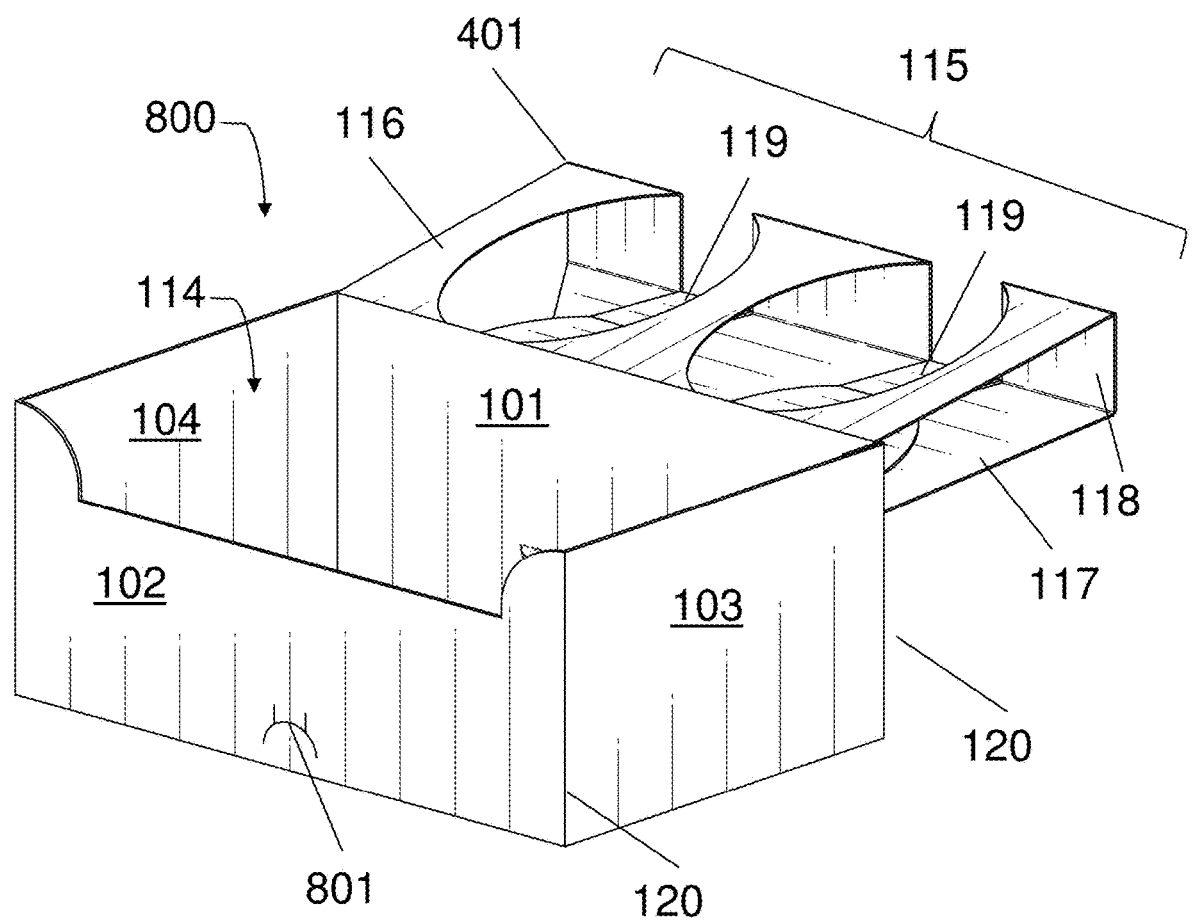
FIG. 41 is a perspective view of a first embodiment of an improved food service box configured for end consumer use.
Figure 42:
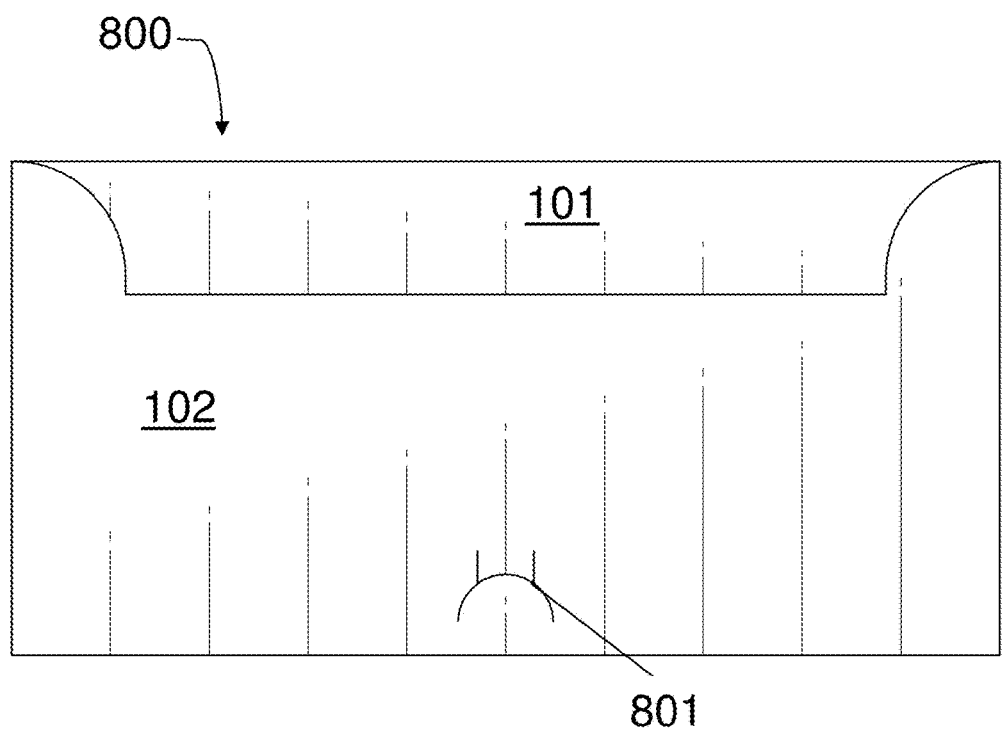
FIG. 42 is a front-side view of the first embodiment of an improved food service box.

With reference to FIGS. 1-13, a beverage supported food box 100, FIG. 1 comprising at least one side wall 101 connected to a beverage flap 107 is disclosed. The beverage flap top edge 113 is connected to at least one side wall 101 of a food box 100 at a top edge of the side wall 213. The shape of the side wall 101 may vary and take the shape of, in non-limiting examples, a square, rectangle, triangle, circle, or oval, making the food box which encloses a space 114 a three-dimensional shape comprising in non-limiting examples a rectangle, square, triangular prism, cone, or cylinder comprising one non-enclosed or open side to receive a food item. In other terms, although the example beverage supported food box 100 disclosed is shown with four side walls 101, 102, 103, 104, a food box of the present disclosure may comprise at least one side wall, at least two side walls, at least three side walls, at least four side walls, or at least five side walls, or at least six side walls, or more. For example, the beverage supported food box 100, 200, 300, 400, 500, 600, 700 and/or food service boxes 800, 900 described herein in the three-dimensional in-use configuration shown herein may take the shape, in non-limiting examples, of a rectangle, square, cube, triangular prism, cylinder, cone, half or partial sphere, cylinder, pyramid, tetrahedron, or octahedron, some of which non-limiting examples are illustrated in FIGS. 38-40. The beverage supported food box 100, 200, 300, 400, 500, 600, 700 and/or food service boxes 800, 900 described herein may comprise an open top, as shown, lacking a physical top to cover the interior space 114.

Figure 8:
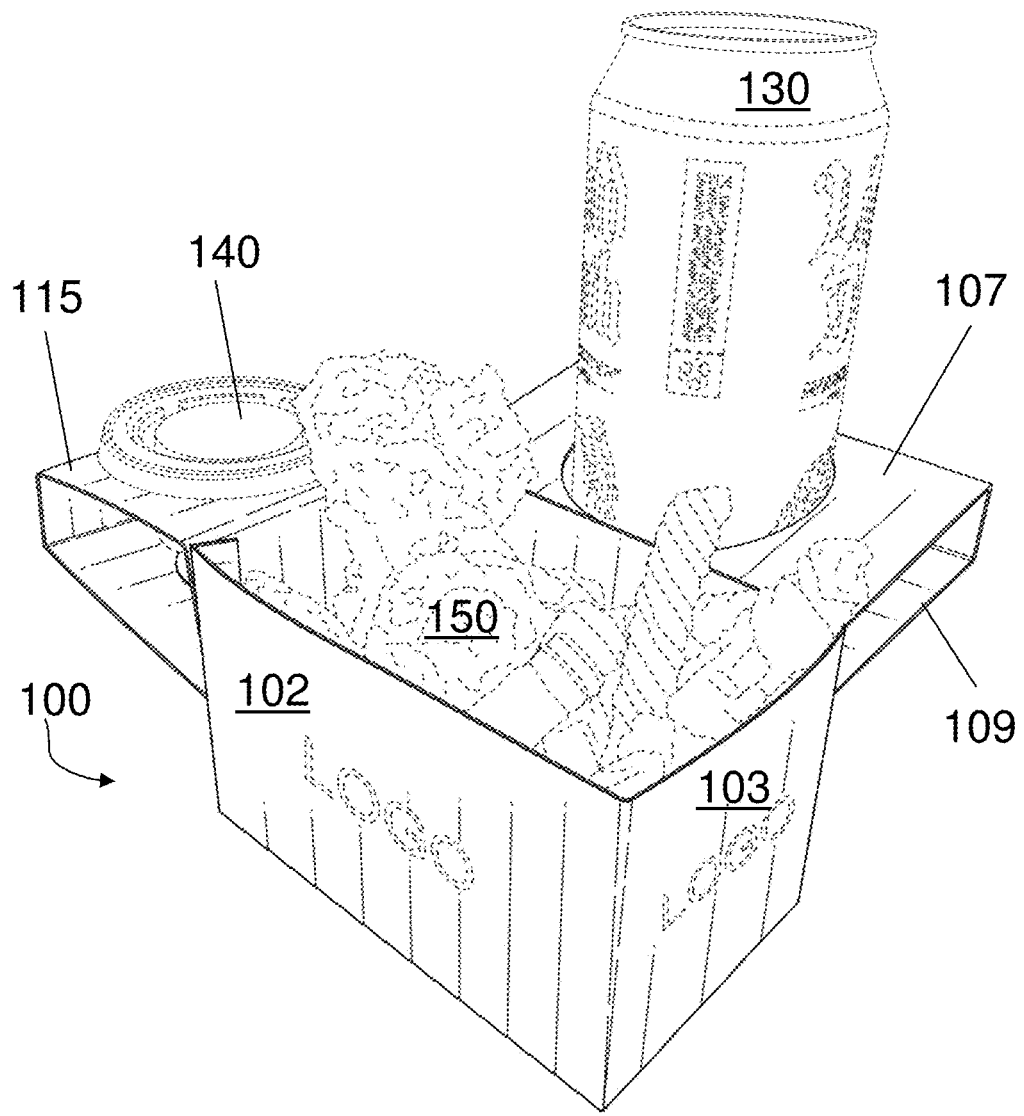
FIG. 8 is a perspective view of the first embodiment of a beverage supported food box in use by the end consumer.

As shown in FIG. 1, a top edge of a side wall 213 connects to a beverage flap 107 which may comprise at least two beverage apertures 112, that, when configured for use by an end user, align to receive a beverage container 130, FIG. 8. As shown in FIG. 1 an outer edge or end 111 of the beverage flap 107 is attached to the side wall 101 to form the configured for-use box 100, FIG. 1. The outer edge or end 111 of the beverage flap 107 may also be referred to as an end portion 111. This beverage flap end 111 may be glued, as shown in FIG. 1, or otherwise attached to the side wall 101, such as with a friction lock. A friction lock comprises a notched tab that slides into a slit in, for example, in a side wall 101, 104. The disclosed food box with at least one side wall 101 comprising a beverage flap 107 may further comprise a condiment flap 115, and/or a utensil cutout holder 125, FIG. 14, and other features. Other features, embodiments, methods of assembly and use, as described herein, apply to each embodiment disclosed.

Figure 7:
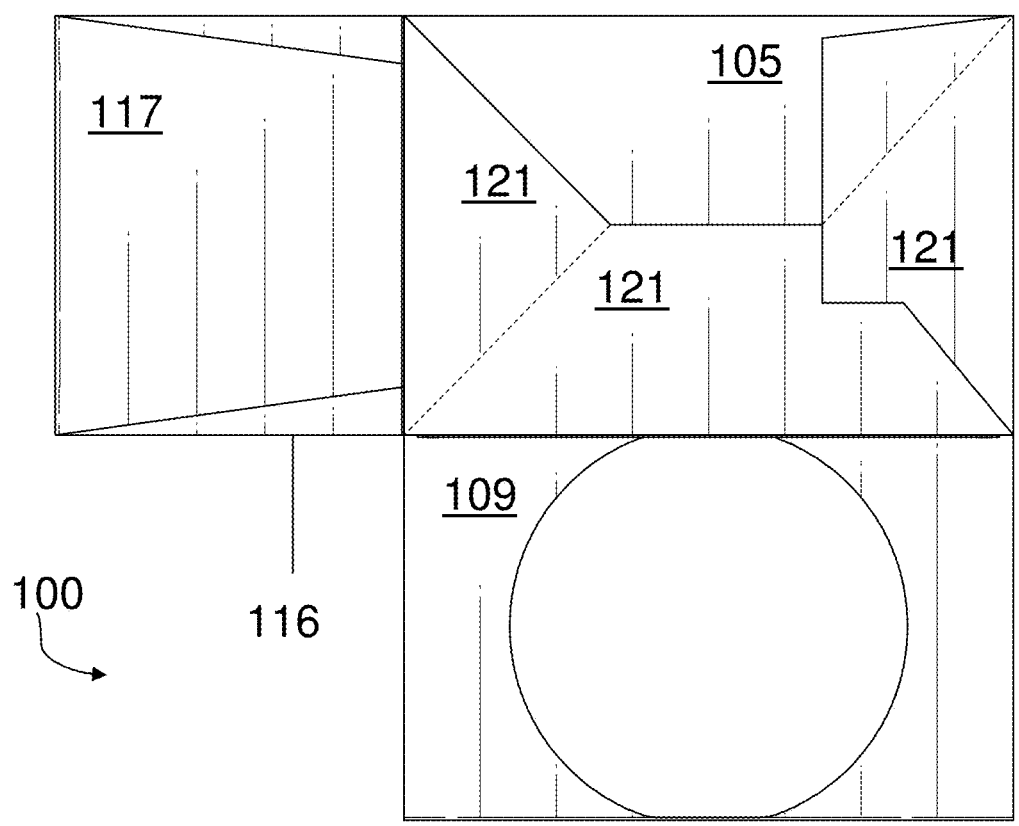
FIG. 7 is a bottom-side view of the first embodiment of a beverage supported food box.
Figure 9:
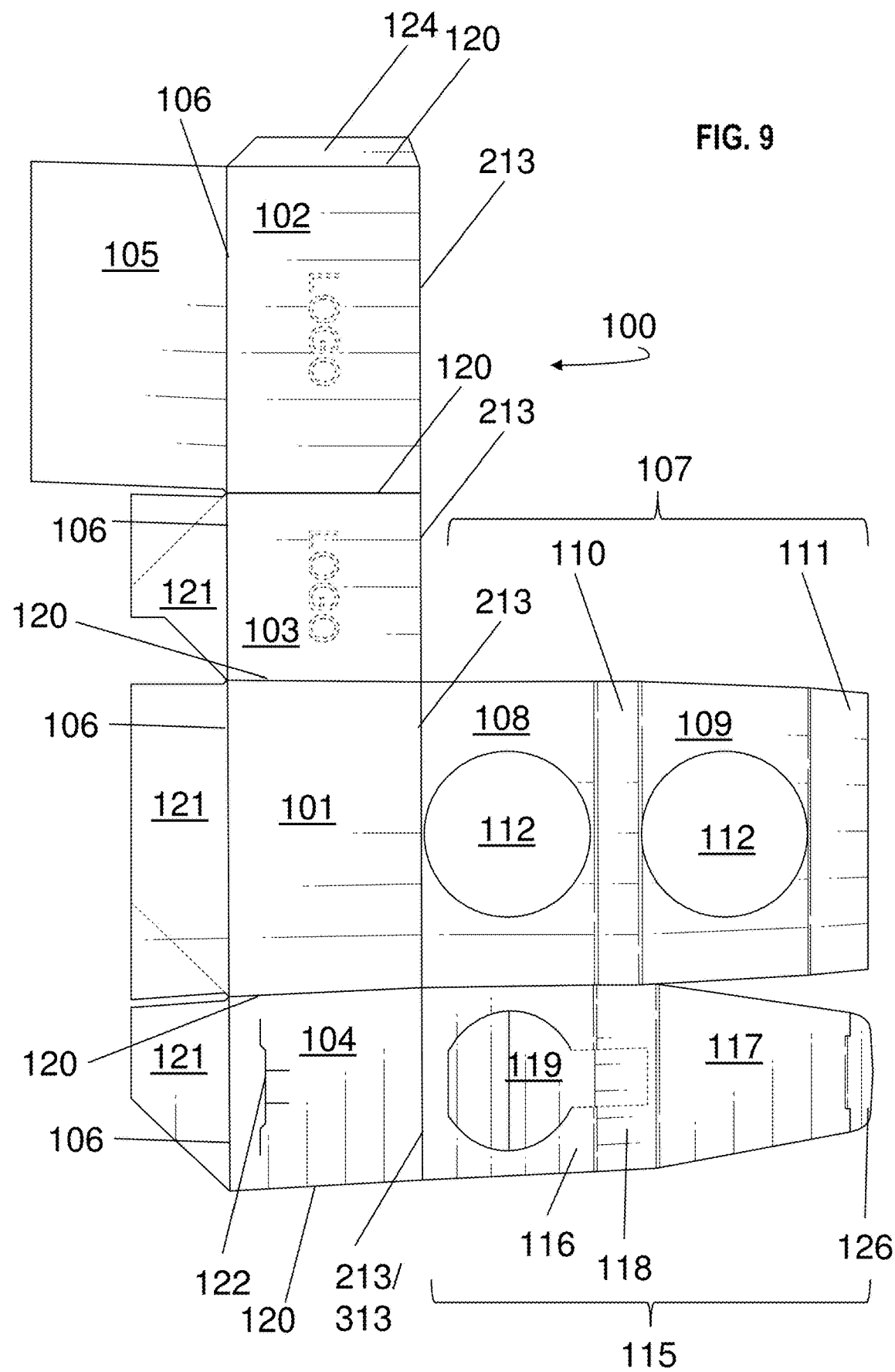
FIG. 9 is a perspective view of the first embodiment of a beverage supported food box before manufacturer assembly.

In an example, with reference to FIGS. 1-13, the disclosed beverage supported food box 100 comprises a first side wall 101, and second side wall 102, opposing the first side wall 101. The beverage supported food box 100 further comprises a third side wall 103, and fourth side wall 104, wherein the third side wall 103 opposes the fourth side wall 104. The side walls 101, 102, 103, 104 may join at least one other side wall 101, 102, 103, 104, or two other side walls depending on the state of configuration of the beverage supported food box 100, 200, 300, 400, 500, 600, 700 and/or food service boxes 800, 900 described herein at side wall side edges 120. The beverage supported food box 100 further comprises a bottom portion 105, FIG. 6 wherein the bottom 105 connects to at least one side walls 102 at a bottom edge 106 as shown in FIG. 1. As shown in FIG. 7, the bottom 105 is supported or partially supported by one or more, at least two, or at least three or more different bottom flaps 121 that may be glued or friction locked together before shipping to the vendor. Bottom flaps 121 may be square, triangular, or of irregular shapes having at least two open edges, or at least three open edges, wherein the open edges are edges not attached to other pieces of the good box upon initial stamping or cutout of the flat form of the beverage supported food box from material of composition as shown in FIG. 9 and other flat form embodiments. The bottom flaps 121 may comprise at least three sides, or at least four sides, or at least five sides, one of which is adhered, attached, or otherwise shared with a side wall bottom edge 106 as shown in FIG. 9. When configured for use, the side walls 101, 102, 103, 104, bottom 105 and/or bottom flaps 121 form an interior space 114.

As shown in FIGS. 1-13, the beverage supported food box 100 comprises at least one beverage flap 107. The beverage flap 107 comprises a top member 108, vertical member 110, and a bottom member 109. In certain optional embodiments, the top member 108 and the bottom member 109 may be parallel. The beverage flap end 111 connects to a side wall 101, 102, 103, 104. As shown, the beverage flap 107 connects to the first side wall 101 at the beverage flap end 111. The beverage flap 107 may be attached at the end 111 to the same side wall 101 it is connected to. The beverage flap 107 may comprise at least one or two, or more beverage apertures 112, or openings to receive a beverage container 130, FIG. 8. FIG. 8 illustrates how a beverage container 130 may be fitted through the beverage aperture(s) 112 formed when the beverage flap 107 is folded for use. Although the beverage flap 107 is shown attached to the exterior of the side wall 101, it can be envisioned that the beverage flap may be attached to the interior of a side wall 101. A customer's hand could hold the beverage container 130 and support the beverage flap 107 thereby supporting the beverage supported food box 100 in use.

Figure 3:
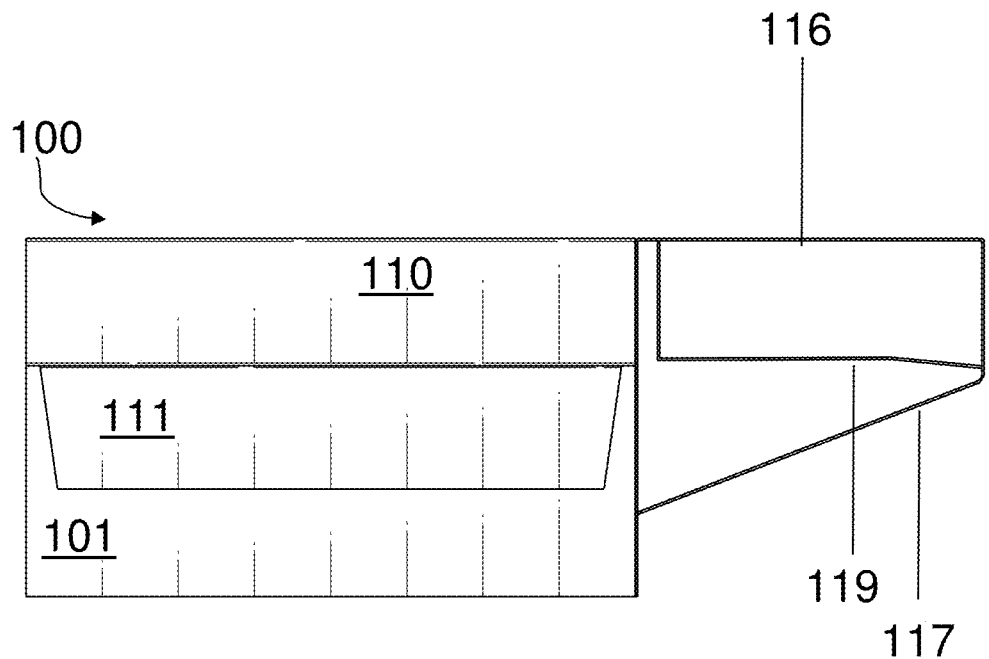
FIG. 3 is back-side view of the first embodiment of a beverage supported food box.

With reference to FIG. 1, the beverage flap 107 may be connected, via an end 111 to the same side wall 101, 102, 103, 104 in several ways. For instance, a friction lock may be used. In a friction lock, the end of the beverage flap 111 may be notched to form a tab that may be inserted into a slit in a side wall 101. In another embodiment, as shown in FIGS. 1 and 3, as well as in other figures, a beverage flap end 111 or portion of the beverage flap 107 may be connected, adhered to, or glued a side wall 101, 102, 103, 104 via adhesive material such that a portion of the beverage flap 107 lays flat against a portion of the side wall 101 and adhesive material is used to permanently or semi-permanently adhere the beverage flap 107 to the side wall 101. Adhesive material used may include but not be limited to a cold glue, hot melt glue, or other adhesive such as epoxy, polyurethane, or polyimide adhesives. The adhesive, in an embodiment, is compostable, in another embodiment, the adhesive may also be a BPI (Biodegradable Products Institute, New York, USA) certified compostable adhesive.

A cold glue is a type of glue, or adhesive, that comes in a thick liquid, or liquid, form and sets to a flexible bond when it's applied to porous materials. It forms a long-lasting bond that won't break down over time. Cold glue can be used to adhere a variety of materials together, including wood, fabric, paper, paper board, and more. A cold glue may also be ecologically friendly being water based and water soluble.

A hot melt glue, or hot-melt adhesive (HMA), is a form of thermoplastic adhesive that starts out as a solid and transforms into a liquid when heated. Once applied, the glue solidifies upon cooling, creating a strong bond between surfaces. Hot melt glue is made up of three main components: a polymer base, a tackifier, and various additives. The polymer base, which can be ethylene-vinyl acetate (EVA), polyurethane (PUR), or polyamide (PA), determines the overall characteristics of the glue.

With reference to FIGS. 1 and 8, the two beverage apertures 112 of the beverage flap 107 are designed to fit around a beverage container FIG. 8, 130 in the in-use beverage supported food box 100. This beverage container 130 may be a disposable, or recyclable beverage container made from metal, as an example aluminum, plastic, or paper products, or other beverage container such as a reusable beverage container 130 with varying dimensions, being a bottle, can, or cup. The at least one or two beverage apertures FIG. 1, 112 may be different sizes, one being smaller or larger than the other, or they may be the same size. As shown in FIGS. 1, 6, 7, and 8, the two beverage apertures 112 may be round or substantially round. Beverage apertures 112 may be oval, square, or rectangular, or any shape designed to receive a specific beverage container 130. In an example each of the beverage apertures 112 may have a width of at least one inch, or at least 1.1 inches, or at least 1.2 inches, or at least 1.3 inches, or at least 1.4 inches, or at least 1.5 inches, or at least 1.6 inches, or at least 1.7 inches, or at least 1.8 inches, or at least 1.9 inches, or at least 2 inches, or at least 2.1 inches, or at least 2.2 inches, or at least 2.3 inches, or at least 2.4 inches, or at least 2.5 inches, or at least 2.6 inches, or at least 2.7 inches, or at least 2.8 inches, or at least 2.9 inches, or at least 3.1 inches, or at least 3.2 inches, or at least 3.3 inches, or at least 3.4 inches, or at least 3.5 inches, or at least 3.6 inches, or at least 3.7 inches, or at least 3.8 inches, or at least 3.9 inches, or at least 4 inches, or at least 4.1 inches, or at least 4.2 inches, or at least 4.3 inches, or at least 4.4 inches, or at least 4.5 inches or at least 4.6 inches or at least 4.7 inches, or at least 4.8 inches, or at least 4.9 inches, or at least 5 inches or more.

The beverage flap 107 may span the entire length of the side wall 101, 102, 103, 104 it is connected to. In another embodiment the beverage flap 107 may span less than the entire length of the side wall 101 it is connected to. In another embodiment, the beverage flap 107 may span longer than the side wall it is connected to, having a trapezoidal shape for instance. The beverage flap 107, when folded and connected to its side wall 101, comprises a top horizontal member 108, vertical member 110, and bottom horizontal member 109 formed by folding the beverage flap 107. The top span 108 and bottom span 109 may be connected to the side wall at an angle, wherein the angle may be from 0-180 degrees, or 0 degrees, or 1 degree, or 5 degrees, or 10 degrees, or 15 degrees, or 20 degrees, or 25 degrees, or 30 degrees, or 45 degrees, or 50 degrees, or 55 degrees, or 60 degrees, or 65 degrees, or 70 degrees, or 75 degrees, or 80 degrees, or 90 degrees, or 95 degrees, or 100 degrees, or 115 degrees, or 120 degrees, or 125 degrees, or 130 degrees, or 135 degrees, or 140 degrees, or 145 degrees, or 150 degrees, or 155 degrees, or 160 degrees, or 165 degrees, or 170 degrees, or 175 degrees, or 179 degrees, or 180 degrees.

With reference to FIGS. 1-13, the beverage supported food box 100 is formed from a semi-rigid material which can be folded. A material that is re-usable or recyclable is preferred. A material that is compostable is preferred. A material that is a BPI certified compostable material is preferred. These materials may be but are not limited to metals, metal alloys, plastics, wood products, paper products, paper board, bamboo, and hemp. A compostable material for example may be a compostable paper, a compostable wood product, a compostable plastic, a compostable bamboo, a compostable paper board, and a compostable hemp.

The beverage supported food box 100 may be formed from a material that may be coated, the coating may include coatings designed to prevent grease or other food products from seeping into or through the material, and/or coatings designed to protect the integrity of the box material and/or any printing or ink on the box. These coatings may be compostable in nature. In other examples, material of the food boxes disclosed herein may intrinsically contain or be manufactured with a coating such as a grease barrier, preventing grease or other food product from seeping into or through the box material. A grease barrier coating may be applied to the interior 114 surfaces of the example food boxes described herein. The grease barrier coating may also be applied to an exterior surface. In another example, a heat-resistant coating may be applied to the outside surfaces of the example boxes. The heat resistance coating may help maintain the integrity of the box material and prevent ink or printings from melting or otherwise deforming, especially if the boxes are placed under heat lamps or warming ovens to keep the food inside warm. Examples of coatings may include waxes, plastics, compostable plastics, heat resistant aqueous and nonaqueous coatings, acrylic, and waterborne acrylic coatings.

When folded as illustrated in FIGS. 1-8, the four side walls 101, 102, 103, and 104 form a five-sided three-dimensional shape with an interior space 114 designed to receive and hold a food item 150, or multiple food items 150. The three-dimensional shape of the beverage supported food box 100 may include a square or rectangle. It can be envisioned that a folded beverage supported food box 500, 600, 700 as illustrated in FIGS. 38-40 may have one side wall 601, 701 or two side walls, or three side walls, or four side walls, or five side walls, or six side walls, or seven side walls, or eight side walls, or more.

The overall dimensions of the beverage supported food box 100, 200, 300, 400, 500, 600, 700 or other food boxes described herein, include a length, along an x axis, a depth, along a y axis, and a width, along a z axis. The x axis, or x-coordinate axis, y axis, or y-coordinate axis, and z axis, or x-coordinate axis follow the Cartesian coordinate system. Thus the beverage supported food box 100, 200, 300, 400, 500, 600, 700 may have a length, not including an example beverage flap or condiment flap, at a top edge of a side wall, of at least one inch, or at least 1.1 inches, or 1.2 inches, or 1.3 inches, or 1.4 inches, or 1.5 inches, or 1.6 inches, or 1.7 inches, or 1.8 inches, or 1.9 inches, or 2 inches, or 2.1 inches, or 2.2 inches, or 2.3 inches, or 2.4 inches, or 2. 5 inches, or 2.6 inches, or 2.7 inches, or 2.8 inches, or 2.9 inches, or 3 inches, or 3.1 inches, or at least 3.2 inches, or at least 3.3 inches, or at least 3.4 inches, or at least 3.5 inches, or at least 3.6 inches, or at least 3.7 inches, or at least 3.8 inches, or at least 3.9 inches, or at least 4 inches, or at least 4.1 inches, or at least 4.2 inches, or at least 4.3 inches, or at least 4.4 inches, or at least 4.5 inches or at least 4.6 inches or at least 4.7 inches, or at least 4.8 inches, or at least 4.9 inches, or at least 5 inches, or at least 5.1 inches, or at least 5.2 inches, or at least 5.3 inches, or at least 5.4 inches, or at least 5.5 inches, or at least 5.6 inches, or at least 5.7 inches, or at least 5.8 inches, or at least 5.9 inches, or at least 6 inches, or at least 6.1 inches, or at least 6.2 inches, or at least 6.3 inches, or at least 6.4 inches, or at least 6.5 inches or at least 6.6 inches or at least 6.7 inches, or at least 6.8 inches, or at least 6.9 inches, or at least 7 inches, or at least 7.1 inches, or at least 7.2 inches, or at least 7.3 inches, or at least 7.4 inches, or at least 7.5 inches, or at least 7.6 inches, or at least 7.7 inches, or at least 7.8 inches, or at least 7.9 inches, or at least 8 inches, or at least 8.1 inches, or at least 8.2 inches, or at least 8.3 inches, or at least 8.4 inches, or at least 8.5 inches or at least 8.6 inches or at least 8.7 inches, or at least 8.8 inches, or at least 8.9 inches, or at least 9 inches, or 10 inches, or more, in length.

The beverage supported food box 100, 200, 300, 400, 500, 600, 700, or other food boxes described herein, may be, not including an example beverage flap or condiment flap, at least one inch in depth, or at least 1.1 inches, or 1.2 inches, or 1.3 inches, or 1.4 inches, or 1.5 inches, or 1.6 inches, or 1.7 inches, or 1.8 inches, or 1.9 inches, or 2 inches, or 2.1 inches, or 2.2 inches, or 2.3 inches, or 2.4 inches, or 2.5 inches, or 2.6 inches, or 2.7 inches, or 2.8 inches, or 2.9 inches, or 3 inches, or 3.1 inches, or at least 3.2 inches, or at least 3.3 inches, or at least 3.4 inches, or at least 3.5 inches, or at least 3.6 inches, or at least 3.7 inches, or at least 3.8 inches, or at least 3.9 inches, or at least 4 inches, or at least 4.1 inches, or at least 4.2 inches, or at least 4.3 inches, or at least 4.4 inches, or at least 4.5 inches or at least 4.6 inches or at least 4.7 inches, or at least 4.8 inches, or at least 4.9 inches, or at least 5 inches, or at least 5.1 inches, or at least 5.2 inches, or at least 5.3 inches, or at least 5.4 inches, or at least 5.5 inches, or at least 5.6 inches, or at least 5.7 inches, or at least 5.8 inches, or at least 5.9 inches, or at least 6 inches, or at least 6.1 inches, or at least 6.2 inches, or at least 6.3 inches, or at least 6.4 inches, or at least 6.5 inches or at least 6.6 inches or at least 6.7 inches, or at least 6.8 inches, or at least 6.9 inches, or at least 7 inches, or at least 7.1 inches, or at least 7.2 inches, or at least 7.3 inches, or at least 7.4 inches, or at least 7.5 inches, or at least 7.6 inches, or at least 7.7 inches, or at least 7.8 inches, or at least 7.9 inches, or at least 8 inches, or at least 8.1 inches, or at least 8.2 inches, or at least 8.3 inches, or at least 8.4 inches, or at least 8.5 inches or at least 8.6 inches or at least 8.7 inches, or at least 8.8 inches, or at least 8.9 inches, or at least 9 inches, or 10 inches, or more, in depth.

The beverage supported food box 100, 200, 300, 400, 500, 600, 700, or other food service boxes disclosed herein may be, not including an example beverage flap or condiment flap, at least one inch in width, or at least one inch in depth, or at least 1.1 inches, or 1.2 inches, or 1.3 inches, or 1.4 inches, or 1.5 inches, or 1.6 inches, or 1.7 inches, or 1.8 inches, or 1.9 inches, or 2 inches, or 2.1 inches, or 2.2 inches, or 2.3 inches, or 2.4 inches, or 2.5 inches, or 2.6 inches, or 2.7 inches, or 2.8 inches, or 2.9 inches, or 3 inches, or 3.1 inches, or at least 3.2 inches, or at least 3.3 inches, or at least 3.4 inches, or at least 3.5 inches, or at least 3.6 inches, or at least 3.7 inches, or at least 3.8 inches, or at least 3.9 inches, or at least 4 inches, or at least 4.1 inches, or at least 4.2 inches, or at least 4.3 inches, or at least 4.4 inches, or at least 4.5 inches or at least 4.6 inches or at least 4.7 inches, or at least 4.8 inches, or at least 4.9 inches, or at least 5 inches, or at least 5.1 inches, or at least 5.2 inches, or at least 5.3 inches, or at least 5.4 inches, or at least 5.5 inches, or at least 5.6 inches, or at least 5.7 inches, or at least 5.8 inches, or at least 5.9 inches, or at least 6 inches, or at least 6.1 inches, or at least 6.2 inches, or at least 6.3 inches, or at least 6.4 inches, or at least 6.5 inches or at least 6.6 inches or at least 6.7 inches, or at least 6.8 inches, or at least 6.9 inches, or at least 7 inches, or at least 7.1 inches, or at least 7.2 inches, or at least 7.3 inches, or at least 7.4 inches, or at least 7.5 inches, or at least 7.6 inches, or at least 7.7 inches, or at least 7.8 inches, or at least 7.9 inches, or at least 8 inches, or at least 8.1 inches, or at least 8.2 inches, or at least 8.3 inches, or at least 8.4 inches, or at least 8.5 inches or at least 8.6 inches or at least 8.7 inches, or at least 8.8 inches, or at least 8.9 inches, or at least 9 inches, or 10 inches, or more, in width.

As shown in FIGS. 1-13, the beverage supported food box 100 may additionally comprise at least one condiment holder being a condiment flap 115 comprising a top member 116, a bottom member 117, and a vertical member 118. In certain optional embodiments, the bottom member 117 may be angled relative to the top member 116. Although this condiment flap 115 is described in the present as receiving a condiment, being food items like ketchup, mustard, mayonnaise, pickles, onions, or the like, the condiment flap(s) described herein 115 may also be designed to receive a dipping sauce such as a cheese, barbecue or other sauce. In other examples the condiment flap 115 may be designed to receive any additional food item, non-limiting examples being a salad, pasta, French fries, or vegetable item. The condiment flap 115 may be connected to a side wall 104 at the top of the side wall 213 at a first end of the condiment flap 313. The beverage supported food box may comprise multiple condiment flaps 115, being at least two, or at least three, or at least four. A second end 126 of the condiment flap attaches to a side wall 104. The condiment flap 115 comprises at least one condiment cutout 119 to receive a condiment cup 140, FIG. 8. This condiment cutout 119 is generally round to conform to the shape of a condiment cup 140, also known as a ramekin, or sauce cup, but may take other shapes or receive alternate forms of condiment or accessory food item containers. As shown in FIGS. 1 and 9, the condiment cutout 119 may comprise a cutout folded or depressed during use to meet a portion of the side wall 104 and in some cases a portion of the bottom horizontal member 117 of the condiment flap 115. In alternate versions of the beverage supported food box 400, FIG. 26, the condiment cutout 119 may be adhered to the bottom horizontal member 117 during the manufacturer's assembly process. The condiment cutout 119 may be designed to fold in a portion of the vertical member 118 of the condiment flap as shown in FIG. 1. Alternately the condiment cutout 119 may be designed to fold in a portion of the side wall 104 as shown for beverage supported food box 400, FIG. 26. The dimensions and shape of the condiment cutout 119 allows a lip of a condiment cup 140 to set atop the condiment horizontal member 116 and sit in the condiment cutout 119 securely. This ensures that the condiment cup 140 will not fall out or be pushed through the condiment flap 115 or bottom horizontal member of the flap 117 opening during use. The bottom of a condiment cup may for instance rest on the condiment cutout 119 and/or bottom horizontal member 117.

Figure 4:
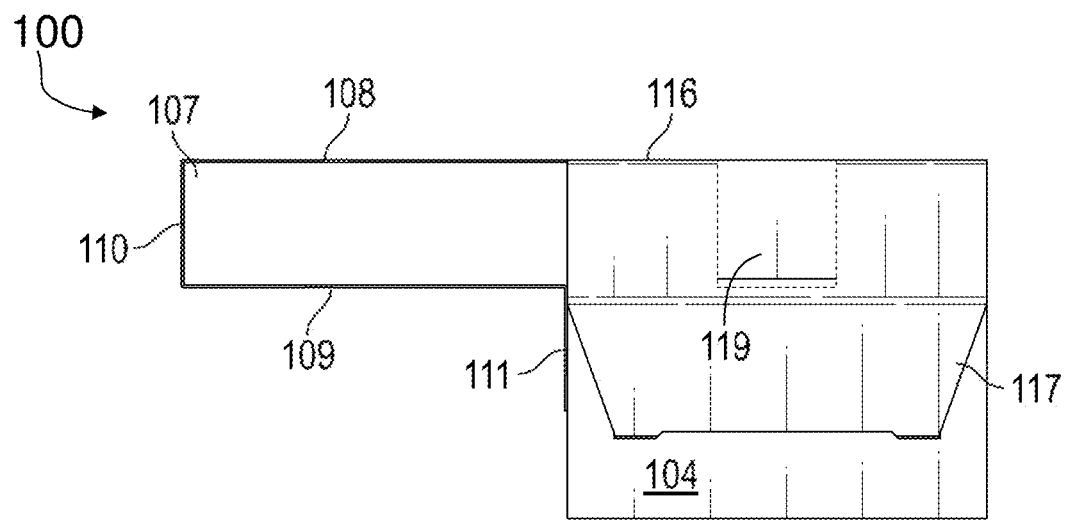
FIG. 4 is a left-side view of the first embodiment of a beverage supported food box.
Figure 5:
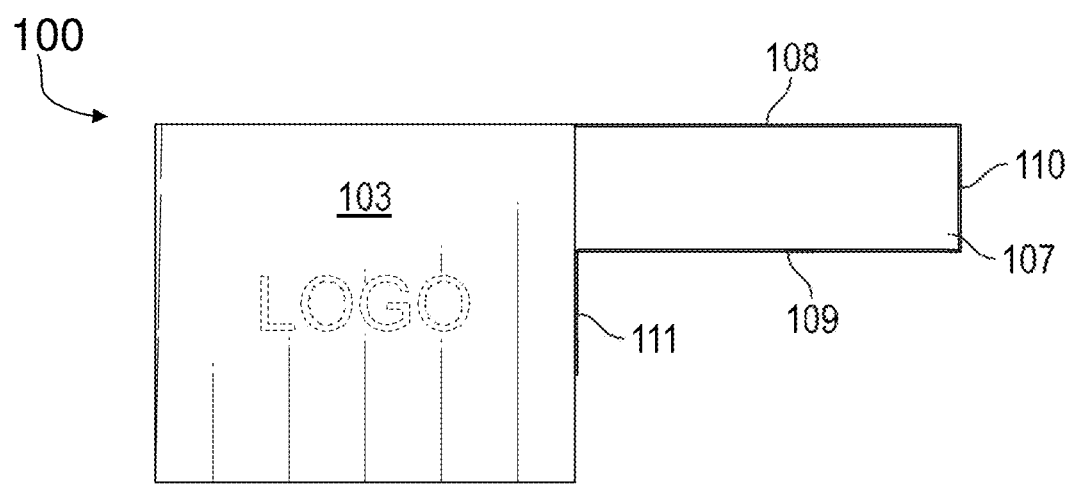
FIG. 5 is a right-side view of the first embodiment of a beverage supported food box, wherein the LOGO is positioned on the right side of the beverage supported food box.
Figure 6:
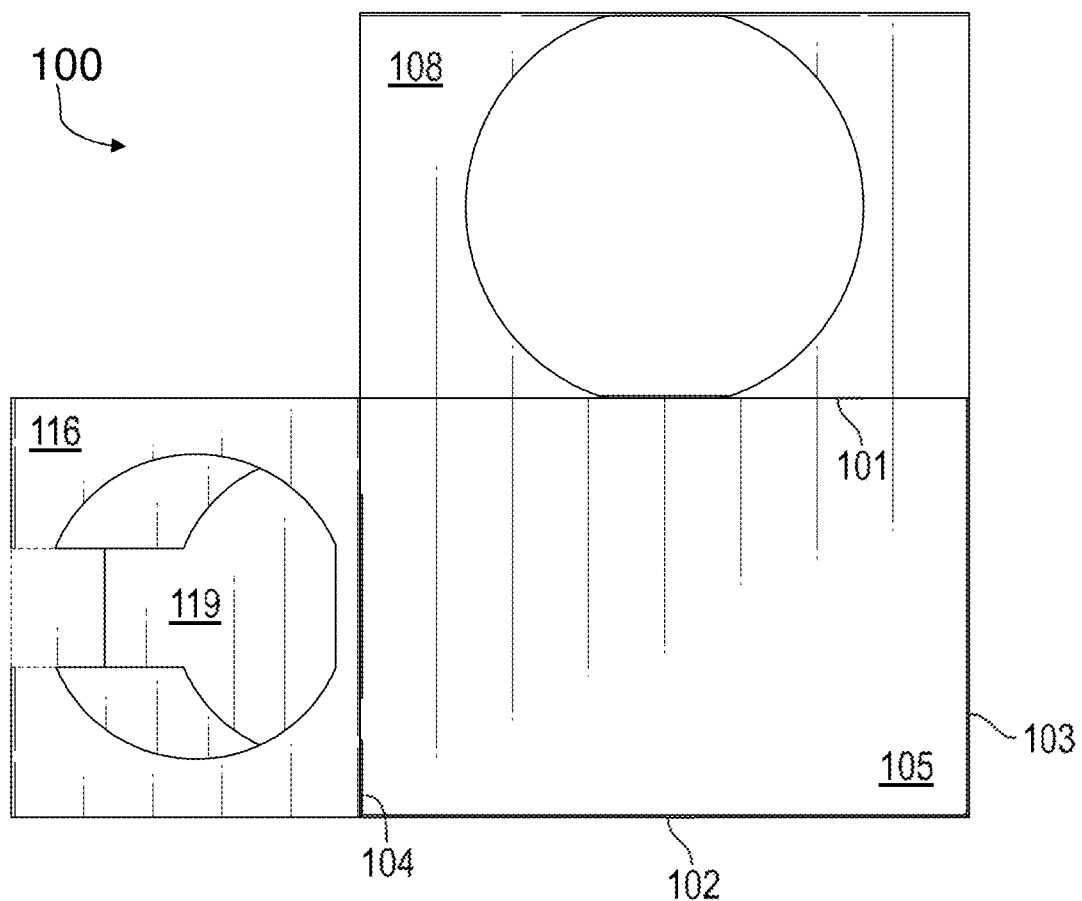
FIG. 6 is a top-side view of the first embodiment of a beverage supported food box.
Figure 26:
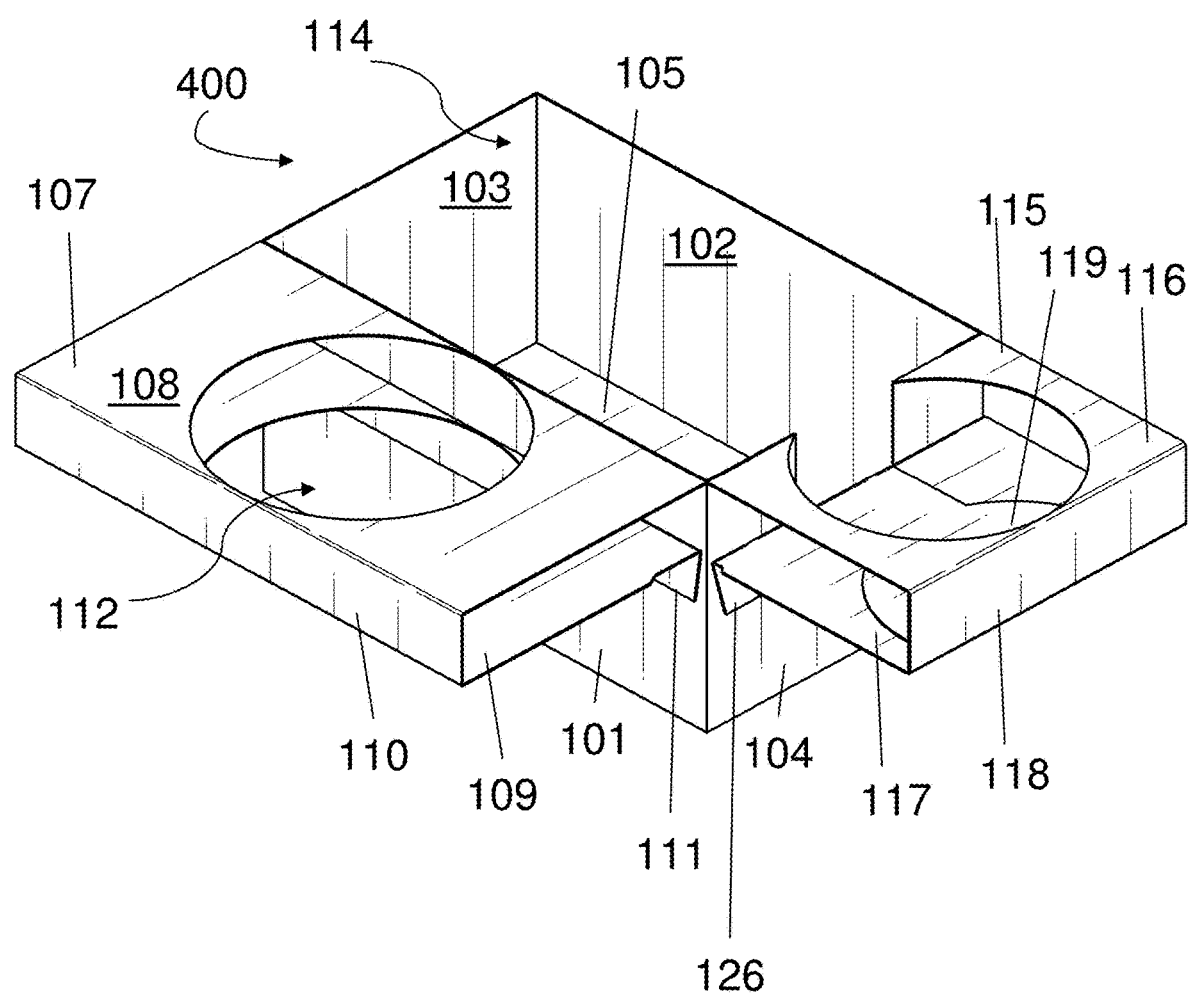
FIG. 26 is a top-perspective view of a fourth embodiment of a beverage supported food box configured for end consumer use.
Figure 27:
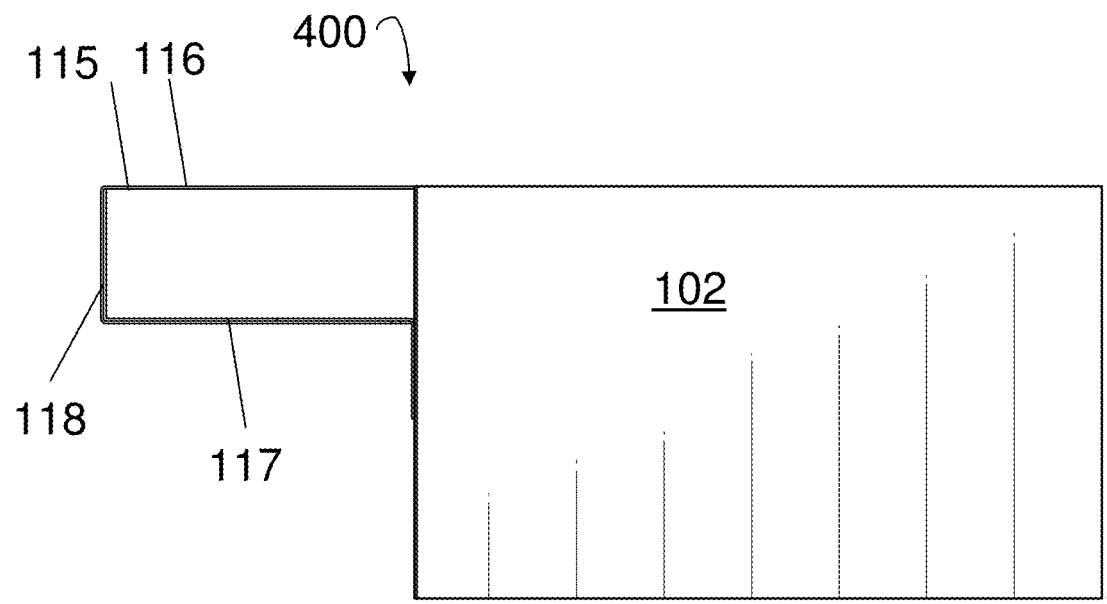
FIG. 27 is a front-side view of the fourth embodiment of a beverage supported food box.
Figure 28:
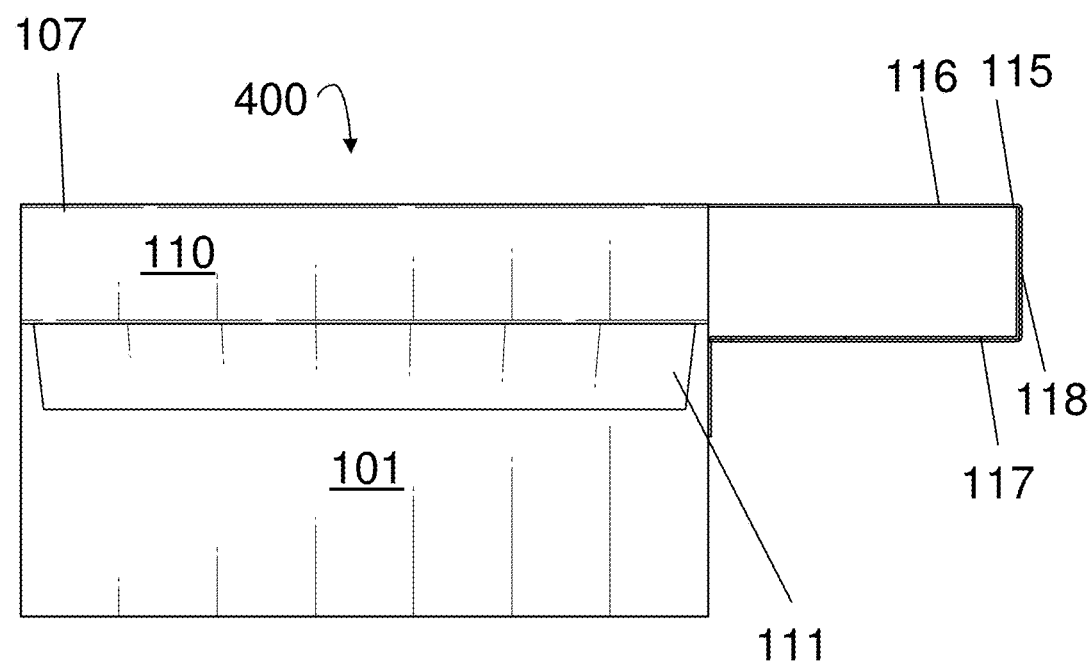
FIG. 28 is back-side view of the fourth embodiment of a beverage supported food box.
Figure 29:
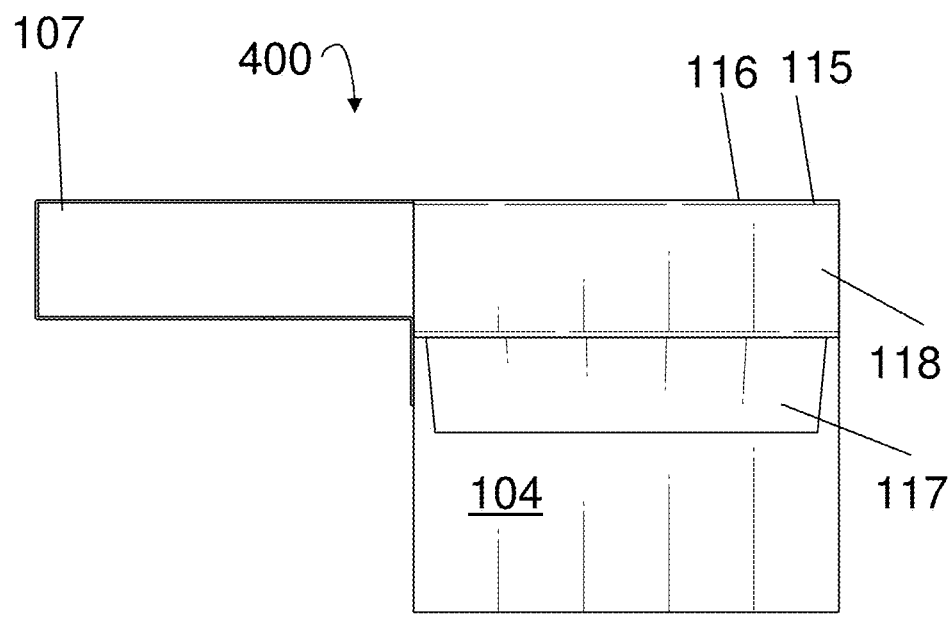
FIG. 29 is a left-side view of the fourth embodiment of a beverage supported food box.
Figure 30:
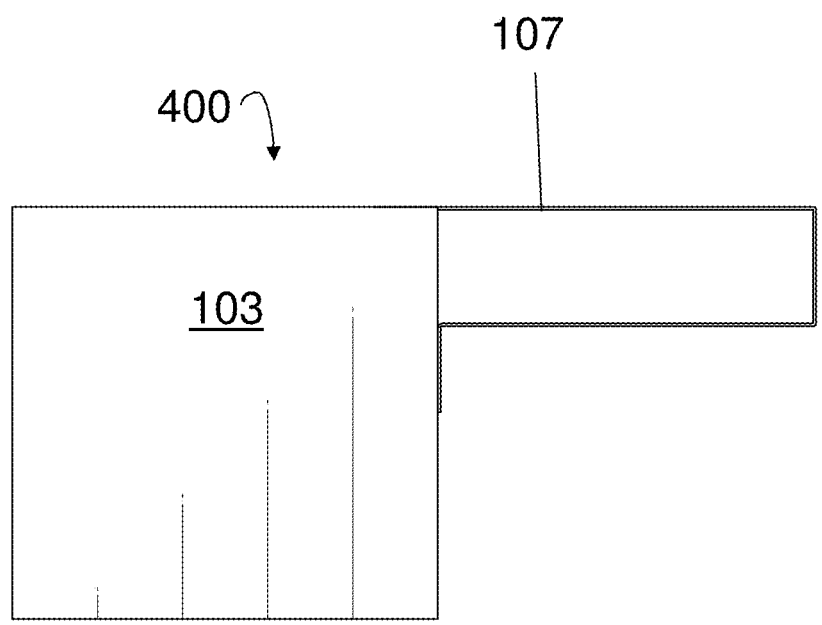
FIG. 30 is a right-side view of the fourth embodiment of a beverage supported food box.

In folded, in-use configuration, the condiment flap 115 is folded to the exterior of the food box 100 to comprise a top horizontal member 116 that may substantially form a 90 degree angle with the side wall 104 it is attached to. In other words, the top horizontal member 116 may lay substantially horizontally. The condiment flap 115 further comprises a vertical member 118 that may form an angle of about, or substantially 90 degrees to the top horizontal member 116. The condiment flap 115 further comprises a bottom member 117 that may be angled to meet the side wall 104 at an angle of about 90 to about 175 degrees from the vertical member 118 and attached to the side wall 104 via a friction lock system as shown in FIGS. 1 and 4 or attached to the side wall 104 via adhesion or gluing as shown in FIG. 26. In certain optional embodiments, the top horizontal member 116 may be parallel to the bottom member 117.

In a second embodiment, the beverage supported food box 200 may further comprise a utensil holder cutout 125 as illustrated in FIGS. 14-17. This utensil holder cutout may be used in any of the embodied food boxes described herein. The utensil holder cutout 125 may be designed as a utensil cutout 125 in one of the corners of the food box as shown, at the top edge 213 of two side walls 101, 102, 103, 104. Alternately, the utensil holder 125 may be designed into one of the side walls 101, 102, 103, 104. The utensil holder is shown as formed from a cutout in the material of the food box 100, but also may be formed using an additional piece of box material attached to or adhered to a food box.

The beverage supported food box 100, 200, 300, 400, 500, 600, 700 and food service boxes 800, 900 described herein are designed with cost of materials, cost of manufacture, cost of assembly during manufacturing, time of assembly during manufacturing and especially time for vendor assembly, cost of shipping, and ease of user use of a vendor food service agent and end user in mind. To this end, as shown in FIGS. 9, 25, 33, 48, and 61 the food boxes may be cut or stamped from a semi-rigid material as a single flat sheet. Methods for cutting or stamping, for example a semi-rigid compostable paper product, are known in the industry and may include but are not limited to forming a cut mould, a cutting die, an example being a steel rule cutting die, that is pressed to the paper product that creates the single flat sheet with beverage apertures 112, condiment cutout 119, and slit 122 to receive ends 111, 126 of beverage flap 107 and/or condiment flap 115, and utensil cutout, if any. Before or after cutting, the beverage supported food box 100, or other food boxes disclosed herein, may be printed to make the configured food box a particular color and/or print an image or word, or words, that may be a logo, printed or otherwise marked, stamped, cut, etched, or laser printed onto the single flat food box 100. The design of the food box 100 enables the device to be a low cost, easy to assemble, easy to manufacture, and easy to use device with a one-step assembly by a food vendor.

Figure 10:
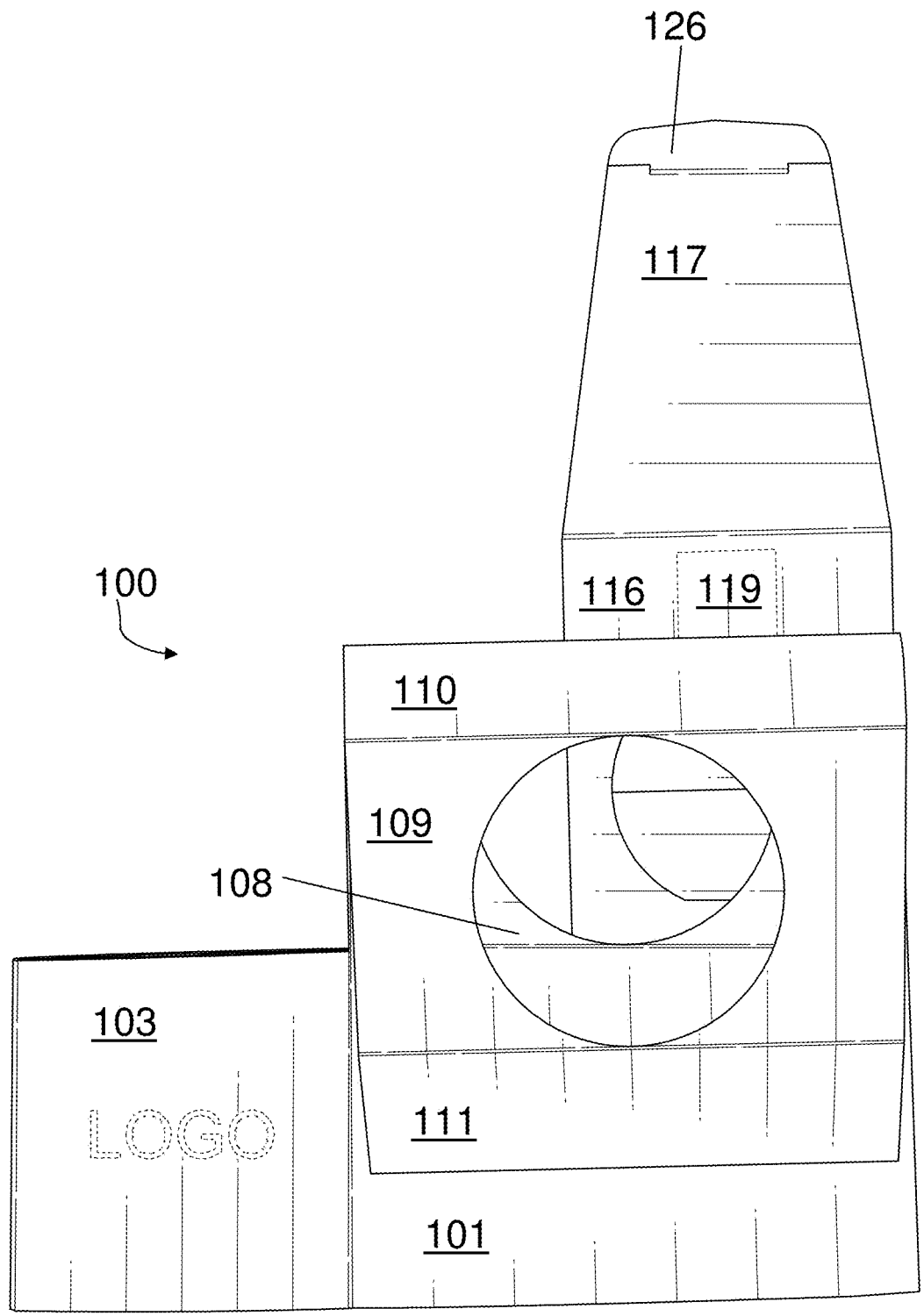
FIG. 10 is a left-side view of the first embodiment of a beverage supported food box flat-folded ready-to-ship following manufacturer assembly.
Figure 11:
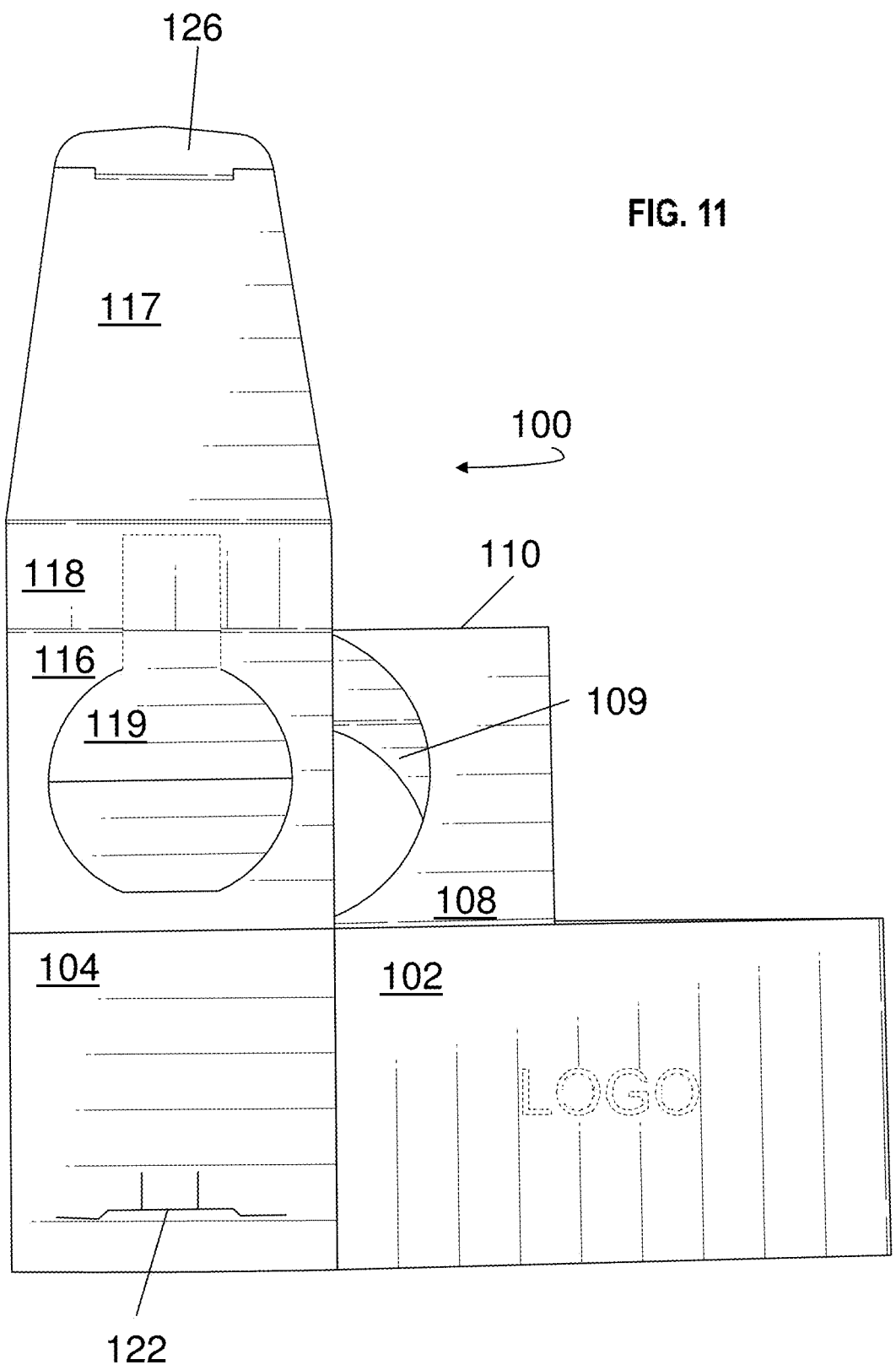
FIG. 11 is a right-side view of the first embodiment of a beverage supported food box flat-folded ready-to-ship following manufacturer assembly.
Figure 12:
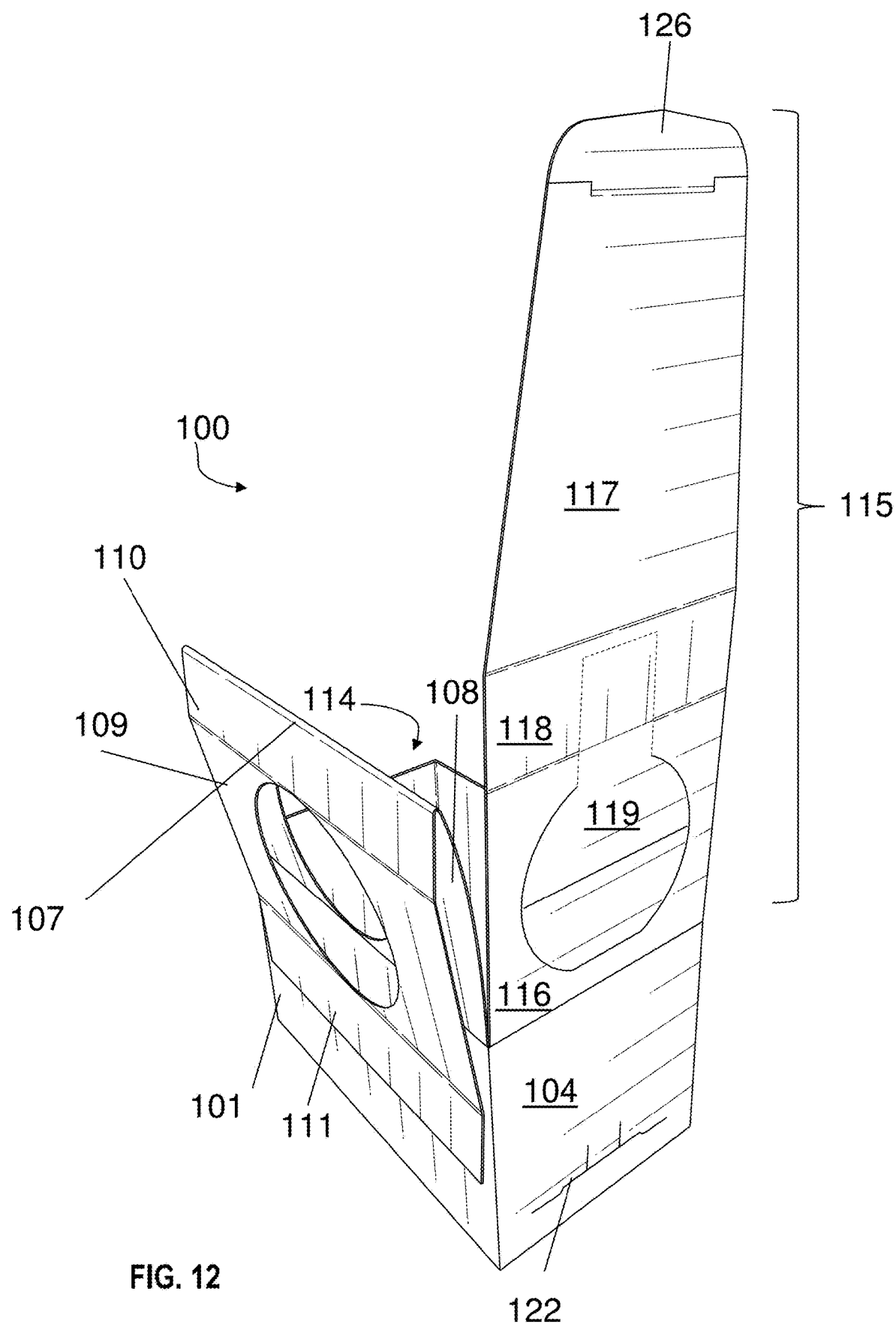
FIG. 12 is a perspective view of the first embodiment of a beverage supported food box, partially unfolded prior to vendor use.
Figure 13:
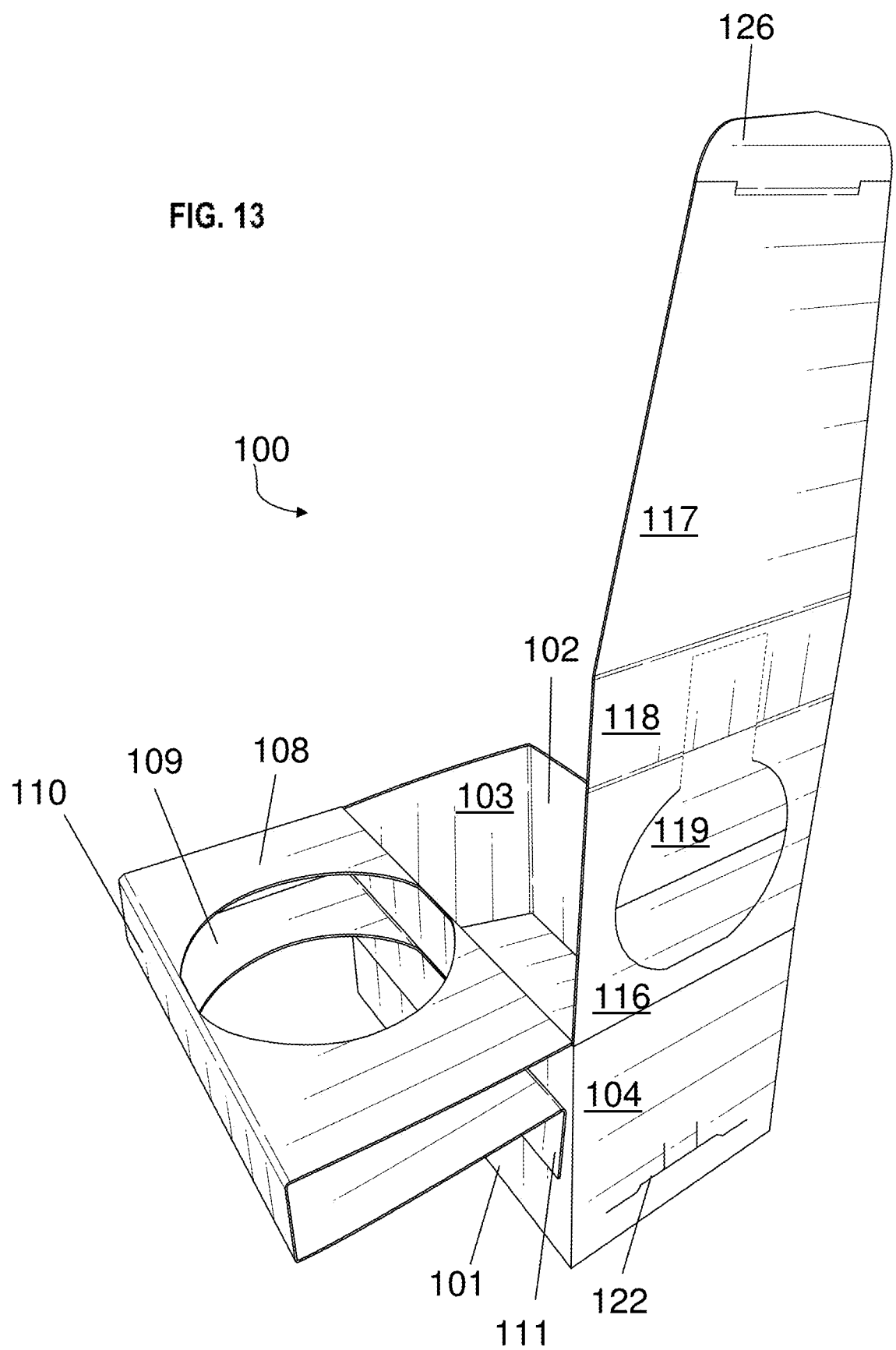
FIG. 13 is a perspective view of the first embodiment of a beverage supported food box, partially unfolded prior to vendor use.
Figure 14:
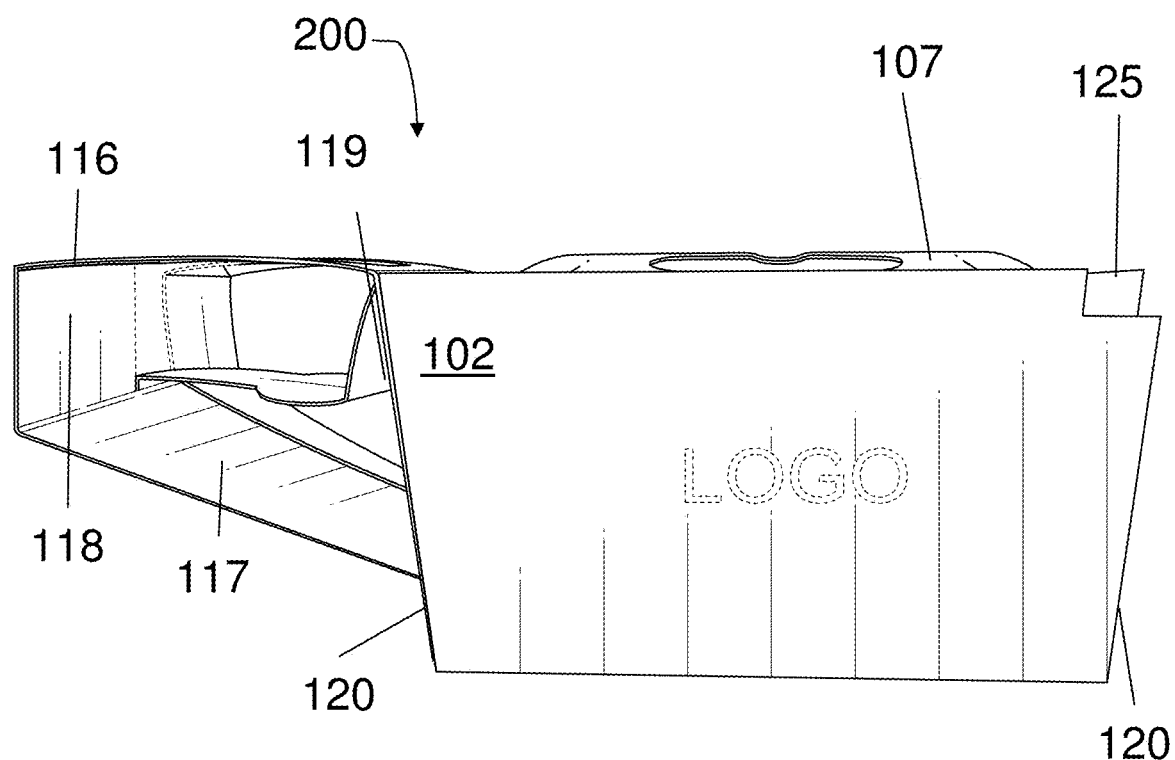
FIG. 14 is a front-perspective view of a second embodiment of a beverage supported food box with a utensil holder cutout configured for end consumer use.
Figure 15:
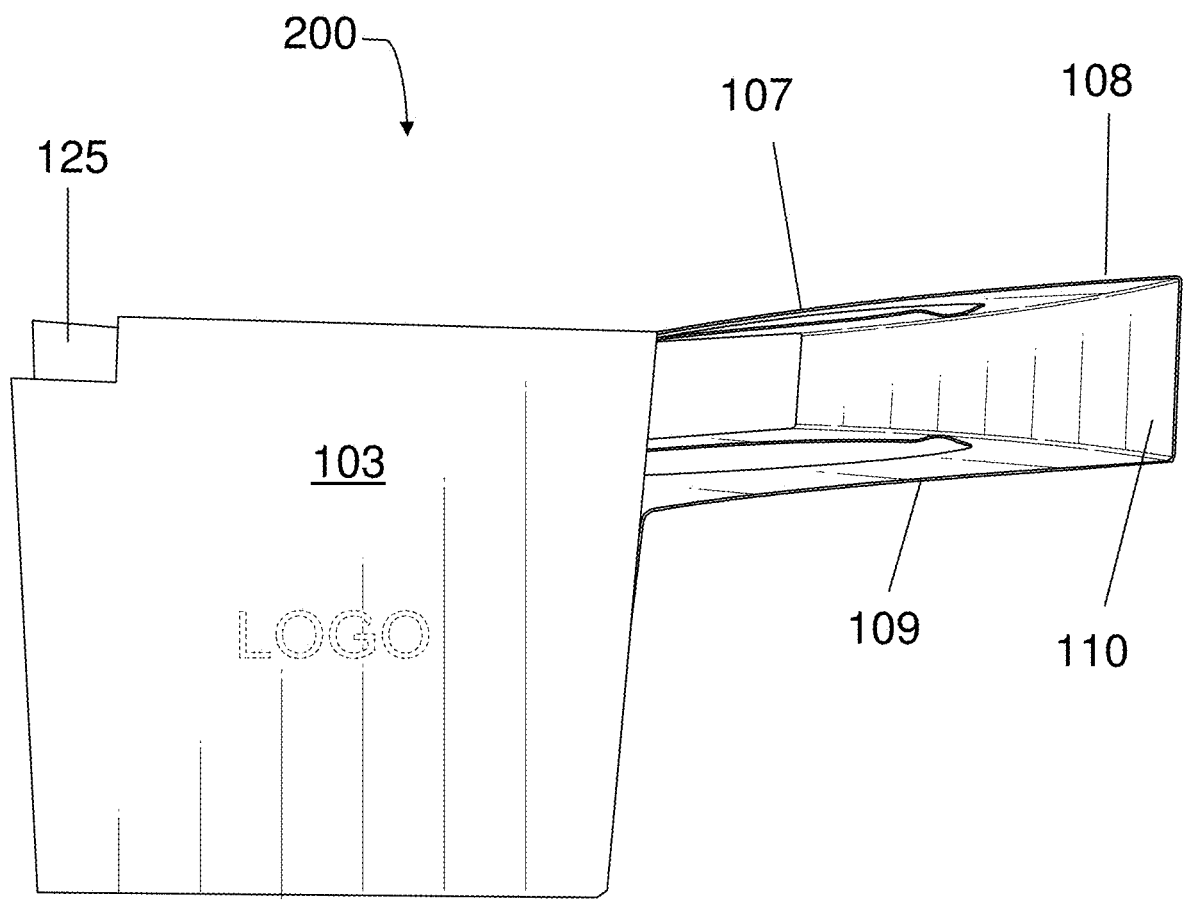
FIG. 15 is a right-side view of the second embodiment of a beverage supported food box with a utensil holder cutout.
Figure 16:
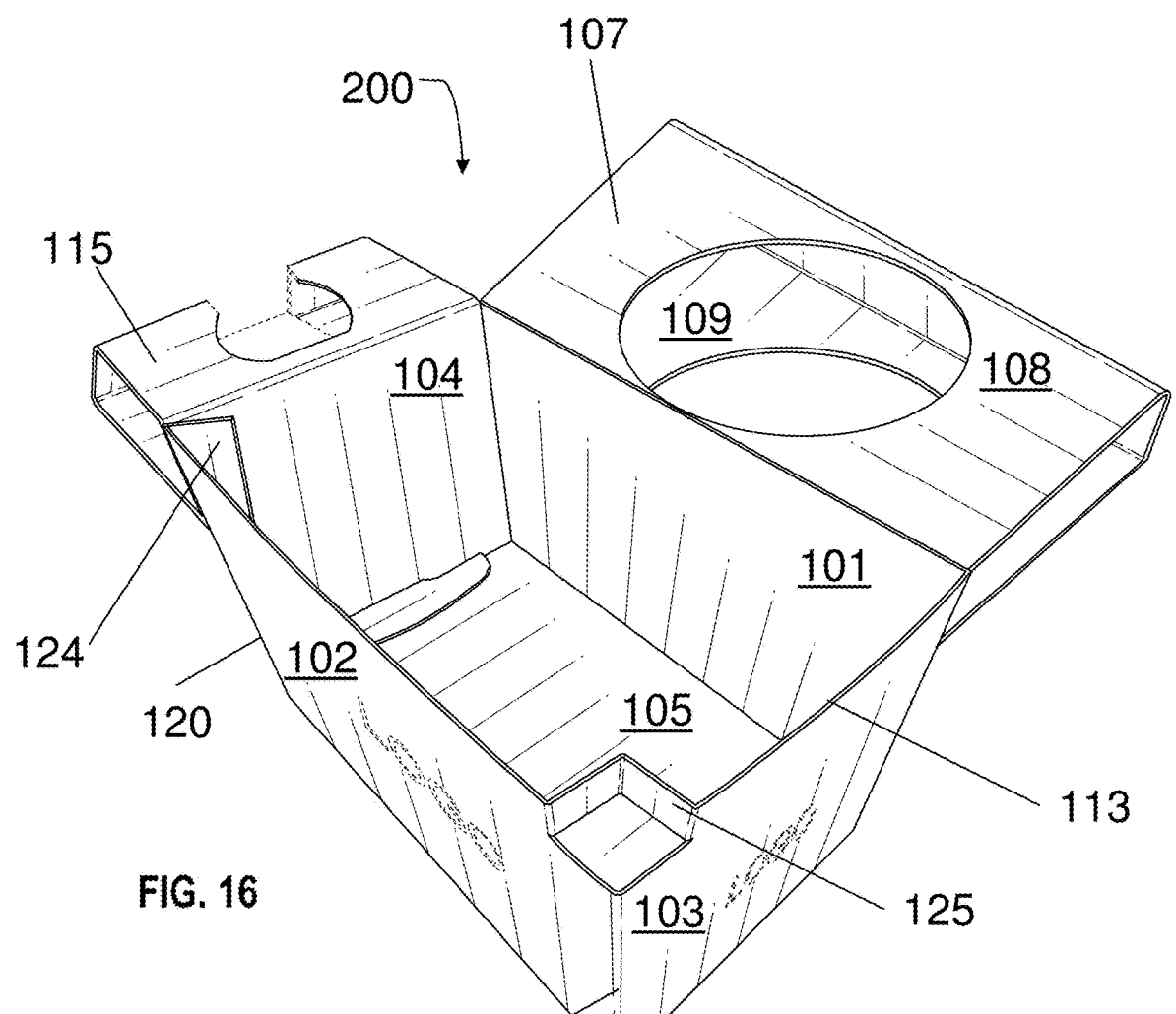
FIG. 16 is a top-perspective view of the second embodiment of a beverage supported food box with a utensil holder cutout configured for end consumer use.
Figure 17:
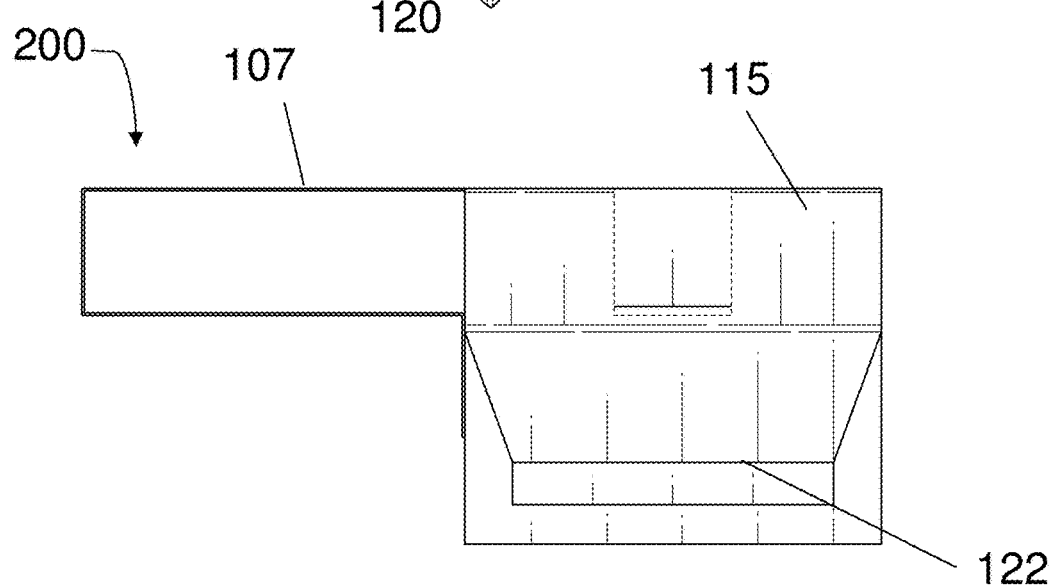
FIG. 17 is a left-side view of the second embodiment of a beverage supported food box with a utensil holder cutout.
Figure 18:
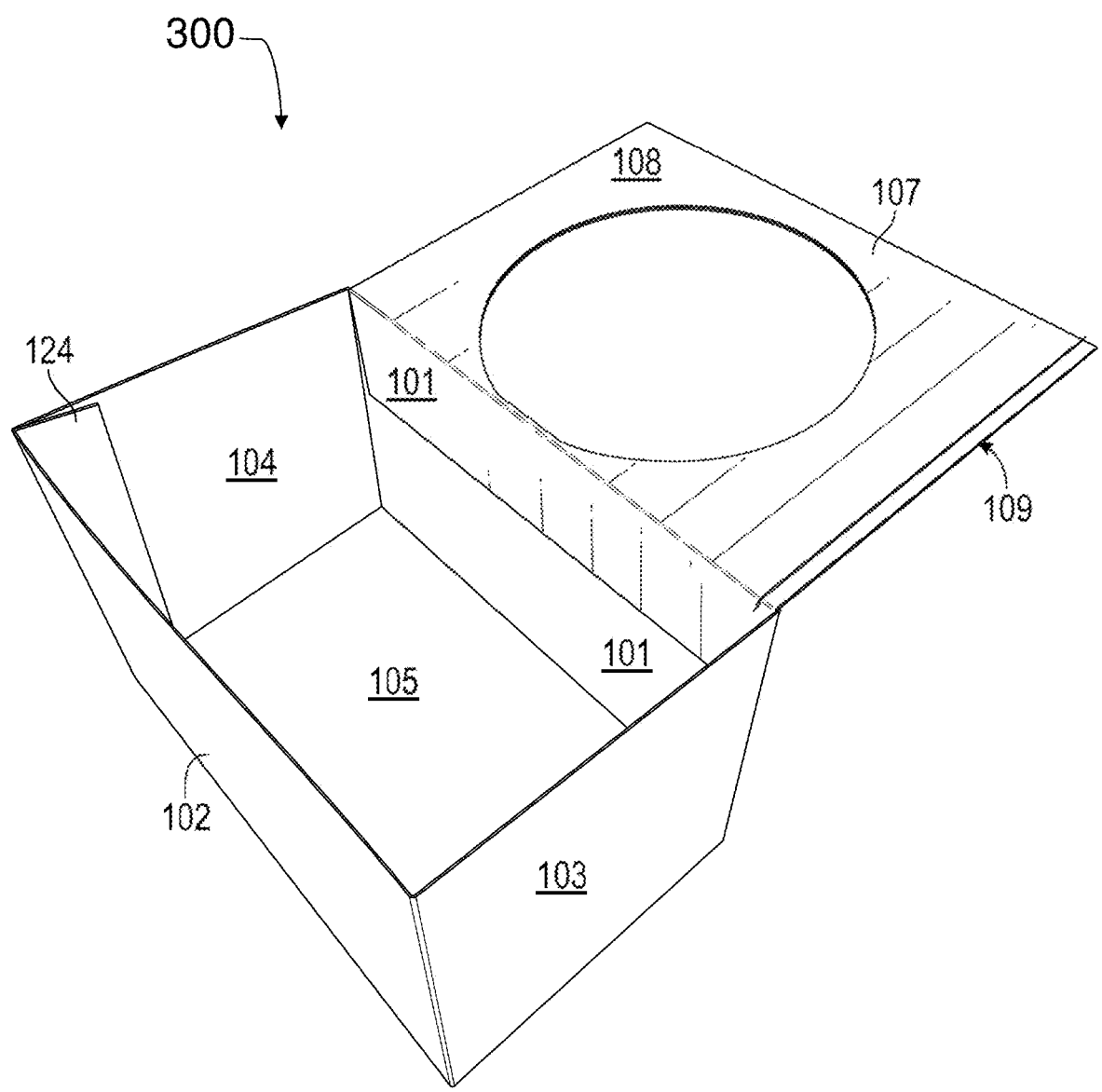
FIG. 18 is a top perspective view of a third embodiment of a beverage supported food box configured for end consumer use.
Figure 19:
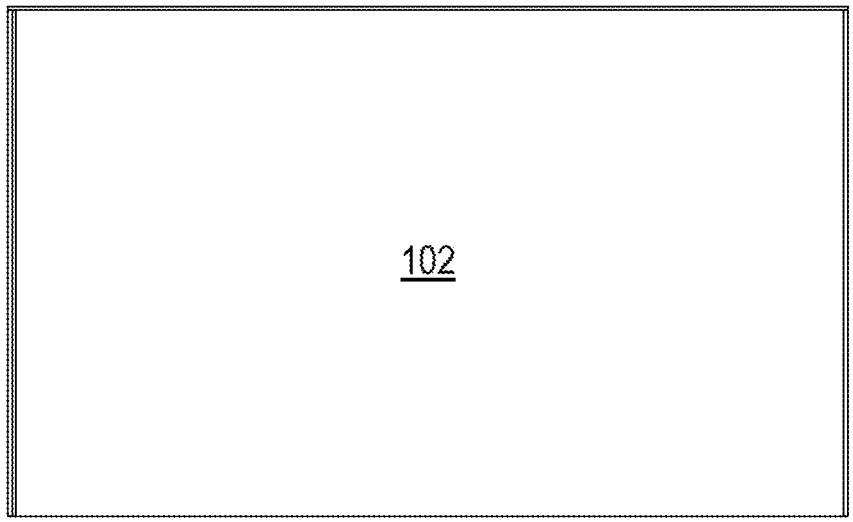
FIG. 19 is a front-side view of the third embodiment of a beverage supported food box, wherein the LOGO is positioned on the front of the beverage supported food box.
Figure 20:
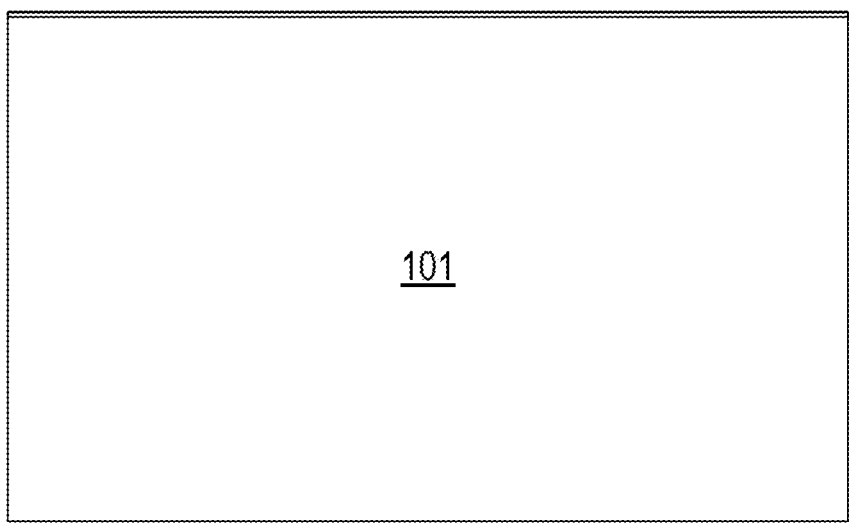
FIG. 20 is back-side view of the third embodiment of a beverage supported food box.
Figure 21:
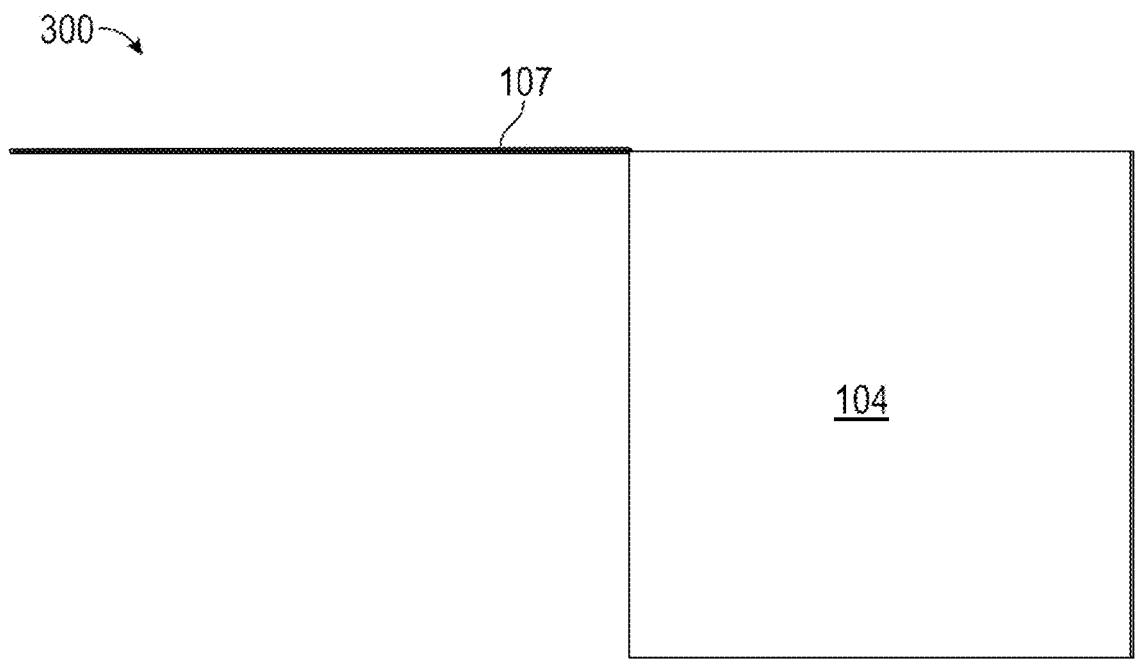
FIG. 21 is a left-side view of the third embodiment of a beverage supported food box.
Figure 22:
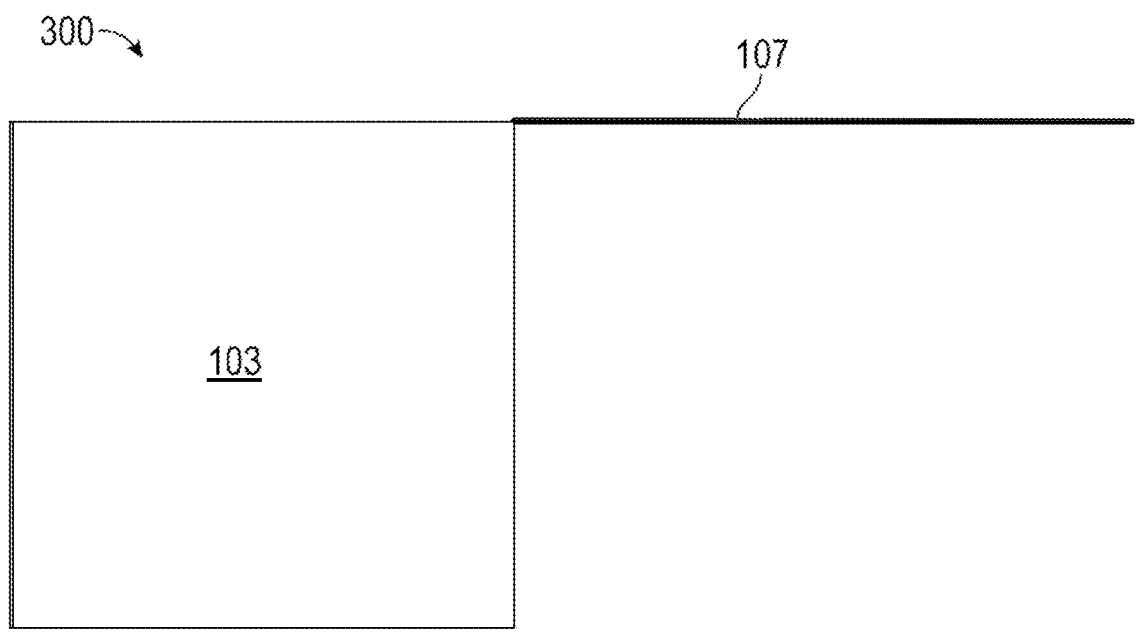
FIG. 22 is a right-side view of the third embodiment of a beverage supported food box.
Figure 23:
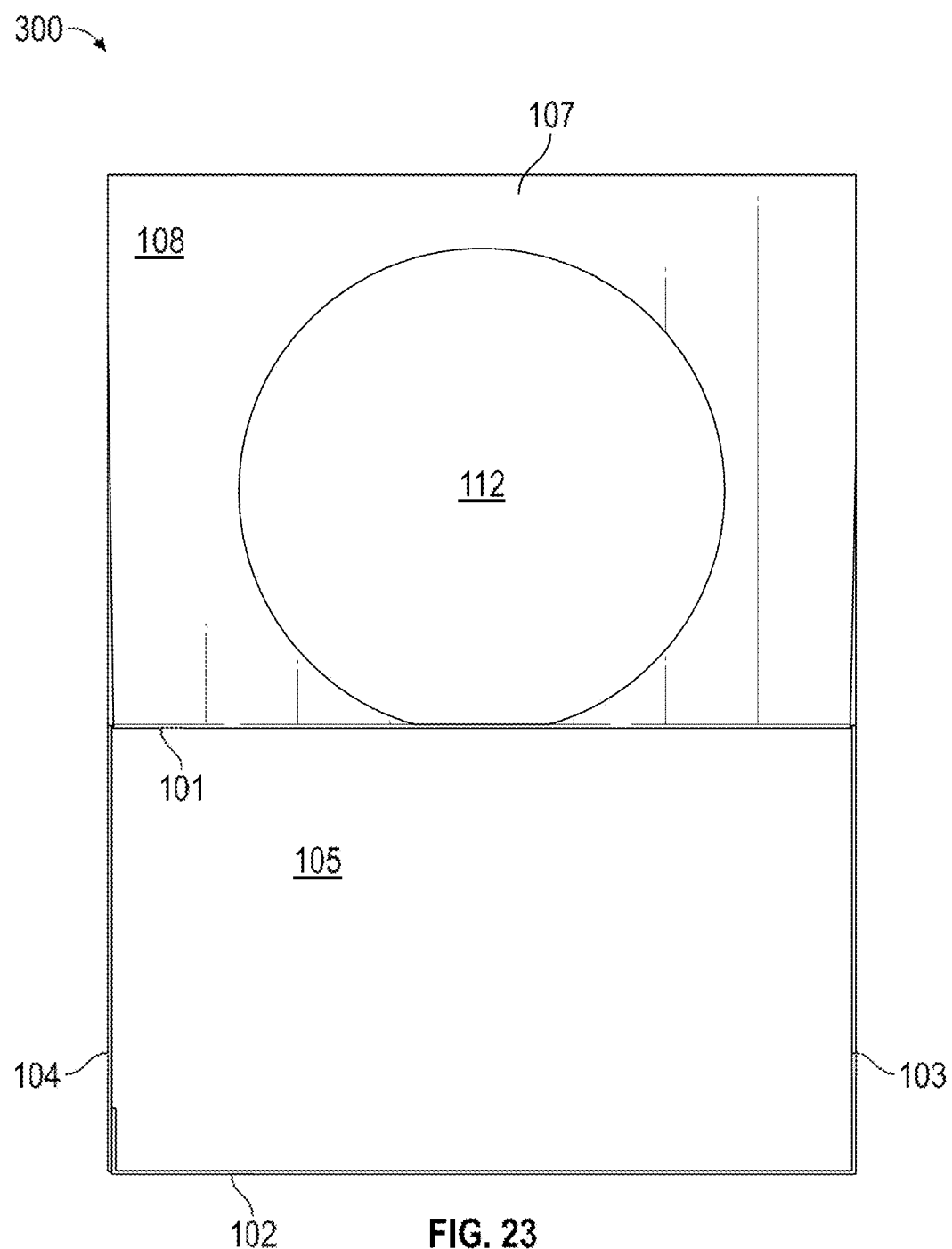
FIG. 23 is a top-side view of the third embodiment of a beverage supported food box.
Figure 24:
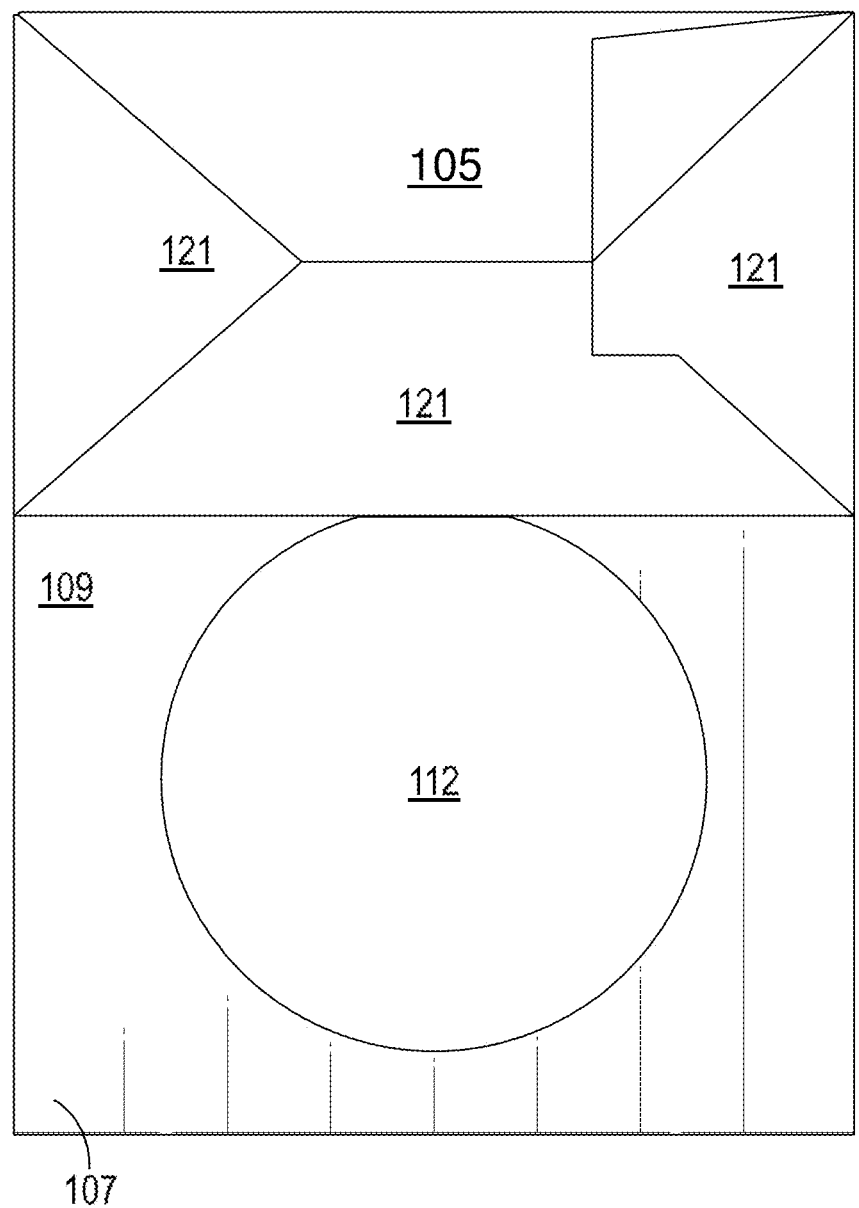
FIG. 24 is a bottom-side view of the third embodiment of a beverage supported food box.

Before shipping to a vendor, the single flat sheet, FIG. 9 may be folded by the manufacturer as shown in FIGS. 10-11. Sidewalls 101, 102, 103, 104 are folded into a roughly rectangular configuration and a side wall end flap 124 is adhered or glued to the appropriate side wall 104. The bottom 105 is folded into the interior space 114 then at least one bottom flap 121 is adhered to another bottom flap 121. Prior to shipping to a vendor, during the manufacturing process, bottom flaps 121, FIG. 9 may be fit, stacked, folded together and optionally glued together. A beverage holder end 111 may be attached or adhered in a semi-permanent or permanent manner such as with glue described above to a side wall 101, 102, 103, 104. A condiment holder end 126 may be attached, glued to a side wall, or left free as shown in FIG. 11 employing a friction lock system. Depending on use, use of glue for attachment or the friction lock system may provide additional stability to the beverage supported food box 100. The condiment holder end 126 may also be referred to herein as an end portion 126 of the condiment flap 115. The beverage supported food box 100 of FIGS. 10-11 may then be shipped to vendor, in essentially a flat state that does not take up very much space reducing the cost of shipping and space needed to store the product. FIGS. 12-13 show the method the vendor may use to unfold the box for receiving a food product and end user use. Space in the interior space 114 is created by pulling side walls 101 and 102 apart or away from each other. The top horizontal member 108 of the beverage flap 107 is pulled down. The end of the condiment flap 126 is fit in the slit 122 in the side wall 104 to form the condiment flap 115 to configure the beverage supported food box 100 as shown in FIG. 1. The condiment cutout 119 is depressed when a condiment container or additional food item container 140 is inserted.

As shown in FIG. 8, in use, an end user can slide a beverage container 130 into the beverage aperture(s) 112 and support the beverage with their fingers and hand (not shown). In this way the bottom horizontal member of the beverage flap 109 sit or rests on the user's hand and therefore supports the entire beverage supported food box 100. The user may then use the other hand to eat a food item contained in the interior space 114 of the beverage supported food box 100. Further, if desired, a user may dip a food item 150 into a condiment contained in a condiment container 140. In another use, once the user slides a beverage container 130 into the beverage flap 107, the user may place the beverage container 130 in a beverage holder, such as in a beverage holder in an arm rest or in a seat in front of the user's seat, wherein the beverage would support the beverage flap 107 and the beverage supported food box 100, creating a hands-free supported food box.

Figure 25:
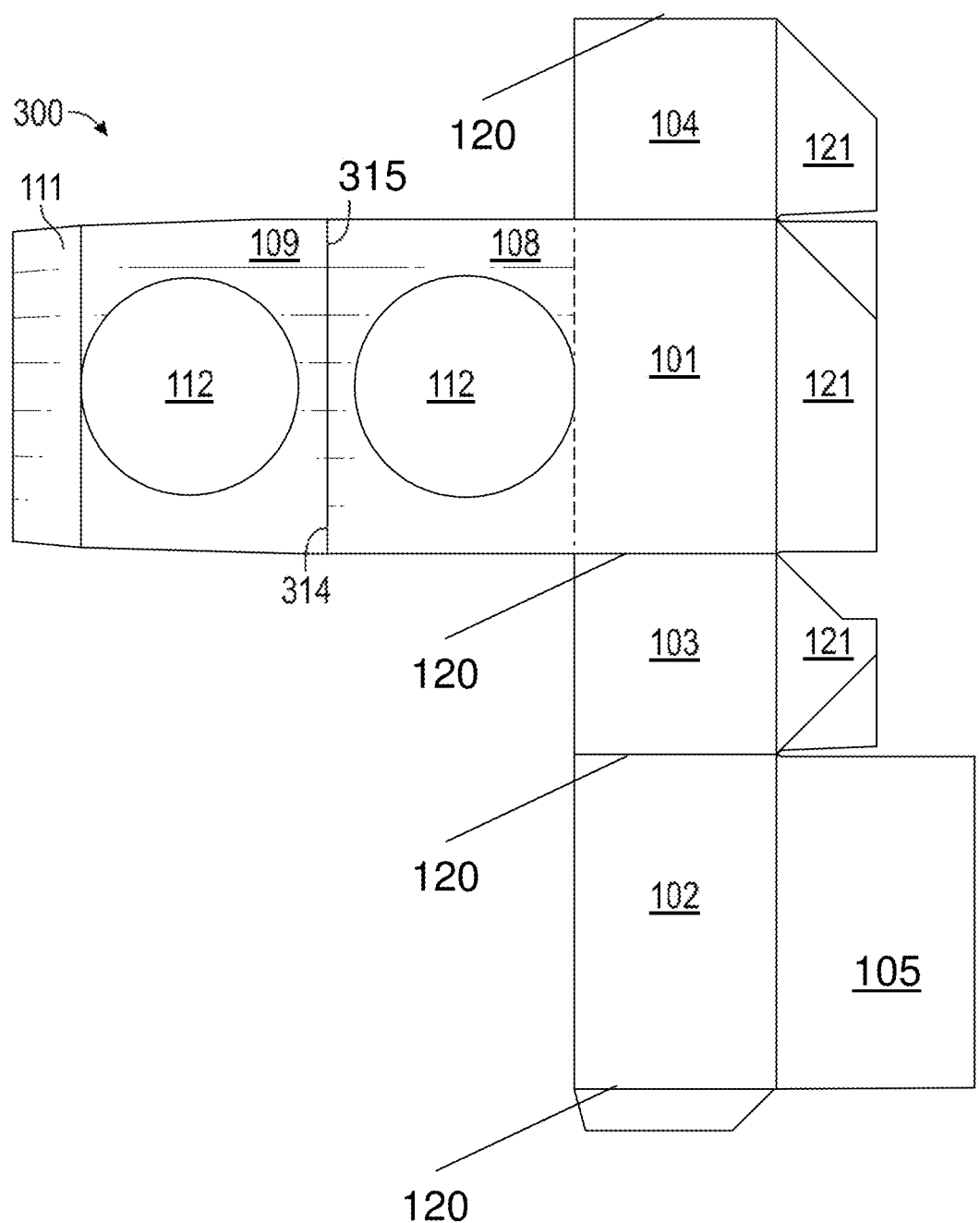
FIG. 25 is a perspective view of the third embodiment of a beverage supported food box before manufacturer assembly.

In a third embodiment, illustrated in FIGS. 18-25, a beverage supported food box 300, may comprise a beverage flap 107 that lacks a vertical member 110, wherein the top horizontal member 108 and bottom horizontal member 109 are adhered together during manufacturer assembly. As shown in FIG. 25, an interior end 314 of the top horizontal member 108 and an interior end 315 of the bottom horizontal member 109 may be joined in a seamless fold. During assembly the top horizontal member 108 and bottom horizontal member 109 are folded together and adhered using adhesive, examples of which are described herein. The end of the beverage flap 111 may be adhered to the interior of the side wall 101 but may also be adhered to the exterior of the side wall 101. The beverage supported food box 300 shown in FIGS. 18-25 may further comprise a condiment flap and or utensil cutout, examples of which are contained herein.

In a fourth embodiment, illustrated in FIGS. 26-33, a beverage supported food box 400 a condiment flap 115 wherein the condiment cutout 119 is depressed into the bottom member of the condiment flap 117 and/or the condiment flap vertical wall 118 rather than the side wall 104. The condiment cutout 119 may be adhered to the condiment flap vertical wall 118 and/or bottom member of the condiment flap 117 to aid in stability of the condiment flap 115. Further, the condiment flap 115 may be attached at an end 126 via adhesion or gluing during the manufacturing assembly to a side wall 104.

Figure 33:
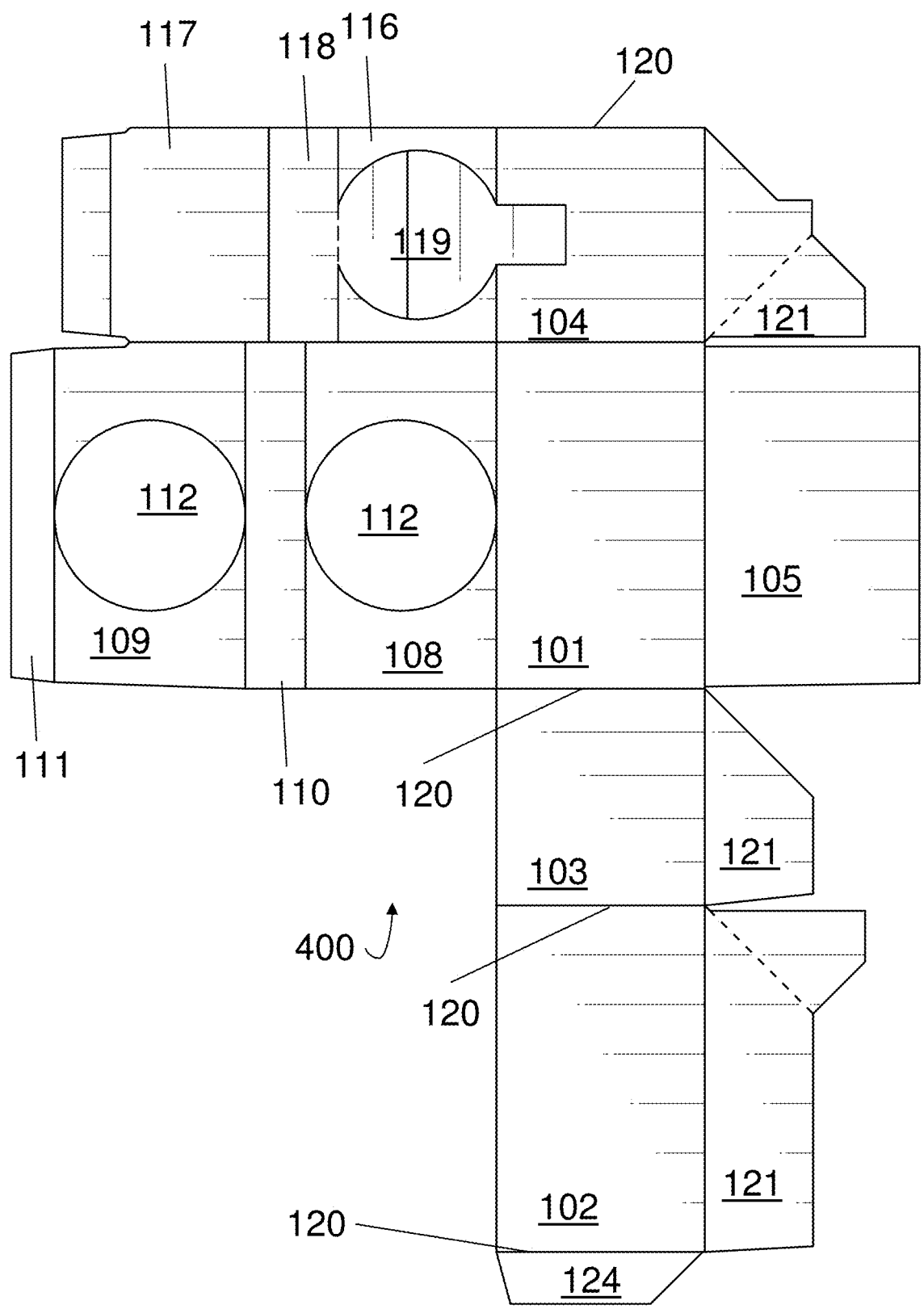
FIG. 33 is a perspective view of the fourth embodiment of a beverage supported food box before manufacturer assembly.
Figure 34:
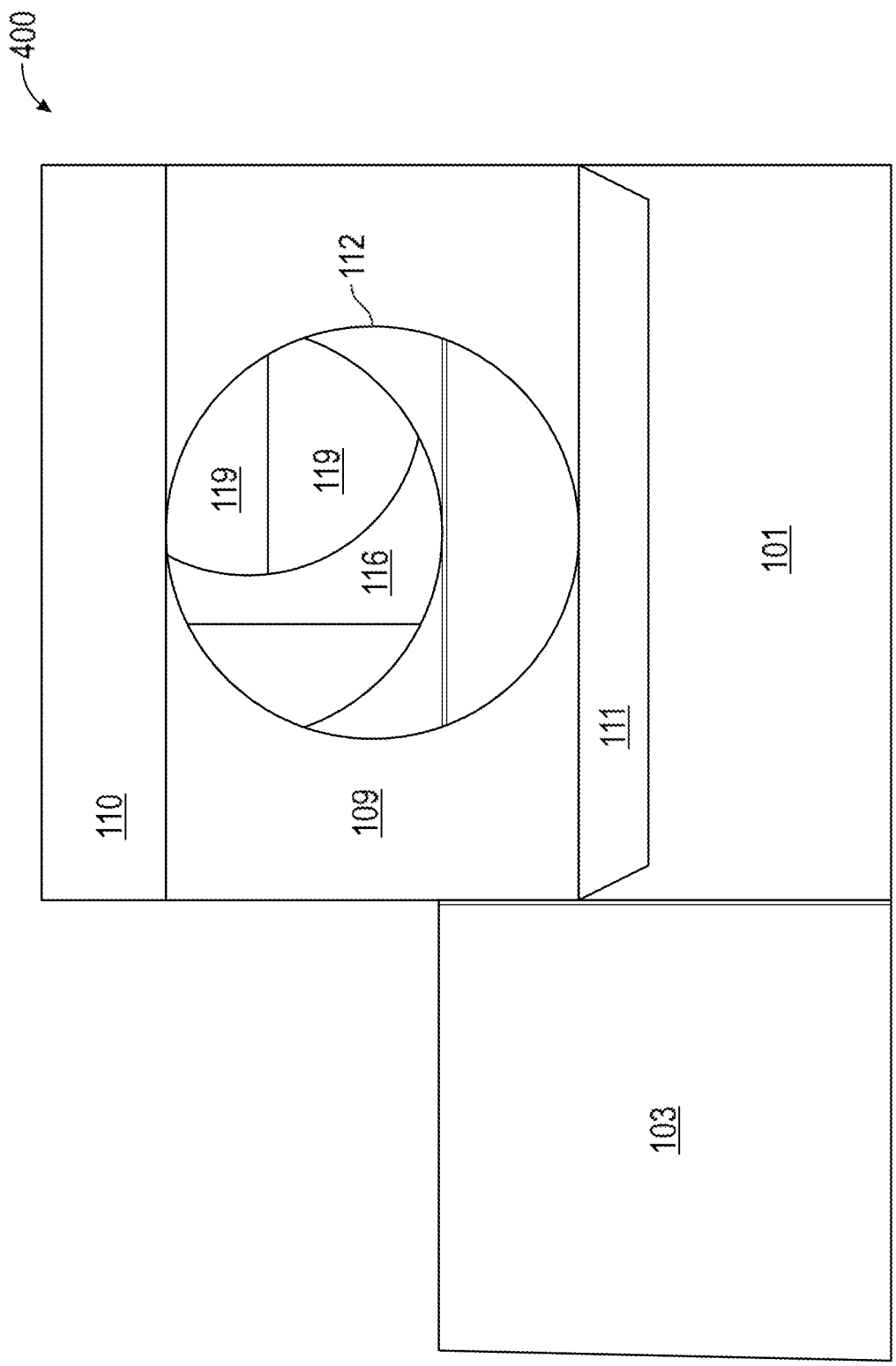
FIG. 34 is a front-side view of the fourth embodiment of a beverage supported food box in a manufacturer assembled ready-to-ship configuration.
Figure 35:
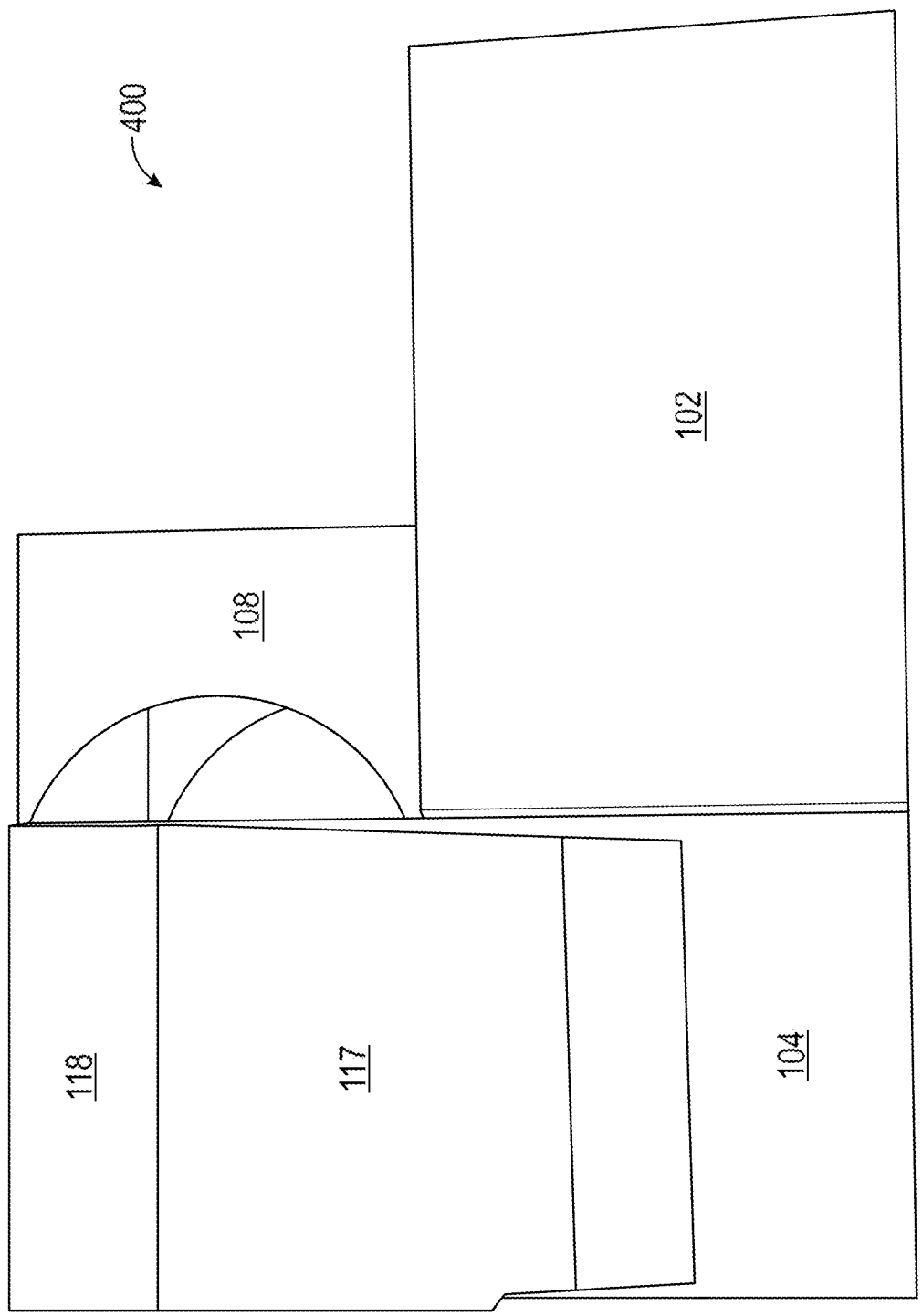
FIG. 35 is a back-side view of the fourth embodiment of a beverage supported food box in a manufacturer assembled ready-to-ship configuration.
Figure 36:
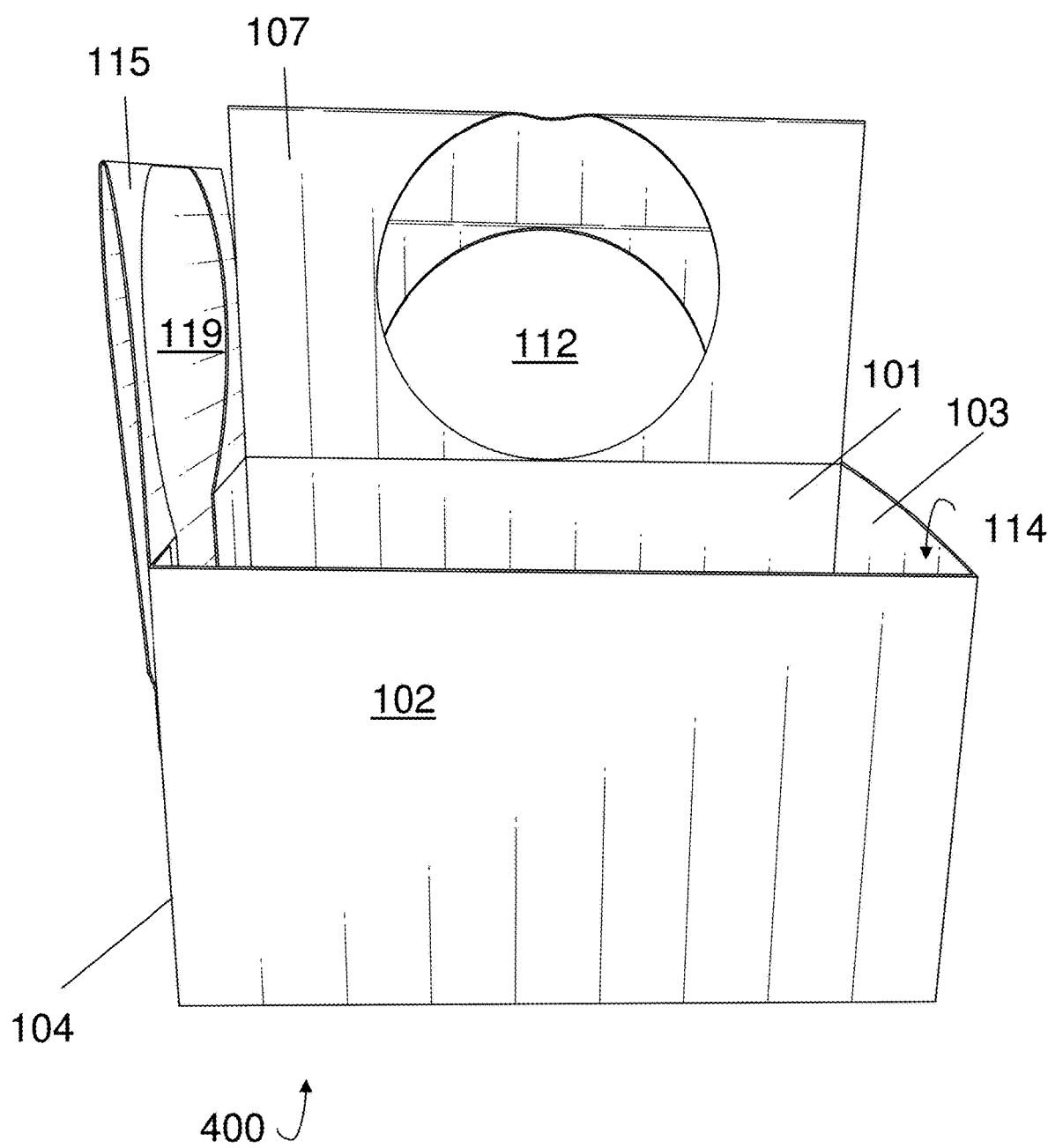
FIG. 36 is a front-side view of the fourth embodiment of a beverage supported food box partially unfolded prior to vendor use.
Figure 37:
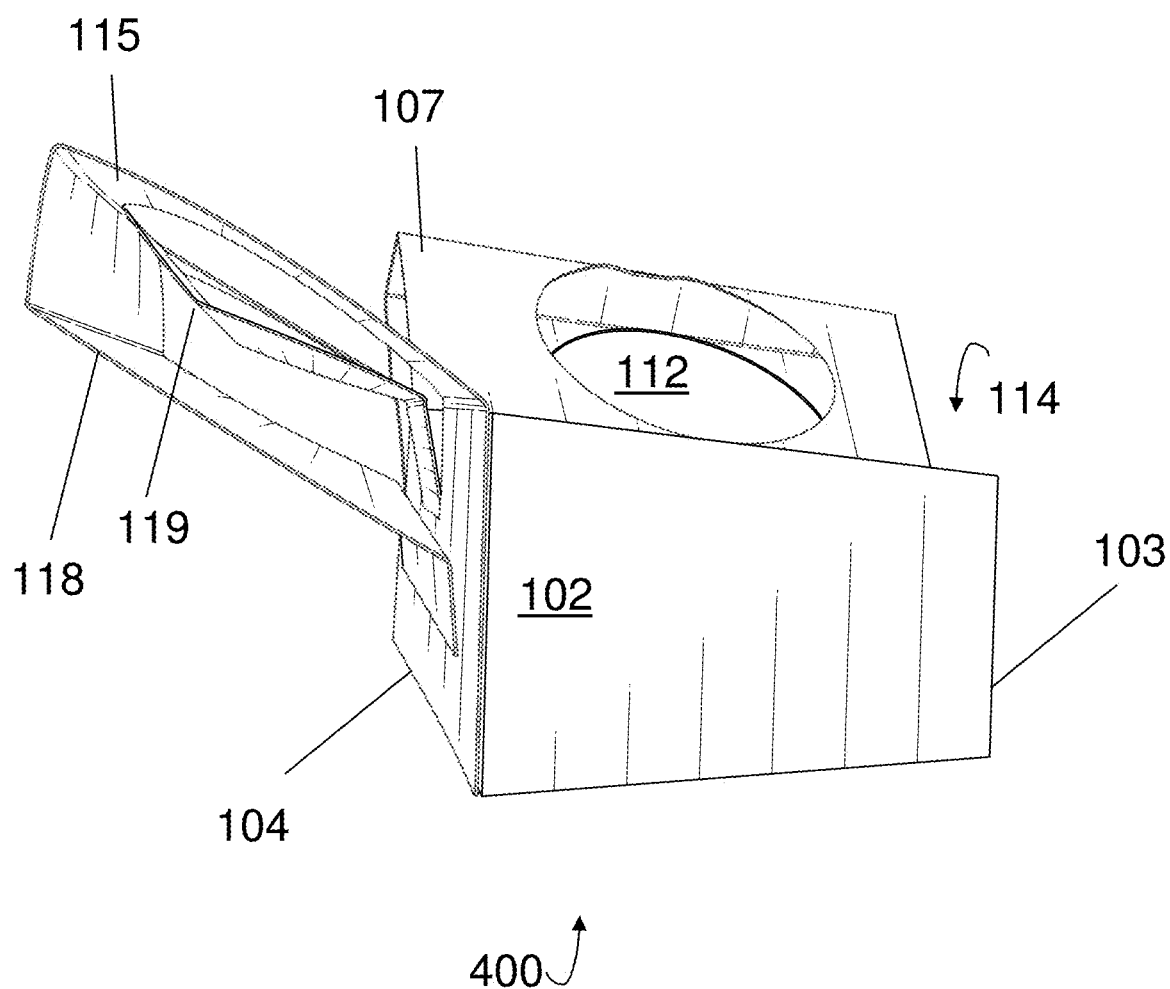
FIG. 37 front-side perspective view of the fourth embodiment of a beverage supported food box partially unfolded prior to vendor use.

As illustrated in FIG. 33, the beverage supported food box embodiment 400, is formed from a single, planar cut paperboard or other example material. During manufacture assembly, sidewalls 101, 102, 103, and 104 may be folded into a roughly rectangular shape and side wall end 124 adhered to side wall 104. Beverage flap 017 may be folded and adhered with beverage flap end 111 to side wall 101. Condiment flap 115 may be folded and condiment flap end 126 adhered to side wall 104. The box may be folded flat for shipping to the vendor as shown in FIGS. 34 and 35.

Figure 43:
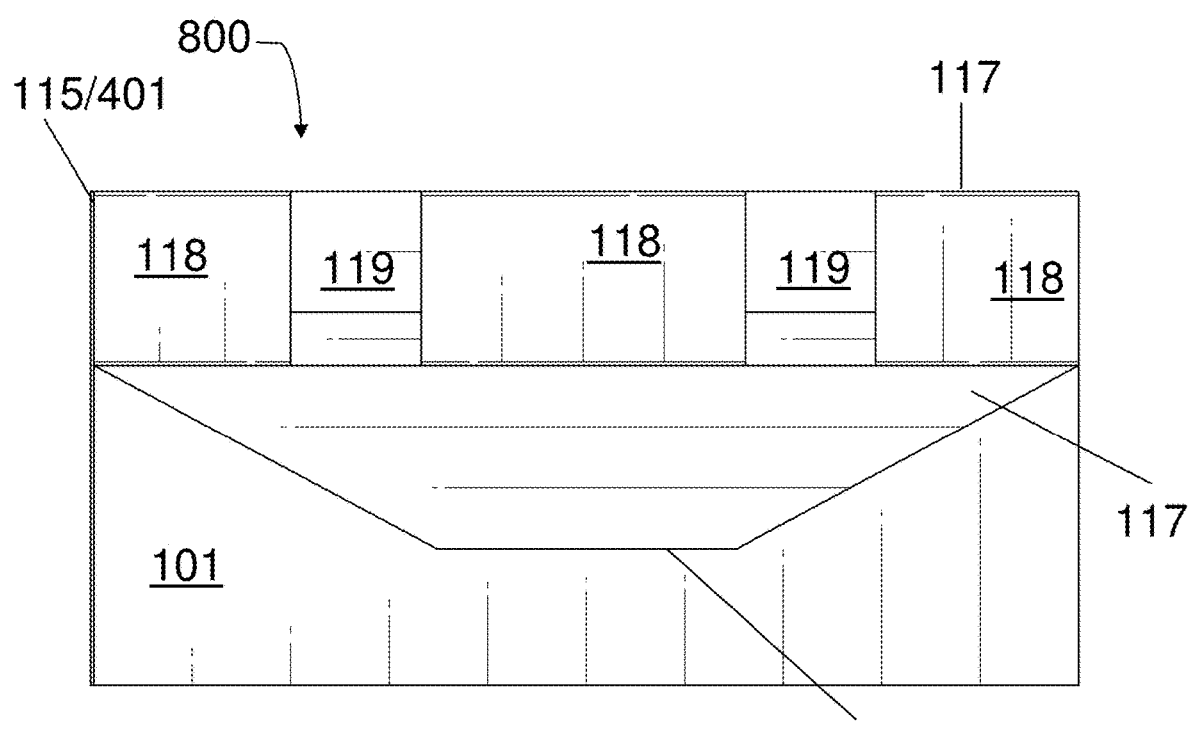
FIG. 43 is a back-side view of the first embodiment of an improved food service box.
Figure 44:
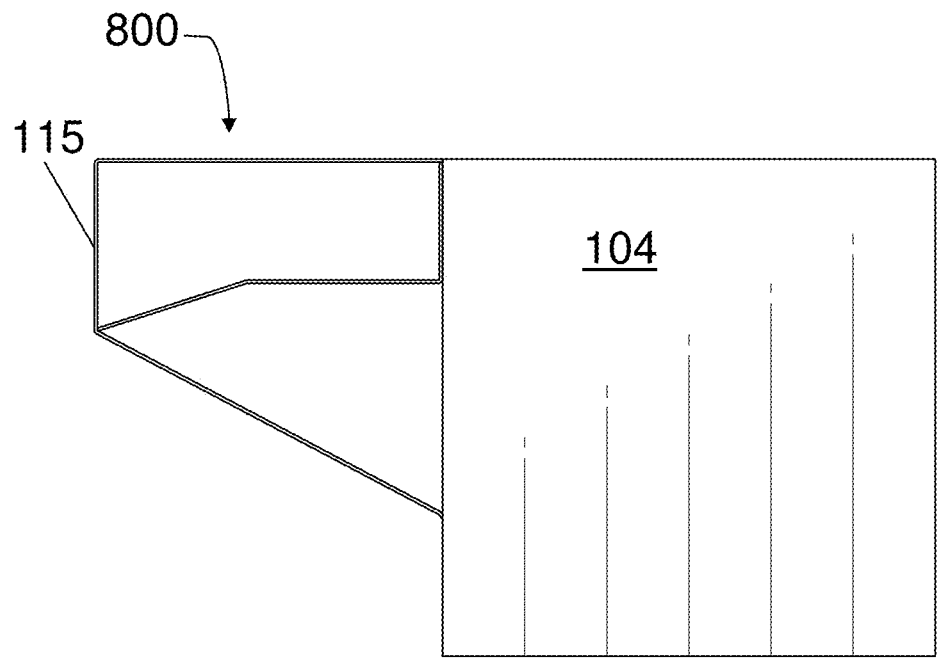
FIG. 44 is a left-side view of the first embodiment of an improved food service box.
Figure 45:
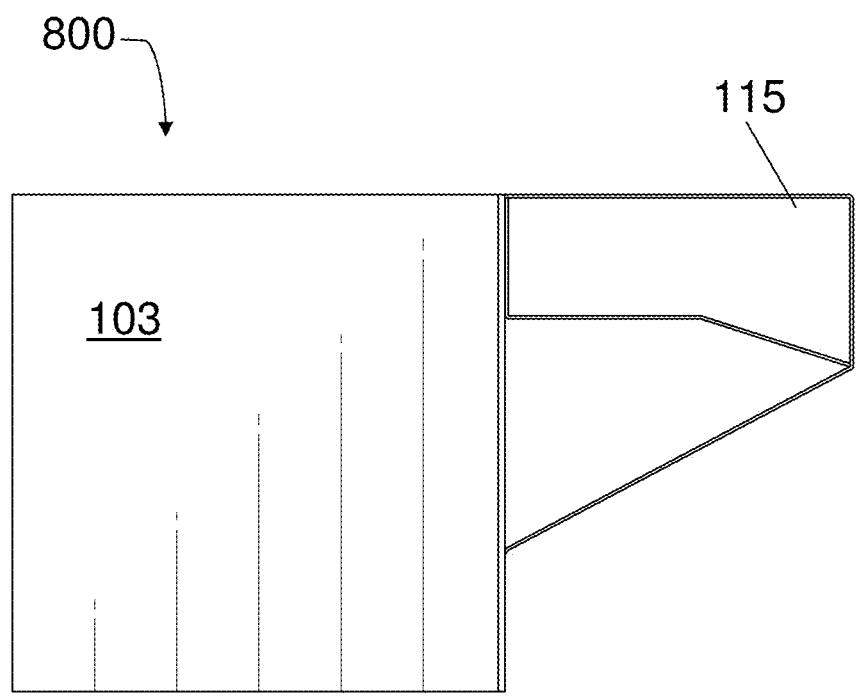
FIG. 45 is a right-side view of the first embodiment of an improved food service box.
Figure 46:
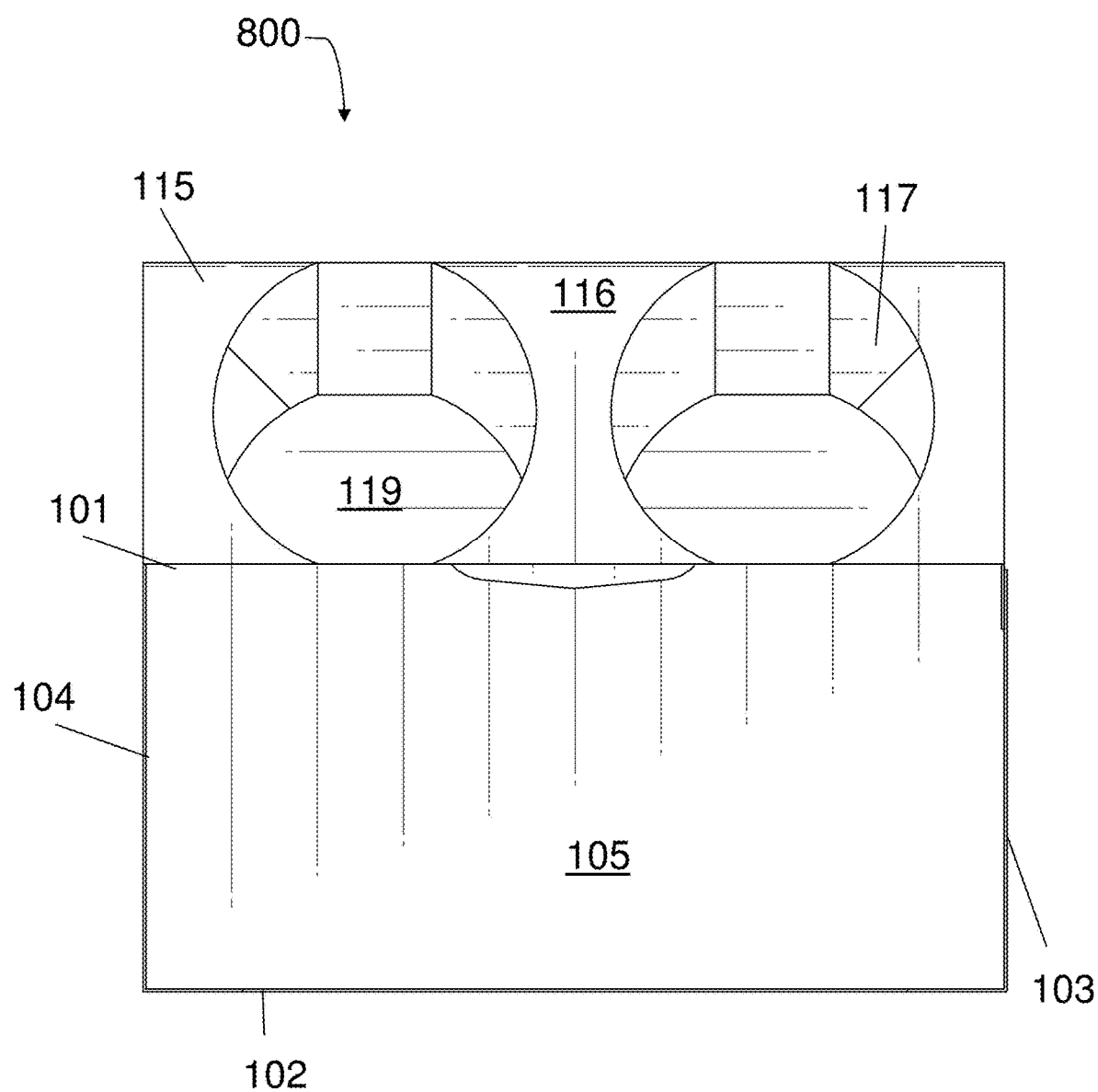
FIG. 46 is a top-side view of the first embodiment of an improved food service box.
Figure 47:
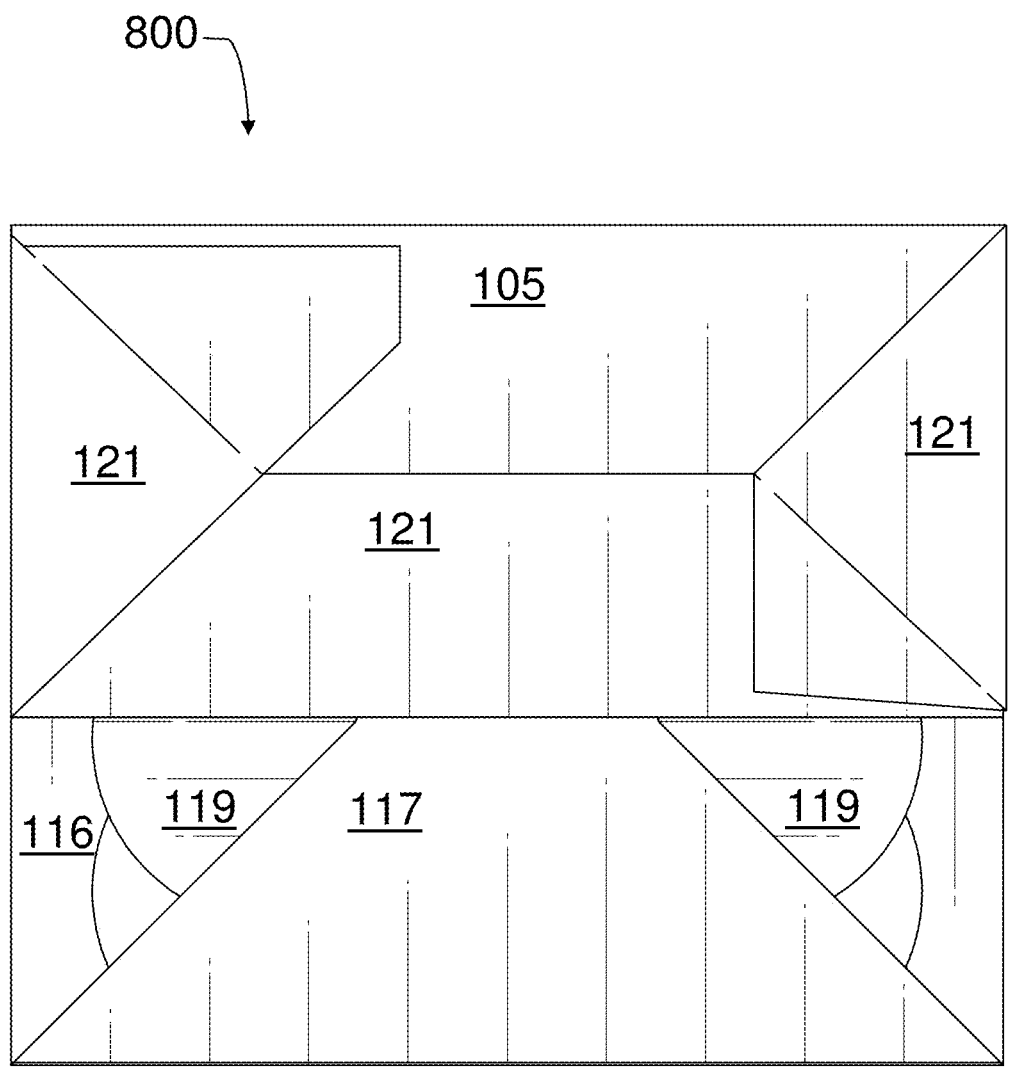
FIG. 47 is a bottom-side view of the first embodiment of an improved food service box.
Figure 48:
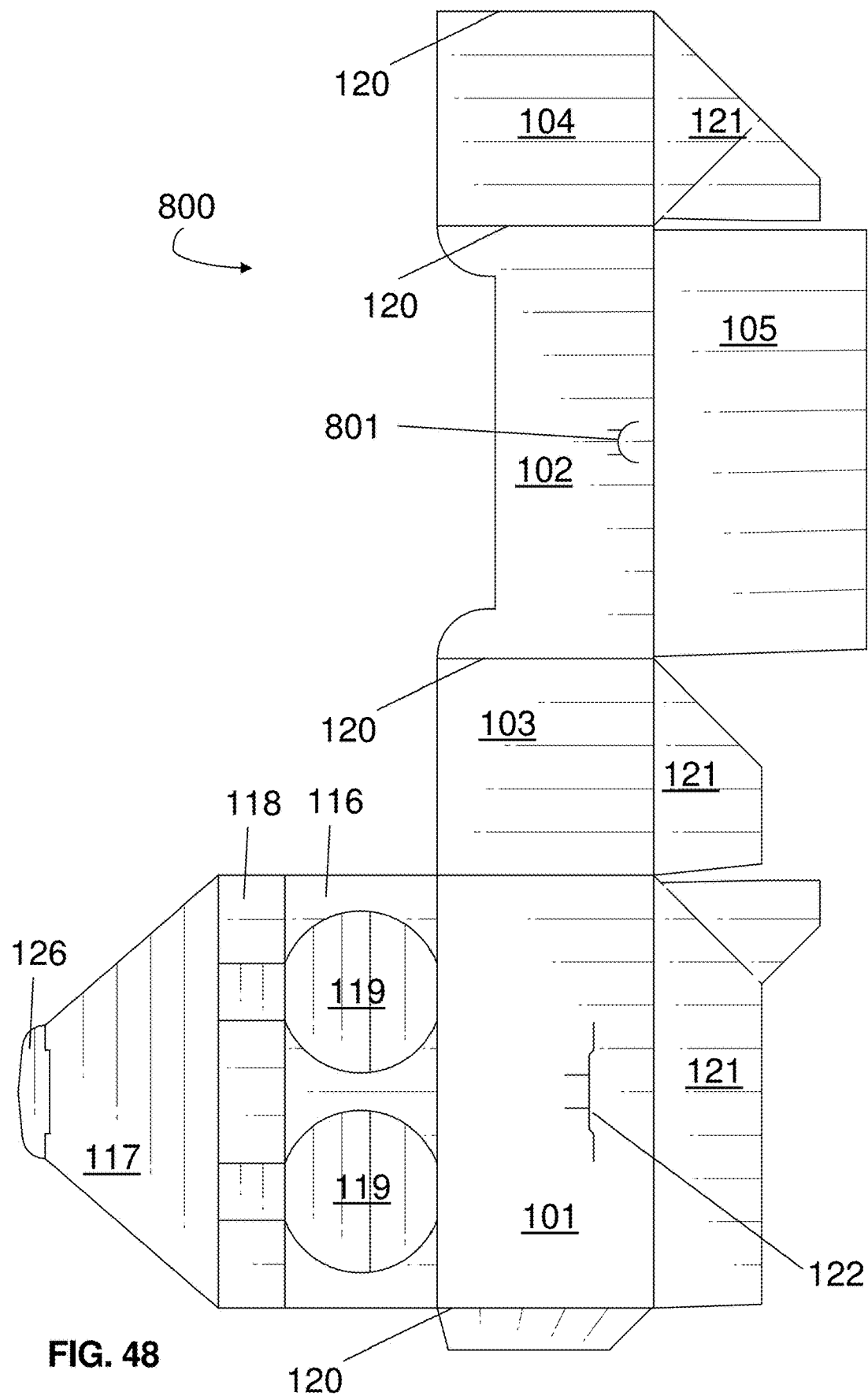
FIG. 48 is the first embodiment of an improved food service box in a pre-manufacturer assembly configuration.

FIGS. 41-51 illustrate an improved food service box of the present disclosure 800. The improved food service box 800 may comprise a lid 401 that serves as a condiment flap 115. The dual lid/condiment flap 401/115 comprises at least one but, in this embodiment, at least two condiment cutouts 119. The lid/condiment flap 401/115 folds into the interior space 114, covering the interior space and any food item contained therein. The dual lid/condiment flap 401/115 may comprise a top horizontal member 116, vertical member 118, and bottom member 117. The top horizontal member 116 may extend from a side wall 101 and sit substantially horizontally or at about a 90 degree angle from the side wall 101. The vertical member 118 may extend down at about a 90 degree angle from the top horizontal member 116. The bottom horizontal member 117 extends down from the vertical member 118 at an angle at or greater than 90 degrees to less than about 175 degrees to extend to the side wall 101. As shown in FIG. 43, the free end of the condiment flap 126

Figure 49:
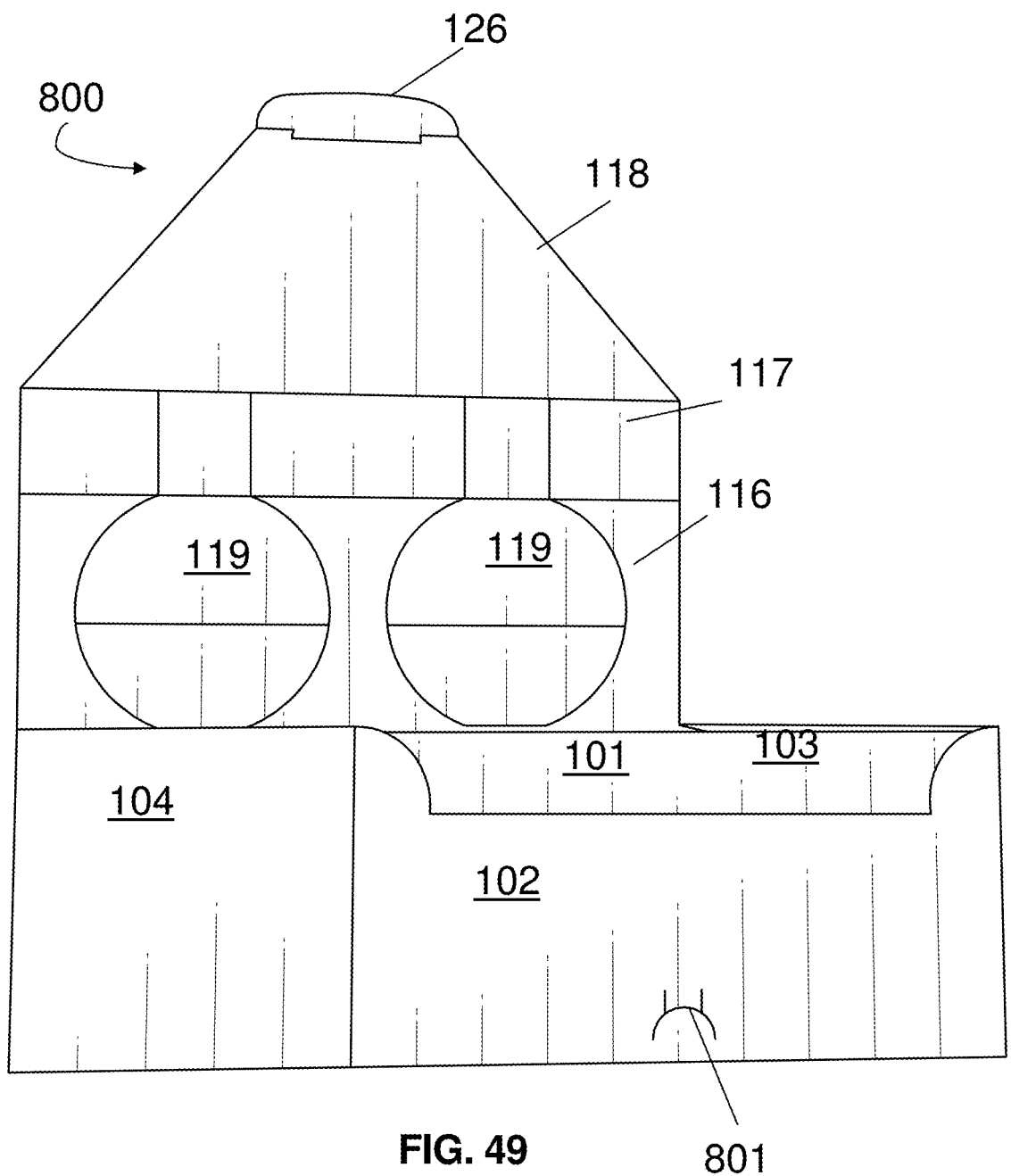
FIG. 49 is a right-side view of the first embodiment of an improved food service box in a post-manufacturer assembly, ready-to-ship configuration.
Figure 50:
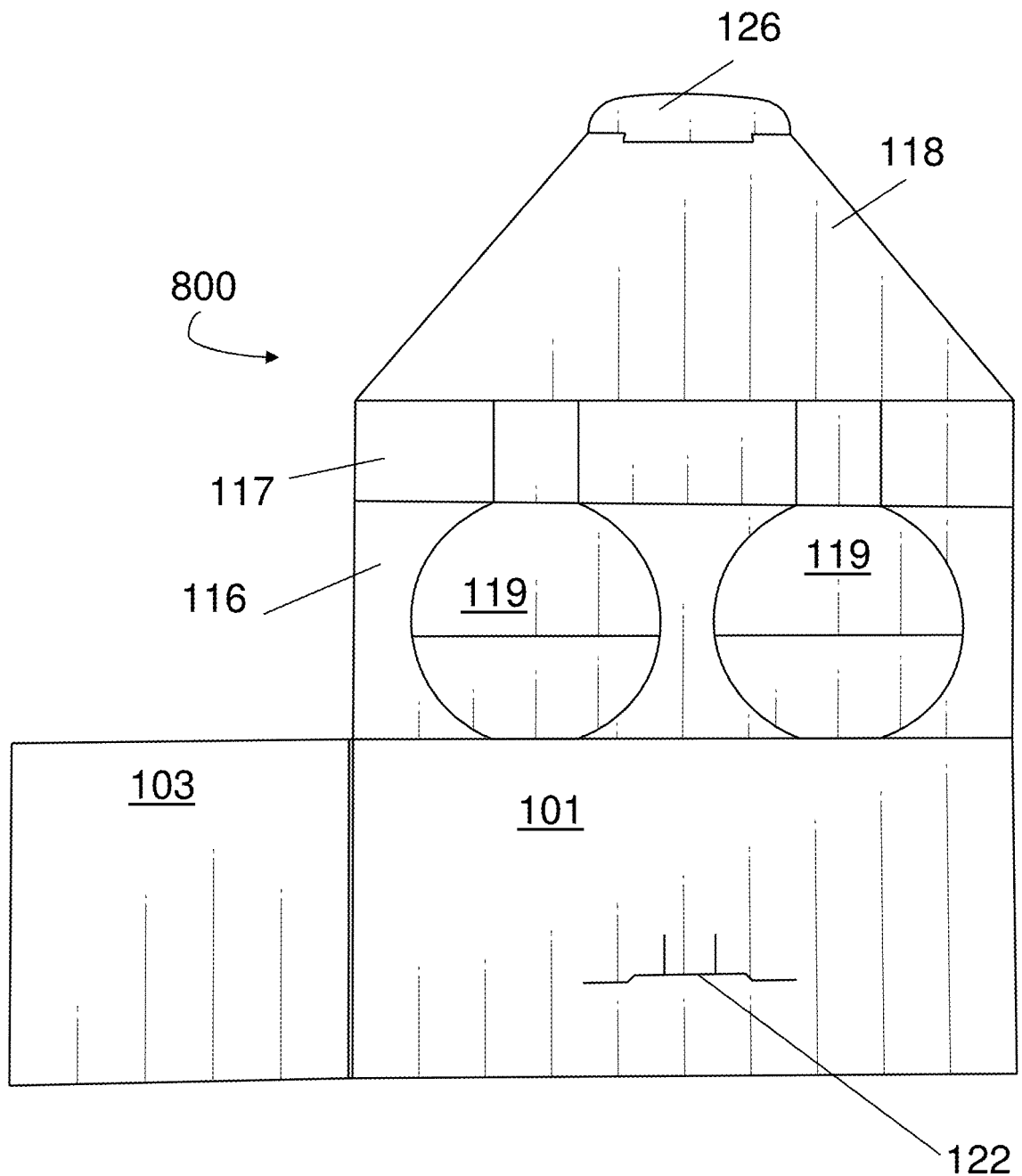
FIG. 50 is a left-side view of the first embodiment of an improved food service box in a post-manufacturer assembly, ready-to-ship configuration.
Figure 51:
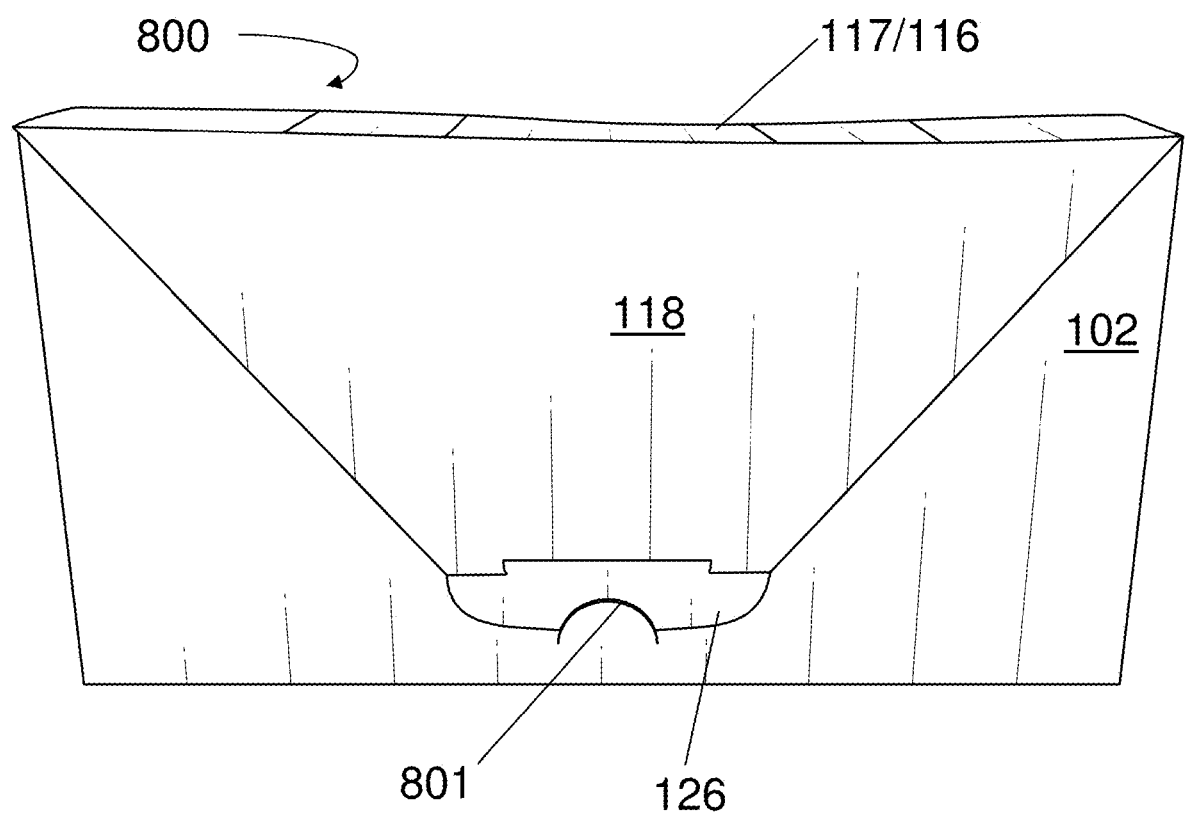
FIG. 51 is a perspective view of the first embodiment of an improved food service box shown in an assembled, stackable, vendor use configuration.

(not shown) joined to the bottom member 117 of the dual lid/condiment flap 401/115, may be attached via a friction lock system wherein the end of the condiment flap 126 slides into a slit 122 in the side wall 101. The vendor may perform the step of fitting the end of the condiment flap 126 into the sidewall 101. This enables the improved food service box 800 to be shipped flat from the manufacturer to the vendor as shown in FIGS. 49-50. As shown in FIGS. 41-51, the vendor opens the improved food service box 800 essentially to rectangular form, depresses the bottom 105 onto the bottom flaps 121, and then covers the interior space 114 with the lid/condiment flap 401/115, inserting condiment flap end 126 into slit 801, for stacking prior to use or to enclose a food item. This allows the improved food service boxes 800 to be stacked upon each other once assembled by the vendor and/or end user. When a food is enclosed in the food service box, the box may be kept warm under heat lamps or lights. To open the improved service box, a user removes the condiment flap end 126 from the slit 801 in the front, side wall 102 and inserts the end flap 126 into the slit 122 on the adjoining side wall 101.

FIGS. 52-61 illustrate a second embodiment of an improved food service box 900. The improved food service box 900 comprises side flaps 101, 102, 103, 104 that enclose an interior space 114. The food service box may also be referred to herein as a food container 900. The food service box 900 may include an integrated condiment flap or holder 115 configured to fit and support a condiment container 140 as shown and described above in FIG. 8. The food service box 900 may include a first side wall 101 and an opposing second side wall 102. The first side wall 101 may include a top edge 213, a bottom edge 106, and two opposing side edges 214A, 214B. Similarly, the second side wall 102 may include a top edge 213, a bottom edge 106, and two opposing side edges 214A, 214B.

The food service box 900 may further include a third side wall 103 and an opposing fourth side wall 104. The third side wall 103 may include a top edge 213, a bottom edge 106, and two opposing side edges. The fourth side wall 104 may include a top edge 213, a bottom edge 106, and two opposing side edges. The third and fourth side walls 103, 104 may be connected to the first and second side walls 101, 102 along their two side edges.

The food service box 900 may further include a bottom portion comprising bottom flaps 121. The first, second, third and fourth side walls 101, 102, 103, 104 and the bottom flaps 121 surround an internal container space 114 configured to receive one or more food items 150 as illustrated in FIG. 8. The bottom portion formed by the bottom flaps 121 may be sized to fit within a standard vehicle cup holder. The bottom portion may be formed from interlocking extensions of each bottom edge or bottom flaps 121.

The food service box 900 may further include a top or condiment flap 115. The top condiment flap 115 may include an outside edge 126 and a bottom edge 313. The bottom edge 126 of the top flap 115 may be connected to the side wall top edge 213 of the first side wall 101 along a flap fold line 213/313.

The food service box 900 may further include a condiment aperture 901 defined within the top flap 115. The condiment aperture 901 may be configured to fit and support a condiment container 140 as described above and shown in FIG. 8. In certain optional embodiments, the condiment aperture 901 may be circular. In other optional embodiments, the condiment aperture 901 may be rectangular or some other shape matching the shape of a condiment container 140. In some embodiments, the condiment aperture 901 may be an opening. In other embodiments, the condiment aperture 901 may include a removable perforated portion, such as a cut out 119 described and shown above which may help seal the internal container space 114 when the condiment flap 115 is folded over the internal space 114 wherein the food service box 900 is in a closed, stackable configuration.

The condiment flap 115 of the food service box 900 may be a single flap 116, or two flaps adhered or connected as in the beverage holder flap 107, FIGS. 18-25. In other embodiments the condiment flap 115 includes a first or top member 116, vertical member 118, and second or bottom member 117. The vertical member 118 may lay at about, almost, or roughly, a right angle to the first member 116 and join the first top member 116 with the bottom member 117. The bottom member 117 may extend from the vertical member 118 at greater than a ninety degree angle to meet and attach to a side wall 101, 102, 103, 104. An end of the condiment flap 126 connects the condiment flap 115 to a side wall 101. The connection of the condiment flap end 126 and the side wall 101 may be via a friction lock system as shown wherein a tab end 126 may be notched, or un-notched, and slides into a slit or aperture 122 in the side wall 101. In other embodiments, the bottom condiment flap 117 may be glued or adhered to the side wall 101 as described above. The condiment flap bottom member 117 may provide additional support for a condiment cup 140 as shown in FIG. 8.

In certain optional embodiments, the support portion 116 may include an upper vertical portion 118 and a lower angled portion 117. The upper vertical portion 118 may provide clearance for the condiment container such that the condiment container does not interfere with the lower angled portion 117 when received by the aperture 901. The lower angled portion 117 may provide support for the top flap 116. The upper vertical portion 118 and the lower angled portion 117 may be shaped differently in other embodiments.

Figure 52:
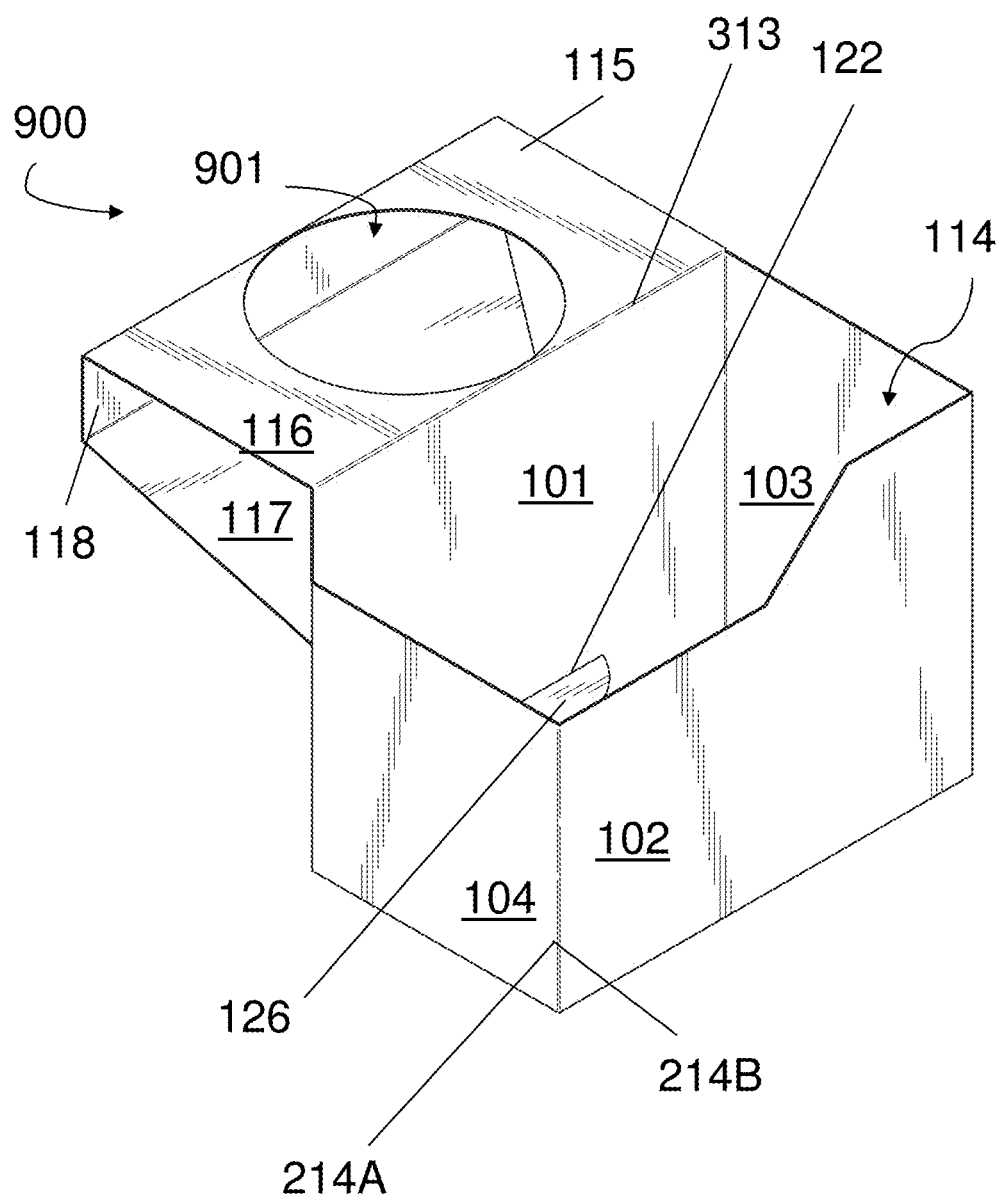
FIG. 52 is a top-perspective view of a second embodiment of an improved food service box configured for end consumer use.
Figure 53:
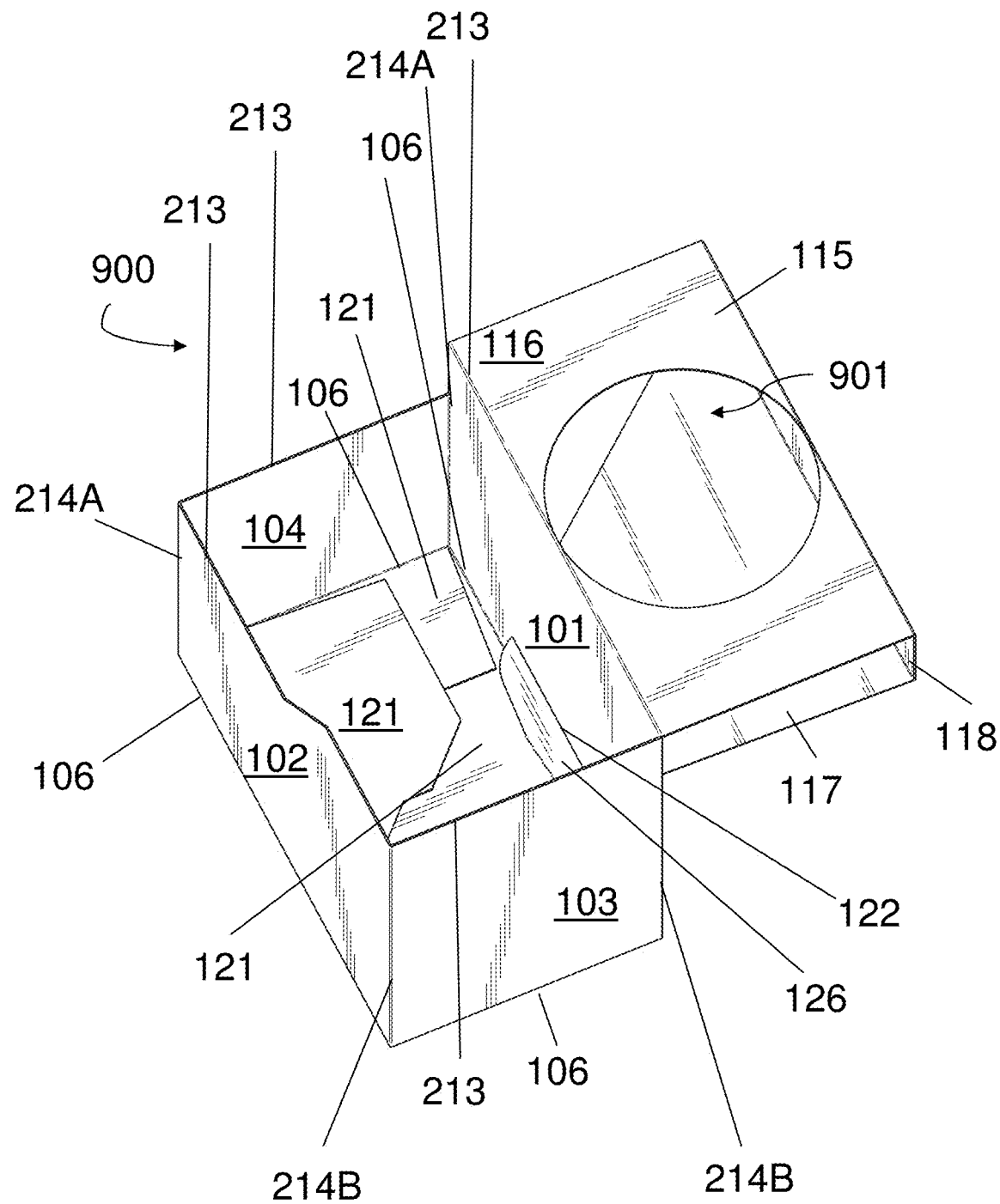
FIG. 53 is another top-perspective view of the second embodiment of an improved food service box configured for end consumer use.
Figure 54:
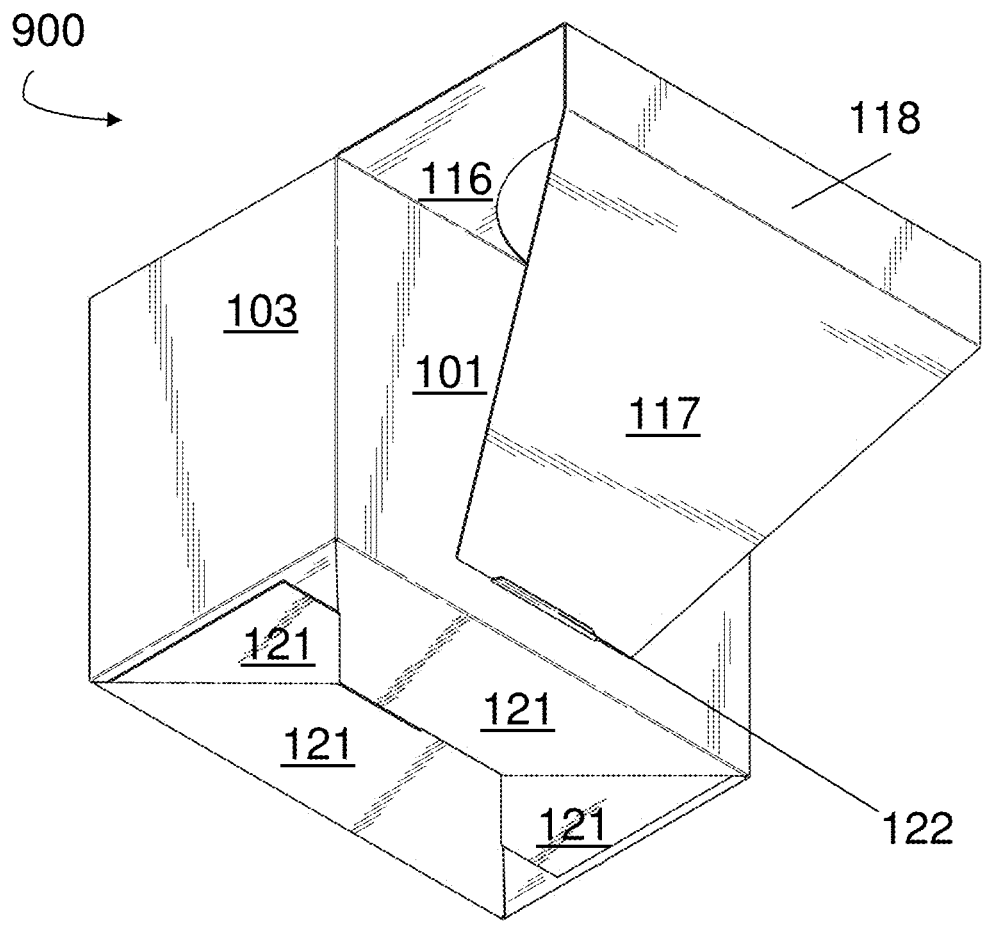
FIG. 54 is a bottom-perspective view of the second embodiment of an improved food service box configured for end consumer use.
Figure 55:
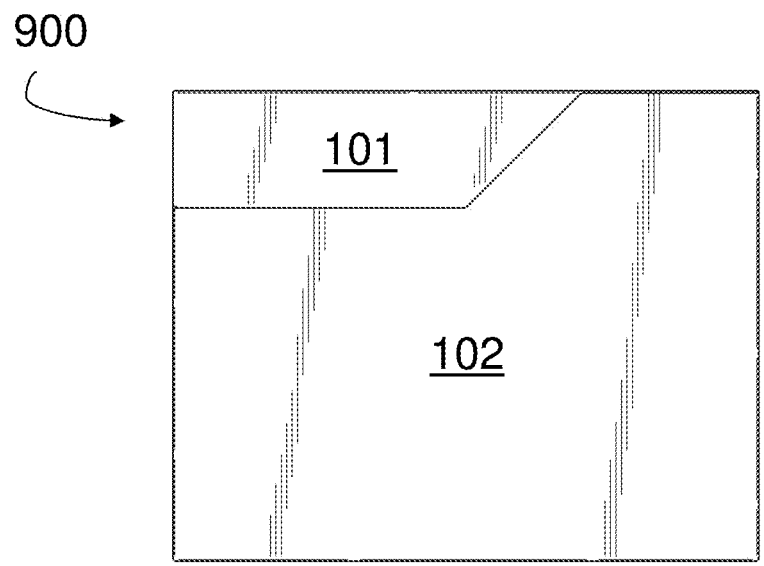
FIG. 55 is a front-side view of the second embodiment of an improved food service box.
Figure 56:
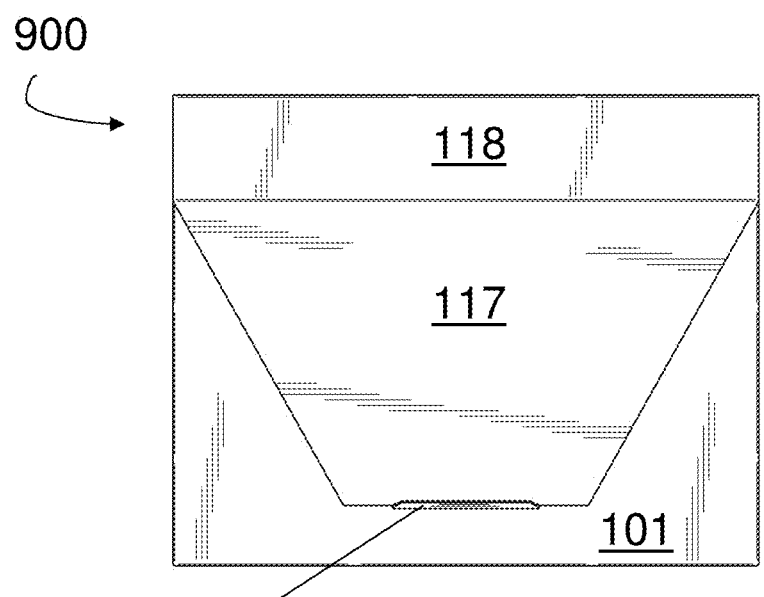
FIG. 56 is a back-side view of the second embodiment of an improved food service box.
Figure 57:
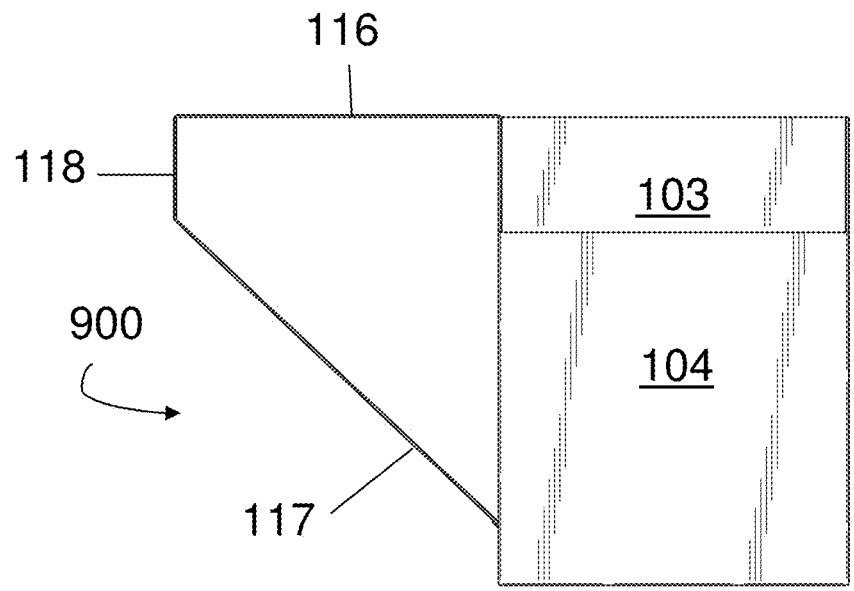
FIG. 57 is a left-side view of the second embodiment of an improved food service box.
Figure 58:
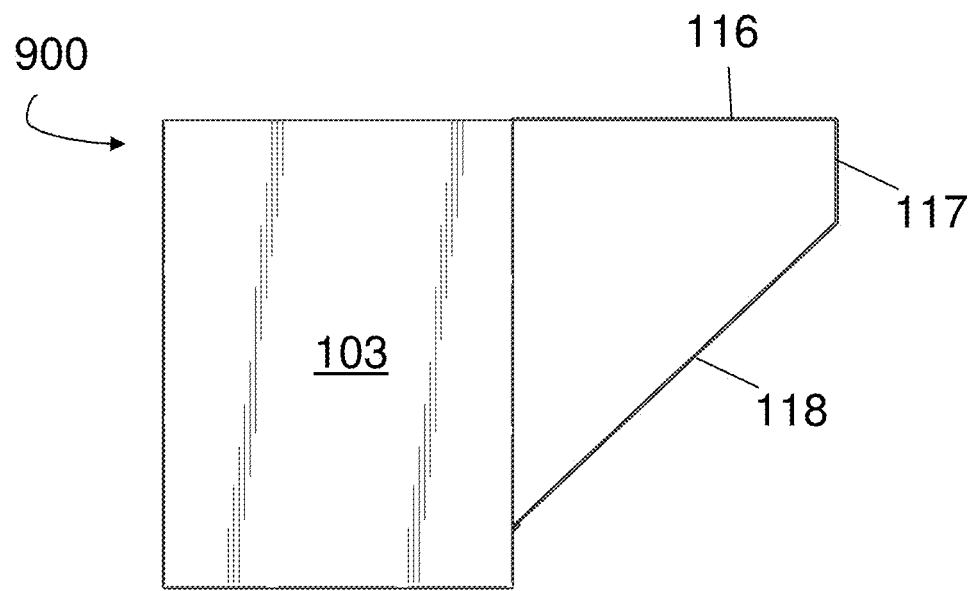
FIG. 58 is a right-side view of the second embodiment of an improved food service box.
Figure 59:
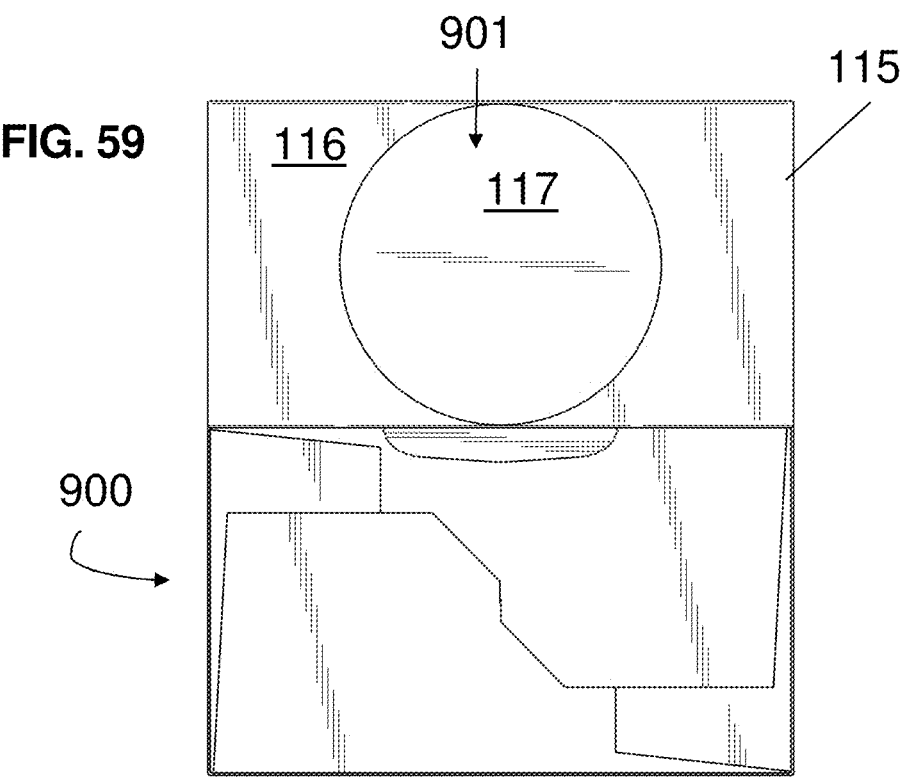
FIG. 59 is a top-side view of the second embodiment of an improved food service box.
Figure 60:
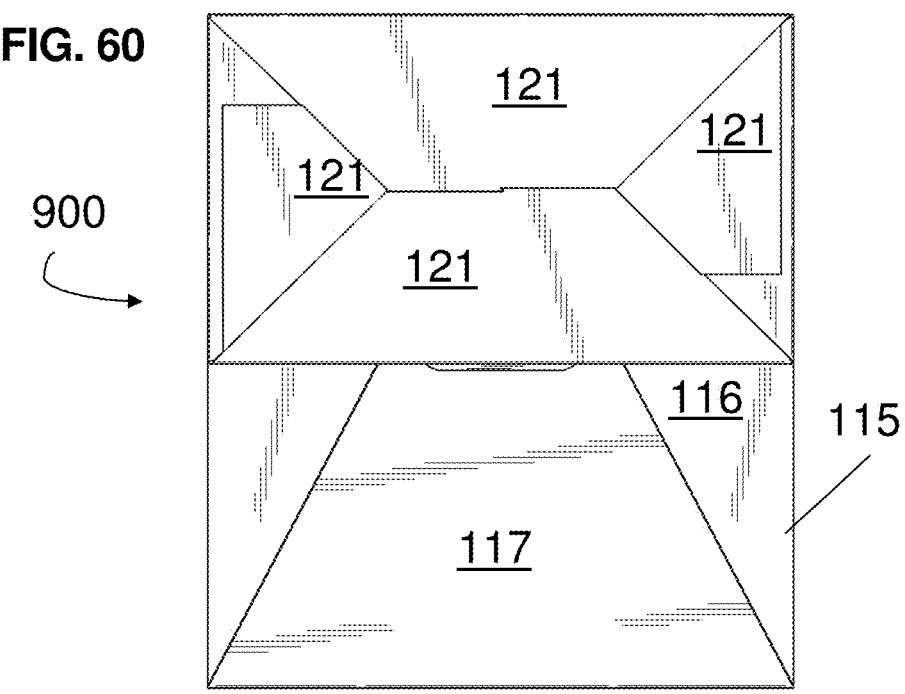
FIG. 60 is a bottom-side view of the second embodiment of an improved food service box.

As illustrated in FIGS. 52-53, The first and second side walls 101, 102 may be the same height, different heights, or a combination thereof. The third and fourth side walls 103, 104 may be the same height, different heights, or a combination thereof. Generally, the first side wall 101 may be the tallest side wall so that the top flap 115 may be positioned over the internal container space 114 of the food service box 900 in the closed configuration. In certain optional embodiments, the top edge 213 of the second side wall 102 may have a portion that is the same height as the first side wall 101 and another portion that has a height less than that of the first side wall 101. Additionally, the third side wall 103 may have a height equal to that of the shorter portion of the second side wall 102 and the fourth side wall 104 may have a height equal to that of the taller portion of the second side wall 102. In other embodiments, the shapes of the top edges of the side walls, openings, and flaps may be different such as for the condiment flap bottom member 117, top of side walls 213, bottom flaps 121, and condiment aperture 901. Different height side walls may provide venting to help prevent food received by the internal container space 114 from sweating. The different height side walls may allow better access to food positioned within the internal container space 114 of the food service box 900 when in an open configuration.

Figure 61:
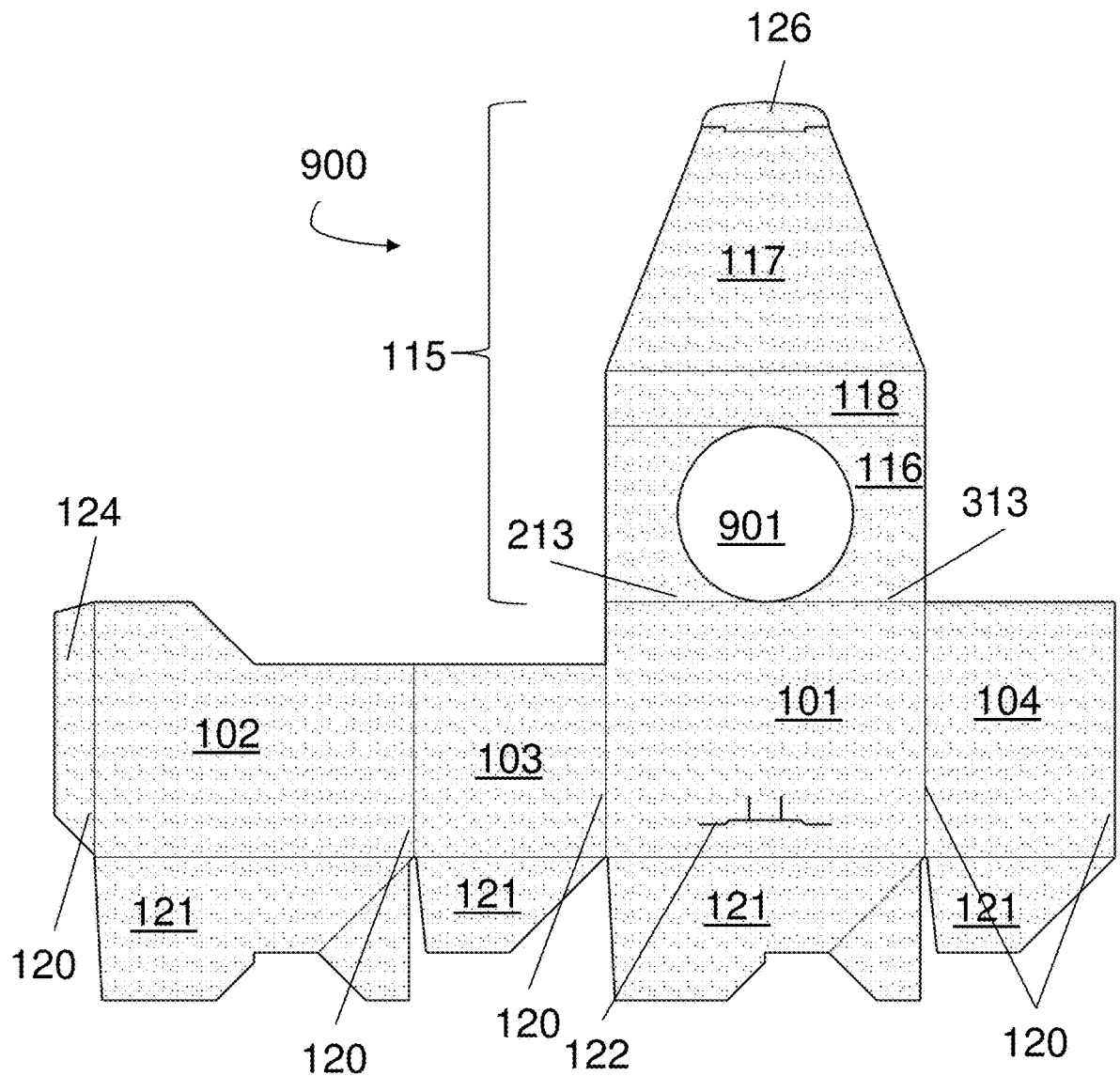
FIG. 61 is a perspective view of the second embodiment of an improved food service box in a pre-manufacturer assembly configuration.

As illustrated in FIG. 61, the food service box 900 may comprise a planar material having a first configuration in which the entire the food service box 900 is flat. As illustrated in FIGS. 52-60, the food service box 900 may comprise a second configuration, partially accomplished at a manufacturing facility and/or at a vending location, in which the food service box 900 is configured for end consumer use with the placement of food within the internal container space 114. Bottom flaps 121 may be adhered, glued fitted, folded, or friction locked together to enclose the interior space 114 and hold a food item. The side wall end flap 124 may be adhered to the fourth side wall 104 to form the food service box 900.

The dimensions of the food service box 900 may be scaled up or down depending upon the needs of a consumer. Multiple three-dimensional shapes for the food service box 900 are possible including, in non-limiting examples, rectangular, cube, triangular prism, cylindrical, or other shapes as may be afforded by requirements of the design and as shown in other illustrations herein.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

What is claimed is:

1. A food box configured to engage a beverage container, the food box, when configured for use, comprising:
   one or more side walls, each of the one or more side walls having a top edge and a bottom edge, the one or more side walls configured to define an internal container space;
   a beverage flap exterior to the internal container space having a top member and a bottom member, the top member connected to the top edge of a first side wall of the one or more side walls, at least a portion of the bottom member attached to the first side wall;
   an aperture defined in the top member and an aperture defined in the bottom member of the beverage flap designed to engage the beverage container; and
   wherein the top member and the bottom member of the beverage flap are parallel.

2. The food box of claim 1, wherein:
   the one or more side walls include four side walls configured to define the internal container space.

3. The food box of claim 1, wherein:
   the internal container space includes a bottom formed by at least one bottom flap connected to at least one of the one or more side walls.

4. The food box of claim 3, wherein:
   each of the one or more sides walls includes a bottom flap of the at least one bottom flap.

5. The food box of claim 3, wherein:
   the bottom of the internal container space is formed by a single bottom flap.

6. The food box of claim 1, wherein:
   the top member of the beverage flap contacts the bottom member of the beverage flap.

7. A food box comprising:
   one or more side walls, each of the one or more side walls having a top edge and a bottom edge, the one or more side walls configured to define an internal container space;
   a beverage flap exterior to the internal container space having a top member and a bottom member, the top member connected to the top edge of a first side wall of the one or more side walls, at least a portion of the bottom member attached to the first side wall;
   an aperture defined in the top member and an aperture defined in the bottom member of the beverage flap designed to engage the beverage container; and
   wherein the beverage flap further includes a side wall portion defined between and configured to separate the top member and the bottom member.

8. The food box of claim 7, wherein:
   the side wall portion of the beverage flap is positioned distal to the first side wall.

9. The food box of claim 1, wherein:
   the beverage flap further includes an end portion extending from the bottom member, the end portion configured to attach the bottom member to the first side wall.

10. The food box of claim 9, wherein:
    the end portion of the beverage flap is connected to the first side wall via glue.

11. The food box of claim 1, further comprising:
    an additional flap connected to the top edge of a second side wall of the one or more side walls, the additional flap having a cutout designed to receive a food container.

12. The food box of claim 11, wherein:
    the cutout is defined in at least a top member of the additional flap, the top member connected to the top edge of the second side wall.

13. The food box of claim 12, wherein:
    the additional flap further includes a vertical member extending from the top member and a bottom member extending from the vertical member, the bottom member configured to attach to the second side wall.

14. A food box comprising:
    one or more side walls, each of the one or more side walls having a top edge and a bottom edge, the one or more side walls configured to define an internal container space;
    a beverage flap exterior to the internal container space having a top member and a bottom member, the top member connected to the top edge of a first side wall of the one or more side walls, at least a portion of the bottom member attached to the first side wall;
    an aperture defined in the top member and an aperture defined in the bottom member of the beverage flap designed to engage the beverage container;
    an additional flap connected to the top edge of a second side wall of the one or more side walls, the additional flap having a cutout designed to receive a food container;
    the cutout is defined in at least a top member of the additional flap, the top member connected to the top edge of the second side wall;
    the additional flap further includes a vertical member extending from the top member and a bottom member extending from the vertical member, the bottom member configured to attach to the second side wall; and
    wherein the top member and the bottom member of the additional flap are parallel.

15. The food box of claim 13, wherein:

the additional flap further includes an end portion extending from the bottom member, the end portion configured to attach the bottom member to the second side wall.

16. The food box of claim 15, wherein:

the end portion of the additional flap is connected to the second side wall via glue.

17. The food box of claim 15, wherein:

the end portion of the additional flap is connected to the second side wall via a friction lock when the end portion is received by a slot defined in the second side wall.

18. A food box comprising:

one or more side walls, each of the one or more side walls enclosing an internal container space and having a top edge and a bottom edge;

a condiment flap exterior to the internal container space having a top member, a side wall member, and a bottom member, the top member connected to the top edge of a first side wall of the one or more side walls, the bottom member couplable to the first side wall between the top edge and the bottom edge;

at least one cutout defined in the condiment flap and designed to receive a food container, wherein the cutout is formed from a portion of the top member of the condiment flap and is adhered via gluing to the first side wall of the one or more side walls, the side wall member of the condiment flap, and the bottom member of the condiment flap; and wherein the top member and the bottom member are parallel.

19. The food box of claim 18, further comprising:

at least one additional cutout defined in the condiment flap and designed to receive a food container, wherein the cutout is formed from a portion of the top member of the condiment flap and is adhered via gluing to the first side wall of the one or more side walls, the side wall member of the condiment flap, and the bottom member of the condiment flap.

* * * * *